United States Patent
Oh et al.

(10) Patent No.: US 9,351,218 B2
(45) Date of Patent: *May 24, 2016

(54) INTER-REGION HANDOVER METHOD IN COMMUNICATION SYSTEM

(71) Applicant: AJOU UNIVERSITY INDUSTRY-ACADEMIC COOPERATION FOUNDATION, Suwon (KR)

(72) Inventors: Seong Keun Oh, Yongin (KR); Min Lee, Suwon (KR)

(73) Assignee: AJOU UNIVERSITY INDUSTRY-ACADEMIC COOPERATION FOUNDATION, Suwon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/377,829

(22) PCT Filed: Jan. 11, 2013

(86) PCT No.: PCT/KR2013/000236
§ 371 (c)(1),
(2) Date: Aug. 8, 2014

(87) PCT Pub. No.: WO2013/118975
PCT Pub. Date: Aug. 15, 2013

(65) Prior Publication Data
US 2015/0024752 A1    Jan. 22, 2015

(30) Foreign Application Priority Data

Feb. 9, 2012 (KR) ........................ 10-2012-0013412

(51) Int. Cl.
*H04W 36/24* (2009.01)
*H04W 36/16* (2009.01)
(Continued)

(52) U.S. Cl.
CPC .......... *H04W 36/245* (2013.01); *H04W 36/165* (2013.01); *H04W 16/30* (2013.01); *H04W 36/0083* (2013.01)

(58) Field of Classification Search
CPC ... H04W 36/04; H04W 36/164; H04W 16/30; H04W 36/16; H04W 16/305
USPC ........................................... 455/436
See application file for complete search history.

(56) References Cited

U.S. PATENT DOCUMENTS 8,023,529 B2 * 9/2011 Oh et al. ................ 370/468
8,493,999 B2 * 7/2013 Oh et al. ................ 370/468
(Continued)

FOREIGN PATENT DOCUMENTS

KR   10-2011-0113863 A    9/2011
KR   10-2011-0113863 A    10/2011
(Continued)

OTHER PUBLICATIONS

International Search Report for PCT/KR2013/000236 filed on Jan. 11, 2013.

*Primary Examiner* — Michael Neff

(57) ABSTRACT

The present invention relates to an inter-region handover method in a communication system. An inter-region handover method in a communication system according to the present invention comprises a region monitoring step, a region rescanning step, a region redecision step and a CoMP connection reconfiguration step in cases where a terminal moves between regions in a communication environment in which a communication area, in which at least one base station provides a service, is divided into at least two of at least one center region, at least one boundary region and at least one common region.

17 Claims, 60 Drawing Sheets

(51) Int. Cl.
 *H04W 16/30* (2009.01)
 *H04W 36/00* (2009.01)

(56) References Cited

U.S. PATENT DOCUMENTS

| | | | |
|---|---|---|---|
| 2001/0046864 A1* | 11/2001 | Bhatoolaul et al. | 455/442 |
| 2004/0162072 A1* | 8/2004 | Sigle et al. | 455/436 |
| 2010/0002725 A1* | 1/2010 | Oh et al. | 370/468 |
| 2011/0269459 A1* | 11/2011 | Koo et al. | 455/434 |
| 2012/0190375 A1* | 7/2012 | Gu et al. | 455/450 |

FOREIGN PATENT DOCUMENTS

| KR | 10-2011-0129951 A | 12/2011 |
|---|---|---|
| KR | 10-2012-0007526 A | 1/2012 |

\* cited by examiner

INTER-REGION HANDOVER METHOD IN COMMUNICATION SYSTEM

TECHNICAL FIELD

The present invention relates to a handover method and more particularly, to an inter-region handover method in a communication system which includes a region monitoring step, a region rescanning step, a region redecision step, and a CoMP connection reconfiguration step in case where a terminal moves between regions in a communication environment in which a communication area, in which at least one base station provides a service, is divided into at least two of at least one center region, at least one boundary region, and at least one common region.

BACKGROUND ART

Generally, in a mobile communication system, handover needs to be established in a terminal in order to perform communication while securing mobility. The handover is not recognized by a user of the terminal but an operation which changes a base station is performed while maintaining call in a mobile communication system. Accordingly, the terminal performs control in accordance with the change of the base station to continuously maintain the call.

A lot of studies on for the handover technology have been conducted with respect to 2G/3G technology in a related art. Specifically, a study to prevent unnecessary frequent handover, such as a ping-pong phenomenon from occurring in a region where two cells overlap, has been conducted.

In order to solve the above-mentioned problem, a 3GPP Rel. 8 (LTE) system causes terminal history information (UE-history information) indicating information on a time when the terminal stays in each cell to be included in a field of a hand-over preparation information message to optimize the handover based on specific information of the terminal.

However, such a method does not uses information in an adjacent cell, specifically, a target cell so that there may be restriction to optimize the handover.

Therefore, the present invention has been made in an effort to provide an inter-region handover method in a communication system which includes a region monitoring step, a region rescanning step, a region redecision step, and a CoMP connection reconfiguration step in case where a terminal moves between regions in a communication environment in which a communication area, in which at least one base station provides a service, is divided into at least two of at least one center region, at least one boundary region, and at least one common region.

However, an object of the present invention is not limited to the above description and other objects which have not been mentioned above will be more apparent to those skilled in the art from reading of the following description.

An aspect of the present invention provides an inter-region handover method for a communication area which is divided into at least two of at least one center region, at least one boundary region, and at least one common region in a communication system including a step of monitoring a region where a terminal is located, in which the center region may be a region where only one base station provides a service, the boundary region may be a region where a base station set including at least two base stations provides a service, and the common region may be a region where a base station set, which includes at least two base stations including a base station which provides a service to at least one center region and at least one base station which provides a service to at least one boundary region, provides a service and the base station may be a communication node which manages resources for terminals located in a region where the base station provides a service.

In the monitoring step, the base station may monitor a region where a terminal, to which a service is provided, is located or the terminal may monitor a region where own terminal is located.

The monitoring step may comprise monitoring the region where the terminal is located, using channel quality indicators for at least one base station.

The monitoring step may comprise monitoring the region where the terminal is located using another channel quality indicator which is obtained by combining channel quality indicators for at least two base stations.

Further, the inter-region handover method may further include a step of rescanning a region where the terminal is located.

In the rescanning step, the base station may initiatively rescan the region or the terminal may autonomously rescan the region.

In the rescanning step, the terminal may rescan the region in accordance with a command of the base station.

In the rescanning step, the terminal may rescan regions which are configured by all or a part of base stations in a neighbor list which is provided by a base station or the terminal rescans regions which are configured by at least one base station which performs the CoMP transmission to the terminal in the neighbor list.

In the rescanning step, when the region shift is suspected as a result of monitoring a region where the terminal is located, by the terminal, the terminal may autonomously rescan the region.

Further, the inter-region handover method may further include a step of redeciding a region where the terminal is located.

In the redecision step, the base station may redecide a region of the terminal to which a service is provided and the terminal may redecide a region where own terminal is located.

The inter-region handover method may further include a step of reconfiguring CoMP connection between the terminal and at least one base station.

In the reconfiguration step, when the terminal moves to a region where the terminal needs to additionally establish the connection with at least one base station different from the at least one base station which is currently connected, after the region redecision, the connection with another at least one base station may be established to the terminal or when the terminal moves to a region where the terminal needs to release the connection with at least one base station among at least one base station which is currently connected to the terminal, after the region redecision, the terminal may maintain current connection configuration for a first predetermined time and then release the connection configuration with the at least one base station from which the connection configuration is released after the first predetermined time elapses.

Another aspect of the present invention provides an inter-region handover method for a communication area which is divided into at least two of at least one center region, at least one boundary region, and at least one common region in a communication system, including performing region monitoring using another channel quality indicator which is obtained by combining channel quality indicators for at least two base stations.

Another aspect of the present invention provides an inter-region handover method for a communication area which is divided into at least two of at least one center region, at least one boundary region, and at least one common region in a communication system in which a terminal performs region rescanning of regions which are configured by at least one base station which performs CoMP transmission to a terminal in a neighbor list.

Another aspect of the present invention provides an inter-region handover method for a communication area which is divided into at least two of at least one center region, at least one boundary region, and at least one common region in a communication system, in which a terminal monitors a region where own terminal is located and when region shift is suspected through the region monitoring, the terminal transmits a region rescanning request message to a base station or autonomously performs the region rescanning.

Another aspect of the present invention provides an inter-region handover method for a communication area which is divided into at least two of at least one center region, at least one boundary region, and at least one common region in a communication system, in which a base station receives a CoMP scanning report (a channel quality indicator of at least one base station which is capable of performing the CoMP transmission to the terminal) from the terminal in a neighbor list.

Another aspect of the present invention provides an inter-region handover method for a communication area which is divided into at least two of at least one center region, at least one boundary region, and at least one common region in a communication system, in which a base station may transmit a CoMP establishment request message to another at least one base station and the base station may transmit a CoMP access connection reconfiguration message to the terminal after receiving a CoMP establishment response message from the another at least one base station.

Another aspect of the present invention provides an inter-region handover method for a communication area which is divided into at least two of at least one center region, at least one boundary region, and at least one common region in a communication system, in which a base station transmits a CoMP establishment request message to another at least one base station and the base station transmits the CoMP access connection reconfiguration message to the terminal after receiving the CoMP establishment response message from the another at least one base station and then transmits the CoMP establishment completed message to the another at least one base station after receiving the CoMP access connection reconfiguration completed message from the terminal.

Another aspect of the present invention provides an inter-region handover method for a communication area which is divided into at least two of at least one center region, at least one boundary region, and at least one common region in a communication system, in which a base station transmits a CoMP access connection reconfiguration message to the terminal and transmits a CoMP release request message to another at least one base station after receiving the CoMP access connection reconfiguration completed message from the terminal, and receives a CoMP release response message from another at least one base station.

Another aspect of the present invention provides an inter-region handover method for a communication area which is divided into at least two of at least one center region, at least one boundary region, and at least one common region in a communication system, in which a base station transmits a CoMP establishment request message to another at least one base station and the base station transmits the CoMP access connection reconfiguration message to the terminal after receiving the CoMP establishment response message from the another at least one base station and transmits the CoMP establishment completed message to the another at least one first base station after receiving the CoMP access connection reconfiguration completed message from the terminal, transmits a CoMP release request message to the at least one another second base station, and receives a CoMP release response message from the at least one another second base station.

Another aspect of the present invention provides an inter-region handover method for a communication area which is divided into at least two of at least one center region, at least one boundary region, and at least one common region in a communication system, in which region redecision is performed during a CoMP connection reconfiguration step.

When the region redecision is performed during the CoMP connection reconfiguration step in the communication system, region redecision is performed during a CoMP connection reconfiguration step.

Another aspect of the present invention provides an inter-region handover method for a communication area which is divided into at least two of at least one center region, at least one boundary region, and at least one common region in a communication system, in which if region shift of a terminal is decided, a base station performs region redecision for a first predetermined time.

If the region shift of the terminal is decided in the communication system, when the base station performs the region redecision for the first predetermined time, the base station receives a CoMP scanning report from the terminal for the first predetermined time.

Another aspect of the present invention provides an inter-region handover method for a communication area which is divided into at least two of at least one center region, at least one boundary region, and at least one common region in a communication system, in which a terminal monitors a region where the terminal is located and when region shift is suspected through the region monitoring, the terminal autonomously performs the region rescanning and then performs region redecision.

Another aspect of the present invention provides an inter-region handover method for a communication area which is divided into at least two of at least one center region, at least one boundary region, and at least one common region in a communication system, in which when region shift of a terminal is decided, a base station receives a CoMP scanning report from the terminal for the first predetermined time.

Another aspect of the present invention provides an inter-region handover method for a communication area which is divided into at least two of at least one center region, at least one boundary region, and at least one common region in a communication system, in which when a terminal moves to a region where the terminal needs to additionally establish the connection with at least one base station different from the at least one base station which is currently connected, after region redecision, at least one base station among at least one base station which is currently connected to the terminal transmits a CoMP establishment request message to another at least one base station, and when the terminal moves to a region where the terminal needs to release the connection with at least one base station among the at least one base station which is currently connected, after the region redecision, at least one base station which is currently connected to the terminal maintains the current connection configuration for the first predetermined time and at least one base station among the at least one base station which is currently connected to the terminal transmits a CoMP release request message to at least one base station which is supposed to release the connection after the first predetermined time elapses.

Another aspect of the present invention provides an inter-region handover method for a communication area which is divided into at least two of at least one center region, at least one boundary region, and at least one common region in a communication system, in which when a terminal moves to a region where the terminal needs to additionally establish the connection with at least one base station different from the at least one base station which is currently connected, after region redecision, the base station transmits a CoMP access connection reconfiguration message for establishment of CoMP connection to the terminal.

Another aspect of the present invention provides an inter-region handover method for a communication area which is divided into at least two of at least one center region, at least one boundary region, and at least one common region in a communication system, in which when a terminal moves to a region where the terminal needs to release the connection with at least one base station among the at least one base station which is currently connected, after region redecision, the current connection configuration is maintained for a first predetermined time and then a base station transmits a CoMP access connection reconfiguration message for the CoMP connection release, to the terminal after the first predetermined time elapses.

Another aspect of the present invention provides an inter-region handover method for a communication area which is divided into at least two of at least one center region, at least one boundary region, and at least one common region in a communication system, in which when region shift of a terminal is decided, if region redecision is performed during a first predetermined time and another region shift of the terminal is decided before the first predetermined time elapses, the region redecision is performed for a second predetermined time.

Another aspect of the present invention provides an inter-region handover method for a communication area which is divided into at least two of at least one center region, at least one boundary region, and at least one common region in a communication system, in which when region shift of a terminal is decided, region monitoring is performed for a first predetermined time.

Another aspect of the present invention provides an inter-region handover method for a communication area which is divided into at least two of at least one center region, at least one boundary region, and at least one common region in a communication system, in which when region shift of a terminal is decided, if region monitoring is performed during a first predetermined time and then region shift of the terminal is suspected before the first predetermined time elapses, region rescanning is performed.

Another aspect of the present invention provides an inter-region handover method for a communication area which is divided into at least two of at least one center region, at least one boundary region, and at least one common region in a communication system, in which when region shift of a terminal is decided, CoMP scanning and region redecision are performed for a first predetermined time.

Another aspect of the present invention provides an inter-region handover method for a communication area which is divided into at least two of at least one center region, at least one boundary region, and at least one common region in a communication system, in which a terminal is controlled to continuously perform CoMP scanning and region redecision.

Another aspect of the present invention provides an inter-region handover method for a communication area which is divided into at least two of at least one center region, at least one boundary region, and at least one common region in a communication system, in which when region shift of a terminal is decided, a terminal may be controlled to perform CoMP scanning and region redecision for a first predetermined time.

Another aspect of the present invention provides an inter-region handover method for a communication area which is divided into at least two of at least one center region, at least one boundary region, and at least one common region in a communication system, in which when region shift of a terminal is decided, if current connection configuration is maintained for a first predetermined time and then another region shift of the terminal is decided before the first predetermined time elapses, current connection configuration may be maintained again for a second predetermined time.

Another aspect of the present invention provides an inter-region handover method for a communication area which is divided into at least two of at least one center region, at least one boundary region, and at least one common region in a communication system, in which when region shift of a terminal is decided, if CoMP connection reconfiguration is performed for a first predetermined time and connection configuration is maintained for the first predetermined time and then another region shift of the terminal is decided before the first predetermined time elapses, current connection configuration may be maintained for a second predetermined time.

Another aspect of the present invention provides an inter-region handover method for a communication area which is divided into at least two of at least one center region, at least one boundary region, and at least one common region in a communication system, in which when region shift of a terminal is decided, if current connection configuration is maintained for a first predetermined time and then another region shift of the terminal is decided before the first predetermined time elapses, CoMP connection reconfiguration is performed for a second predetermined time.

Another aspect of the present invention provides an inter-region handover method for a communication area which is divided into at least two of at least one center region, at least one boundary region, and at least one common region in a communication system, in which a terminal performs region redecision and the terminal transmits a CoMP reestablishment request message including a region redecision result to a base station.

Another aspect of the present invention provides an inter-region handover method for a communication area which is divided into at least two of at least one center region, at least one boundary region, and at least one common region in a communication system, in which region monitoring is performed during a CoMP connection reconfiguration step.

When the region monitoring is performed during the CoMP connection reconfiguration step in the communication system, region monitoring may be performed during a CoMP connection reconfiguration step.

Another aspect of the present invention provides an inter-region handover method for a communication area which is divided into at least two of at least one center region, at least one boundary region, and at least one common region in a communication system, including a step of monitoring a region where a terminal is located and a step of rescanning a region where the terminal is located, in which the center region is a region where only one base station provides a service, the boundary region is a region where a base station set including at least two base stations provides a service, and the common region is a region where a base station set, which includes at least two base stations including a base station which provides a service to at least one center region and at least one base station which provides a service to at least one boundary region, provides a service and the base station is a communication node which manages resources for terminals located in a region where the base station provides a service.

Another aspect of the present invention provides an inter-region handover method for a communication area which is divided into at least two of at least one center region, at least one boundary region, and at least one common region in a communication system, including a step of monitoring a region where a terminal is located and a step of rescanning a region where the terminal is located, in which the center region is a region where only one base station allocates at least one resource to one terminal to perform communication, the boundary region is a region where a base station set including at least two base stations allocates at least one resource to one terminal to perform communication, and the common region is a region where a base station set, which includes at least two base stations including a base station which provides a service to at least one center region and at least one base station which provides a service to at least one boundary region, allocates at least one resource to one terminal to perform communication, the base station may be a communication node which manages resources for terminals located in a region where the base station provides a service.

Accordingly, the present invention suggests an inter-region handover method in a CoMP environment in which cooperative transmission between base stations is performed to provide mobility of a terminal.

According to an inter-region handover method according to the present invention, connectivity of a service of the terminal may be secured by suggesting a handover method in consideration of a characteristic for every region in accordance with a movement scenario of a terminal in a CoMP environment in which cooperative transmission between base stations is performed.

The inter-region handover method of the present invention performs connection reconfiguration after checking a continuous state of a region configuration condition for a predetermined time, thereby reducing signal overhead in frequent movement or ping-pong state of the terminal and reducing a load of a network.

In the inter-region handover method of the present invention, the terminal autonomously performs region monitoring so that the terminal can more exactly perform region monitoring using a channel quality which the terminal measures by itself.

In the inter-region handover method of the present invention, the terminal autonomously performs region rescanning, thereby reducing signaling between a base station and a terminal and shortening service delay.

In the inter-region handover method of the present invention, the terminal autonomously performs region redecision, so that the terminal can exactly perform region redecision using a region rescanning result which the terminal performs by itself and can quickly respond to frequent movement or ping-pong state of the terminal.

DETAILED DESCRIPTION OF THE INVENTION

Figure 1:
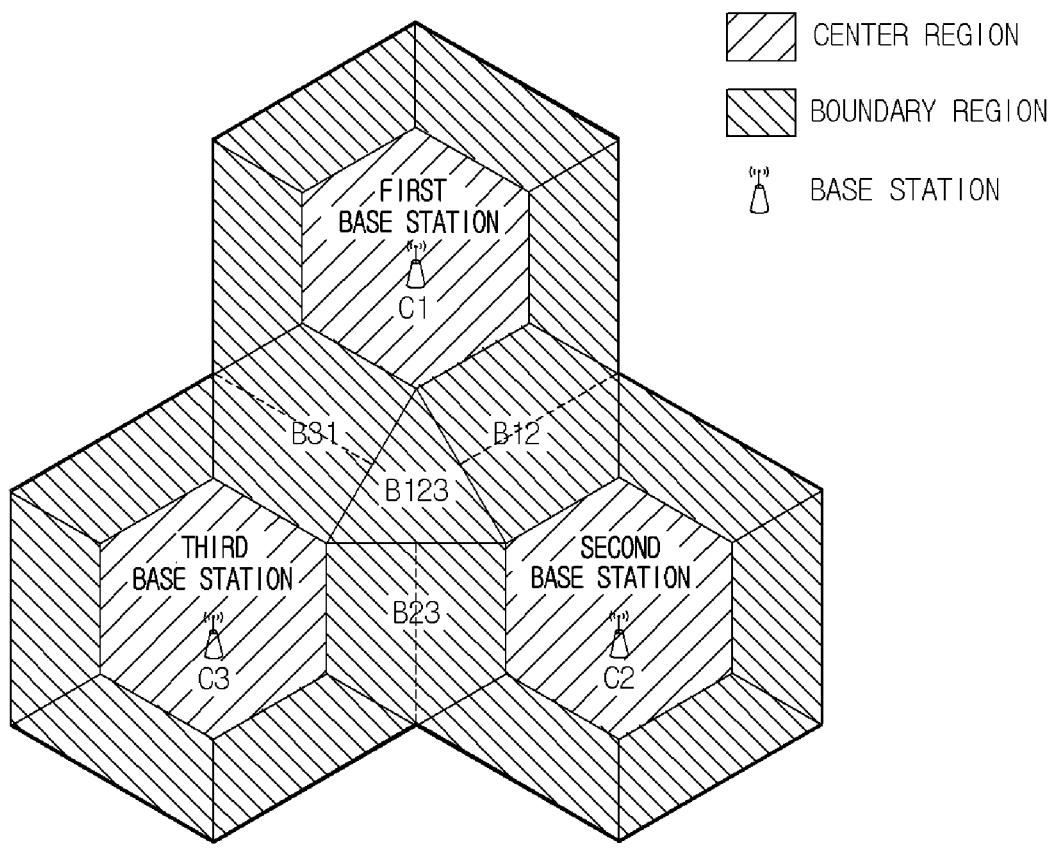
FIG. 1 is a first view illustrating a dividing method of a multi-cell region according to an exemplary embodiment of the present invention.

Hereinafter, an inter-region handover method in a communication system according to an exemplary embodiment of the present invention will be described with reference to FIGS. 1 to 40B. Parts which are supposed to understand an operation and an effect of the present invention will be mainly described in detail. Throughout the specification, like reference numerals of the drawings denote like components. Further, in the description of the exemplary embodiment, if it is considered that specific description of related known configuration or function may cloud the gist of the present invention, the detailed description thereof will be omitted.

The present invention suggests an inter-region handover method in a communication system which includes a region monitoring step, a region rescanning step, a region redecision step, and a CoMP connection reconfiguration step in case where a terminal moves between regions in a communication environment in which a communication area, in which at least one base station provides a service, is divided into at least two of at least one center region, at least one boundary region, and at least one common region.

In order to specifically describe the present invention, a definition of a communication area is described first and then an overall configuration for the inter-region handover method and a region monitoring step, a region rescanning step, a region redecision step, and a CoMP connection reconfiguration step which configure the inter-region handover method will be described. Finally, inter-region handover procedures as an embodiment in accordance with scenarios where representative terminals moves according to an exemplary embodiment of the present invention will be described.

Communication Area

A communication area in which at least one base station provides a service may be divided into at least two of at least one center region, at least one boundary region, and at least one common region in the present invention. Here, a base station is a communication node which manages a resource for terminals located in a communication area in which the base station provides a service and transmits and receives data to and from the terminals. The center region, the boundary region, and the common region are defined as follows.

1) Center region: A communication area in which only one base station provides a service or a communication area in which only one base station allocates at least one resource to one terminal to perform communication.

2) Boundary region: A communication area in which a base station set, which includes at least two base stations, provides a service or a communication area in which a base station set, which includes at least two base stations, allocates at least one resource to one terminal to perform communication.

3) Common region: A communication area in which a base station set, which includes at least two base stations including at least one base station which provides a service to at least one center region and at least one base station which provides a service to at least one boundary region, provides a service or a communication area in which a base station set, which includes at least two base stations including at least one base station which provides a service to at least one center region and at least one base station which provides a service to at least one boundary region, allocates at least one resource to one terminal to perform communication.

Hereinafter, for the convenience of description, a "communication area" is simply referred to as a "region".

FIG. 1 is a first view illustrating a dividing method of a multi-cell region according to an exemplary embodiment of the present invention.

Referring to FIG. 1, a cell region where each of three base stations provides a service is divided into a center region and a boundary region. The center region is a region where only the base station provides a service near each base station or only the corresponding base station allocates at least one resource to one terminal to perform communication, and the center region is defined by a center region C1 of a first base station, a center region C2 of a second base station, a third region C3 of a third base station.

The boundary region is a region where at least two base stations provide a service at a cell boundary or a base station set including at least two base stations allocates at least one resource to one terminal to perform communication, and the boundary region is defined by a boundary region B12 of the first base station and the second base station, a boundary region B23 of the second base station and the third base station, a boundary region B31 of the third base station and the first base station, and a boundary region B123 of three base stations (the first base station, the second base station, and the third base station).

Figure 2:
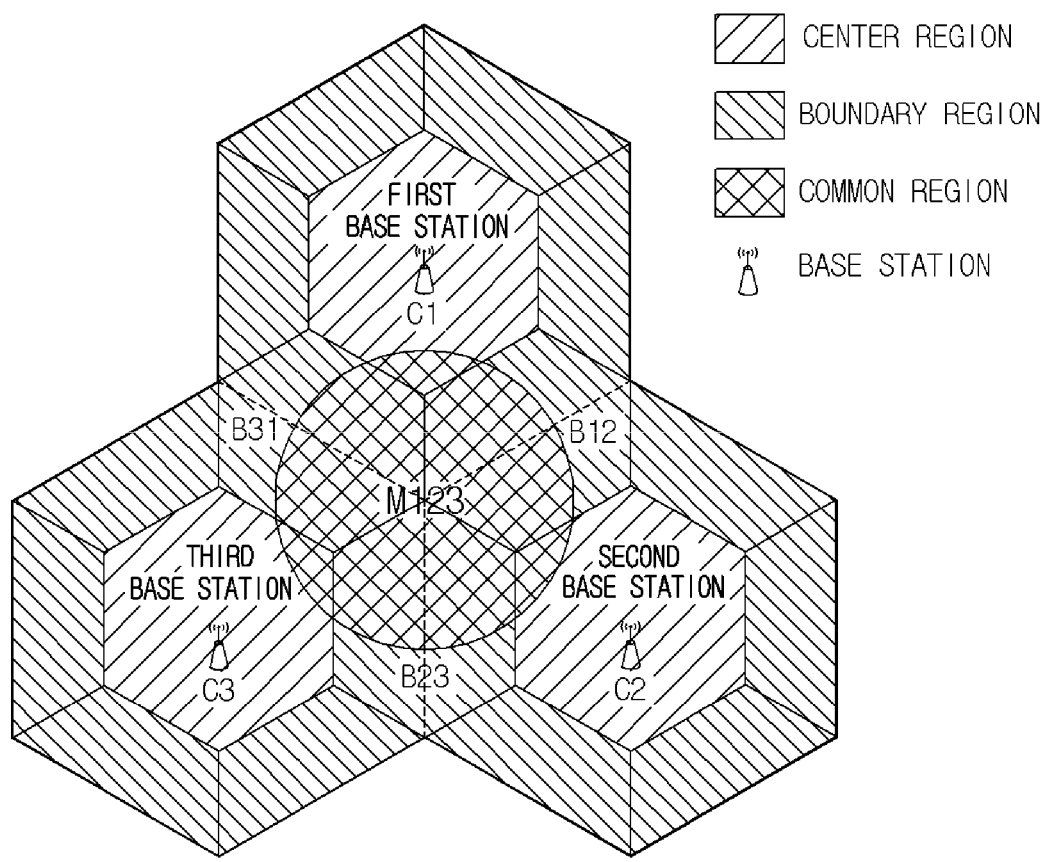
FIG. 2 is a second view illustrating a dividing method of a multi-cell region according to an exemplary embodiment of the present invention.

FIG. 2 is a second view illustrating a dividing method of a multi-cell region according to an exemplary embodiment of the present invention.

Referring to FIG. 2, a cell region where each of three base stations provides a service is divided into a center region, a boundary region, and a common region. The center region is a region where only the base station provides a service or only the corresponding base station allocates at least one resource to one terminal to perform communication, and the center region is defined by a center region C1 of a first base station, a center region C2 of a second base station, a center region C3 of a third base station.

The boundary region is a region where at least two base stations provide a service at a cell boundary or a base station set including at least two base stations allocate at least one resource to one terminal to perform communication, and the boundary region is defined by a boundary region B12 of the first base station and the second base station, a boundary region B23 of the second base station and the third base station, and a boundary region B31 of the third base station and the first base station.

A common region is a region where at least two base stations including at least one base station which provides a service to at least one center region and at least one base station which provides a service to at least one boundary region provide a service or a region where a base station set, which includes at least two base stations including at least one base station which provides a service to at least one center region and at least one base station which provides a service to at least one boundary region, allocates at least one resource to one terminal to perform communication, and the common region is defined by a common region M123 of three base stations (the first base station, the second base station, and the third base station).

Figure 3:
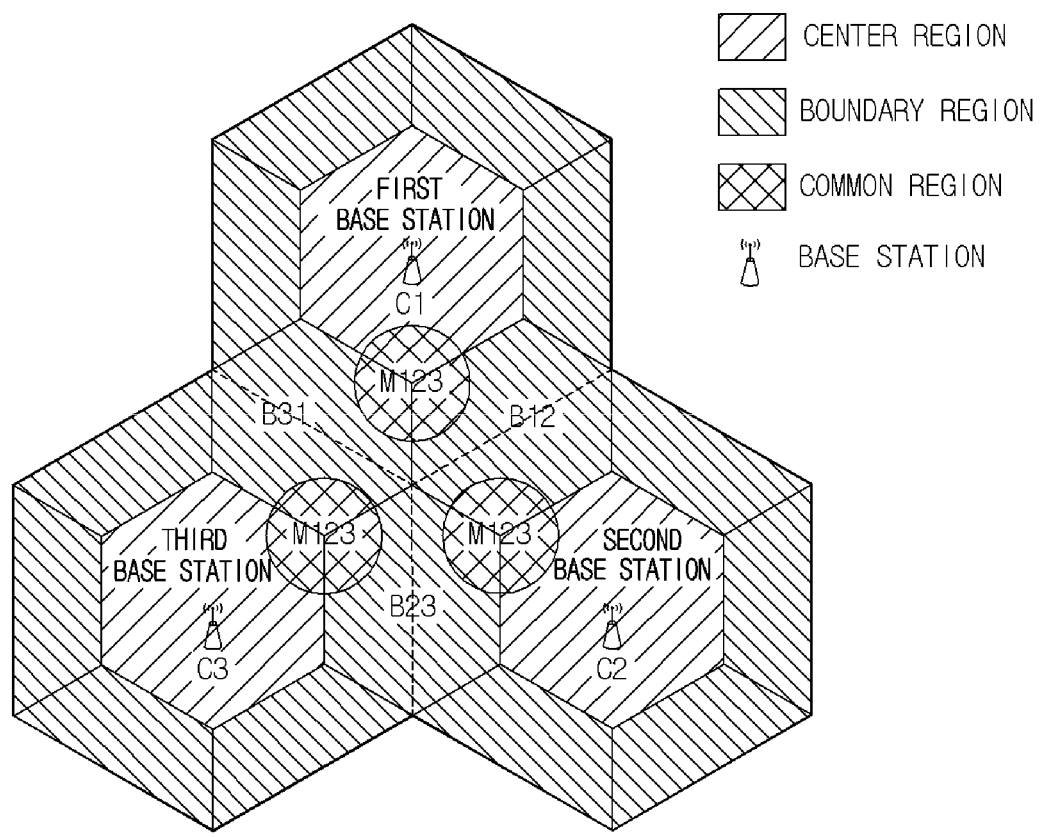
FIG. 3 is a third view illustrating a dividing method of a multi-cell region according to an exemplary embodiment of the present invention.

FIG. 3 is a third view illustrating a dividing method of a multi-cell region according to an exemplary embodiment of the present invention.

Referring to FIG. 3, a cell region where each of three base stations provides a service is divided into a center region, a boundary region, and a common region. The center region and the boundary region are defined by the same manner as FIG. 2 which is described above. However, each of the common regions is defined by three common regions M123 which include a part of one center region and a part of two boundary regions. In three common regions, three base stations (the first base station, the second base station, and the third base station) equally provide services or a base station set, which includes at least two base stations including a base station which provides a service to at least one center region and at least one base station which provides a service to at least one boundary region, allocates at least one resource to one terminal to perform communication.

Figure 4:
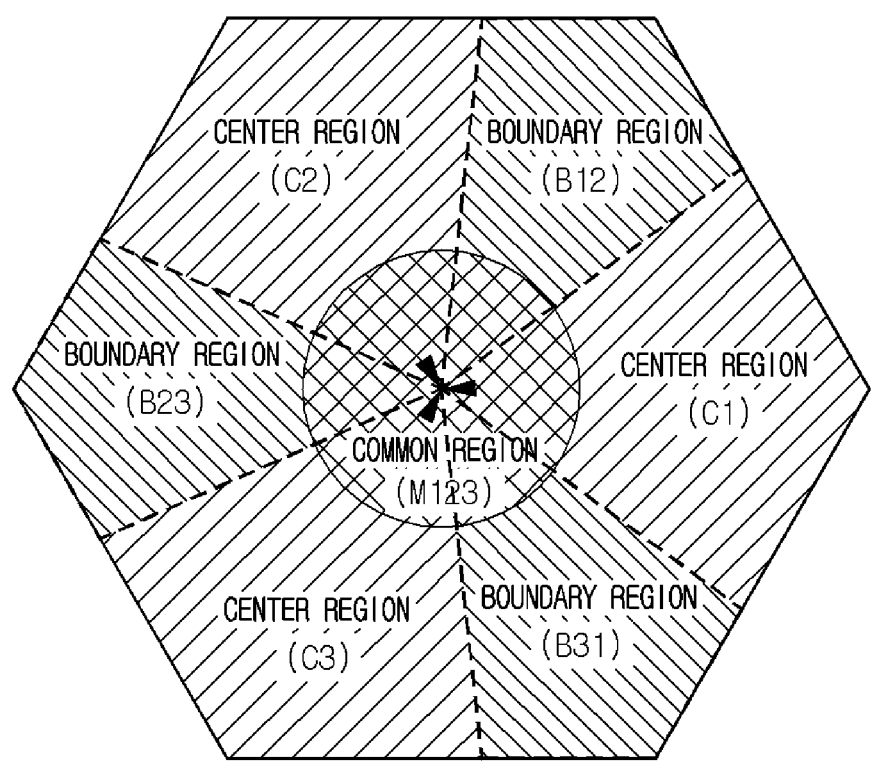
FIG. 4 is a second view illustrating a dividing method of a sectorized region according to an exemplary embodiment of the present invention.

FIG. 4 is a second view illustrating a dividing method of a sectorized region according to an exemplary embodiment of the present invention.

Referring to FIG. 4, a sector region where each of three sector base stations provides a service is divided into a center region, a boundary region, and a common region. The center region is a region where only each of the sector base stations provides a service or only each of the sector base stations allocates at least one resource to one terminal to perform communication, and the center region is defined by a center region C1 of a first sector base station, a center region C2 of a second sector base station, a center region C3 of a third sector base station.

The boundary region is a region where at least two sector base stations provide a service at a sector boundary or a base station set, which includes at least two sector base stations, allocates at least one resource to one terminal to perform communication, and the boundary region is defined by a boundary region B12 of the first sector base station and the second sector base station, a boundary region B23 of the second sector base station and the third sector base station, and a boundary region B31 of the third sector base station and the first sector base station.

A common region is a region where a base station set, which includes at least two sector base stations including a sector base station which provides a service to at least one center region and at least one sector base station which provides a service to at least one boundary region, provides a service or a region where a base station set, which includes at least two sector base stations including a base sector station which provides a service to at least one center region and at least one sector base station which provides a service to at least one boundary region, allocates at least one resource to one terminal to perform communication and the common region is defined by a common region M123 of three sector base stations (the first sector base station, the second sector base station, and the third sector base station).

Inter-region Handover Method

Figure 5:
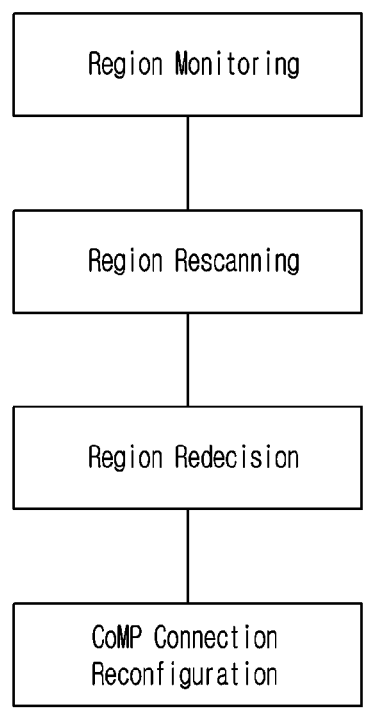
FIG. 5 is an inter-region handover method according to an exemplary embodiment of the present invention.

FIG. 5 is an inter-region handover method according to an exemplary embodiment of the present invention.

Referring to FIG. 5, an inter-region handover method according to an exemplary embodiment of the present invention may include a region monitoring step, a region rescanning step, a region redecision step, and a CoMP connection reconfiguration step.

1) Region monitoring step: A step of monitoring whether to satisfy a region configuration condition of a currently decided region of a terminal. Whether to satisfy a region configuration condition of a currently decided region may be monitored using a channel quality indicator between a terminal and at least one base station which is currently connected with the terminal. When the region configuration condition of the currently decided region is not satisfied as a result of the region monitoring, a region shift suspected state of the terminal is set to perform a region rescanning step. The base station may perform the region monitoring using the channel quality indicator which is provided from the terminal. The terminal may autonomously perform the region monitoring using a channel quality indicator which is directly measured.

2) Region rescanning step: A step of rescanning a region where a terminal is located. A base station may initiatively perform region rescanning. The base station transmits a region rescanning control message to the terminal to control the terminal to perform the region rescanning. The terminal searches some or all of base stations in a neighbor list which is provided by the base station and measures a channel quality between at least one searched base station and the terminal to rescan the region where the terminal is located. The terminal may autonomously perform region rescanning. When the region configuration condition of the currently decided region is satisfied, the terminal may autonomously perform the region rescanning. The terminal may provide a region rescanning result to the base station. When the base stations are not synchronized, the terminal may perform synchronization with the base stations.

3) Region redecision step: A step of redeciding a region where the terminal is currently located. The region, in which the terminal is located, may be redecided as one of the center region, the boundary region, and the common region and also may be redecided as a region which is decided before the region redecision step. The base station may initiatively perform the region redecision. The base station may receive the region rescanning result from the terminal to perform the region redecision. The terminal may autonomously perform the region rescanning. The terminal may autonomously redecide a region where the terminal is currently located, using the region rescanning result. The terminal may autonomously perform the region redecision using the region rescanning result. In this case, the terminal may provide a region redecision result to the base station.

4) CoMP connection reconfiguration step: A step of reconfiguring CoMP connection between a terminal and base stations. The CoMP connection between the terminal and the base stations may be reconfigured in accordance with the region redecision result. When the terminal may establish additional connection with at least one base station different from at least one base station which is currently connected or the terminal may release the connection with at least one base station among at least one base station which is currently connected.

The region monitoring step will be specifically described.

The region monitoring step is a step of monitoring whether to satisfy a region configuration condition of a currently decided region using a channel quality indicator between a terminal and at least one base station which is currently connected to the terminal and the base station initiatively monitors a region where a terminal to which a service is provided is located or the terminal autonomously monitors the region. Further, another channel quality indicator which is obtained by combining channel quality indicators for at least two base stations is used to perform the region monitoring.

1) Whether a region where the terminal is located is changed is monitored using a channel quality indicator between the terminal and at least one base station which is currently connected to the terminal.

① The channel quality indicator which is used for the region monitoring includes a channel characteristic indicator, a quality of service (QoS) indicator, and a quality of experience (QoE) indicator and other quantity related with a quality of the channel may be also used as the channel quality indicator.

The channel characteristic indicator may include a received signal strength indicator (RSSI), a signal to noise ratio (SNR), a signal to interference plus noise ratio (SINR), a channel state information (CSI), a multiple input multiple output (MIMO) configuration, a channel quality indicator (CQI), a rank indicator (RI), and a precoding matrix indicator (PMI) determined in accordance with fading, channel attenuation, shadowing, delay spread, multiple path, in-cell interference, adjacent cell interference, Doppler, an antenna gain, channel allocation which are characteristics of a channel formed between the terminal and the base station and other indicator related with a characteristic of the channel may be definitely used as the channel characteristic indicator.

The RSSI is an indicator indicating a strength of a received signal which is measured at a receiver.

The SNR is a signal to noise ratio and is an indicator indicating a ratio of a signal power with respect to a noise power.

The SINR is a signal to interference plus noise ratio and is an indicator indicating a ratio of a signal power with respect to interference and noise power.

The CSI indicates a channel state between a terminal and a base station.

The MIMO configuration indicates an antenna configuration between a terminal and a base station. For example, 4×2 MIMO configurations are configured between a base station including four antennas and a terminal including two antennas.

The CQI is an indicator indicating a channel quality between a terminal and a base station.

The RI is an indicator indicating a number of data streams which are independently available for a matrix channel formed between a terminal and a base station.

The PMI indicates a precoding matrix for signal transmission between a terminal and a base station.

The QoS indicator includes a delay time, a throughput, a packet error rate (PER), a frame error rate (FER), a block error rate (BLER), and a bit error rate (BER) which are characteristics of a path through which the base station provides the service to the terminal and other indicators related with the service providing path characteristic may be also used as the QoS indicator.

The delay time includes an absolute delay time and a relative delay time. The absolute delay time is a time between a time when an end terminal, which provides a service, transmits one packet and a time when an end terminal, which receives the service, receives the packet and the relative delay time is a time that takes to receive a next packet after receiving one packet when a service is provided through the network.

The throughput indicates a quantity of data which may be transmitted between a terminal and a base station. The throughput may be classified by layers. For example, the throughput may include a physical layer throughput, a medium access control (MAC) layer throughput, a network layer throughput, and an application throughput.

The bit error rate (BER), the block error rate (BLER), the frame error rate (FER), and the packet error rate (PER) are error rates which occur at the time of transmitting a signal and the BER indicates an error rate for a bit, the BLER indicates an error rate for a block, the FER indicates an error rate for a frame, and the PER indicates an error rate for a packet.

The QoE indicator is a quality of experience which is measured by a terminal which receives a service and includes a mean opinion score (MOS), a call outage rate, an R-value, an initial buffering time, Jerkiness, a page response time, a data transmission rate, and a downloading time. Further, other indicator related with a quality of user experience may be definitely used as the QoE indicator.

The MOS is a value indicating a service quality in consideration of a recognition of human.

The call outage rate is a probability of occurring outage of voice call.

The R-value is a quality indicator representing a quality which may be felt in a measurement section using a network environment indicator.

The initial buffering time is a time that takes for a user to receive the initial service by buffering predetermined data since the user requests a video streaming service.

The jerkiness is a measured value for a degree of showing that a still image is continued in a motion picture or motions are unnaturally connected.

The page response time is a time that takes to receive the page since the user requests a web page.

The data transmission rate is a data transmission amount for unit time. The downloading time is total time that takes to receive a request file.

② Region Shift Suspected State

When the terminal does not satisfy the region configuration condition of the currently decided region, the terminal is set to a region shift suspected state.

When the channel quality indicator between the terminal and the at least one base station which is currently connected to the terminal does not satisfy a reference value which is a region configuration condition of the currently decided region of the terminal, the terminal may be set to the region shift suspected state.

As one exemplary embodiment, when the SNR is used as the channel quality indicator, a currently decided region of the terminal is the center region C1 of the first base station, and the center region configuration condition is that the SNR is 10 dB or higher, as a result of the region monitoring, if the SNR between the first base station and the terminal is 6 dB, it does not satisfy the reference value, 10 dB, which is the region configuration condition of the center region C1 of the first base station, so that the terminal is set to the region shift suspected state of the terminal.

When the region monitoring is performed using another channel quality indicator which is obtained by combining channel quality indicators between the terminal and at least two base stations which are currently connected to the terminal and the terminal does not satisfy the region configuration condition of the currently decided region as a result of the region monitoring, the terminal is set to the region shift suspected state.

As one exemplary embodiment, when the SNR is used as the channel quality indicator, the currently decided region of the terminal is the boundary region B12 of the first base station and the second base station, and the boundary region configuration condition is that a difference between two SNRs needs to be less than 5 dB, if an SNR between the first base station and the terminal is 10 dB and an SNR between the second base station and the terminal is 3 dB, as a result of the region monitoring, 7 dB which is a difference between two SNRs is created as another channel quality indicator, which does not satisfy the reference value, 5 dB, which is the region configuration condition of the boundary region B12 of the first base station and the second base station so that the terminal is set to the region shift suspected state of the terminal.

2) The base station may monitor a region where a terminal to which a service is provided is located.

The base station monitors whether the terminal to which a service is provided satisfies the region configuration condition of the currently decided region.

The base station receives the channel quality indicator between the base station and the terminal from the terminal to which a service is provided to monitor whether the terminal satisfies the region configuration condition of the currently decided region.

When the terminal does not satisfy the region configuration condition of the currently decided region, the base station controls the terminal to perform the region rescanning.

3) The terminal may monitor a region where the terminal is located.

The terminal autonomously monitors whether to satisfy the region configuration condition of the decided region.

The terminal directly measures the channel quality between the at least one base station which is currently connected and the terminal and monitors whether to satisfy the region configuration condition of the currently decided region using the channel quality.

When the terminal does not satisfy the region configuration condition of the currently decided region, the terminal may request the region rescanning step to at least one base station which is currently connected or autonomously perform the region rescanning.

4) Another channel quality indicator which is obtained by combining channel quality indicators for at least two base stations may be used to perform the region monitoring.

When the terminal currently configures the CoMP connection with at least two base stations, another channel quality indicator is obtained by combining channel quality indicators between the terminal and each of the base stations and the region of the terminal may be monitored using the another channel indicator.

A method for combining channel quality indicators for at least two base stations includes ordered combination which aligns values of the channel quality indicators for at least two base stations in the order of values of the channel quality indicators to create another channel quality indicator, difference/ratio combination which calculates a difference or a ratio of the values of the channel quality indicators to create another channel quality indicator, comparison combination which relatively compares the values of the channel quality indicators to create another channel quality indicator, selection combination which selects a part of the values of the channel quality indicators in accordance with a condition, weighted combination which applies a weight to the values of the channel quality indicators and combines the values to create another channel quality indicator, logical combination which determines truth or false for the values of the channel quality indicators in accordance with a condition or logically combines truth and false conditions to create another channel quality indicator, and parameter normalization combination which normalizes values of different types of channel quality indicators into one parameter and combines the channel quality indicators to create another channel quality indicator. Here, the channel quality indicator includes the channel characteristic indicator, the QoS indicator, and the QoE indicator.

① Ordered Combination

The ordered combination which aligns values of the channel quality indicators for at least two base stations which are currently connected in the order of values of the channel quality indicators to create another channel quality indicator may be performed. In this case, the values of the channel quality indicators may be aligned in a descending order or an ascending order to perform the ordered combination. Further, a result of the ordered combination may be combined by at least one combining method of another ordered combination, the difference/ratio combination, the comparison combination, the selection combination, the weighted combination, the logical combination, and the parameter normalization combination.

As one exemplary embodiment, when a terminal which is connected to three base stations obtains SINRs as channel quality indicators and an SINR for a first base station is 15 dB, an SINR for a second base station is 20 dB, and an SINR for a third base station is 5 dB, the SINRs for three base stations are ordered-combined so that the second base station which has the highest SINR is aligned as the first, the first base station is aligned as the second, and the third base station is aligned as the third to create another channel quality indicator and the region monitoring is performed using the another channel quality indicator.

② Difference/ratio Combination

The difference/ratio combination may be performed by calculating a difference or a ratio of the values of the channel quality indicators for at least two base stations which are currently connected. In this case, the difference/ratio combination may be performed by calculating the difference/ratio by various methods, for example, of calculating a difference or a ratio with respect to a highest value of the values of the channel quality indicators, calculating a difference or a ratio with respect to the lowest value of the values of the channel quality indicators, or calculating a difference or a ratio between values of all channel quality indicators to perform the different/ratio combination. Further, results of the difference/ratio combination may be combined by at least one combining method of another difference/ratio combination, the ordered combination, the comparison combination, the selection combination, the weighted combination, the logical combination, and the parameter normalization combination.

As one exemplary embodiment, when the terminal which is connected to three base stations obtains throughputs as channel quality indicators from the three base stations, a throughput for the first base station is 5 Mbps, a throughput for the second base station is 3 Mbps, and a throughput for the third base station is 1 Mbps, differences/ratios of the throughputs for each of three base stations are combined to calculate a difference of throughputs of base stations with respect to the throughput of the first base station which is the highest throughput, and the result of 0 Mbps of a throughput difference between the first base stations, −2 Mbps of a throughput difference between the first base station and the second base station, and −4 Mbps of a throughput difference between the first base station and the third base station are created as another channel quality indicator and the region monitoring is performed using the channel quality indicator.

③ Comparison Combination

The comparison combination which compares the values of the channel quality indicators for each of at least two base stations which are currently connected may be performed. In this case, the comparison combination may be performed by various methods of comparing sizes of channel quality indicators or comparing the values of the channel indicators with a specific reference value. Further, results of the comparison combination may be combined by at least one combining method of another comparison combination, the ordered combination, the difference/ratio combination, the selection combination, the weighted combination, the logical combination, and the parameter normalization combination.

As one exemplary embodiment, when the terminal which is connected to three base stations obtains a throughput of a part of the base stations as the channel quality indicator, for example, 5 Mbps of a throughput for the first base station, 3 Mbps of a throughput for the second base station are obtained. An SINR of the part of the base stations is obtained, for example, an SINR for the second base station is 10 dB and an SINR for the third base station is 5 dB. The throughputs and/or the SINRs for each of the three base stations are compared and combined. The throughput for the first base station may be larger than the throughput which may be provided by the SINR of the third base station so that the throughputs are compared and the first base station is determined as the first, the second base station is determined as the second, and the third base station is determined as the third to create another channel quality indicator and the region monitoring is performed using the another channel quality indicator.

④ Selection Combination

The selection combination which selects a part of the values of the channel quality indicators for each of at least two base stations which are currently connected in accordance with a condition may be performed. In this case, the selection combination may be performed by various methods of selecting at least one having the highest value among the values of the channel quality indicators, or selecting at least one having the lowest value among the values of the channel quality indicators, selecting at least one having an intermediate value among the values of the channel quality indicators, selecting at least one having a value which is approximate to a specific reference value among the values of the channel quality indicators, or selecting values within a specific range. Further, results of the selection combination may be combined by at least one combining method of another selection combination, the ordered combination, the difference/ratio combination, the comparison combination, the weighted combination, the logical combination, and the parameter normalization combination.

As one exemplary embodiment, when the terminal which is connected to three base stations obtains CQI as a channel quality indicator from each of the three base stations, a CQI for the first base station is 5, a CQI for the second base station is 13, and a CQI for the third base station is 7, the CQIs for three base stations are selectively combined to select the second base station which has the highest CQI to create another channel quality indicator and the region monitoring is performed using the channel quality indicator.

⑤ Weighted Combination

The weighted combination which applies a weight to the values of the channel quality indicators for each of at least two base stations which are currently connected and combines the values may be performed. In this case, the weighted combination may be performed by various methods of calculating an average of the values of the channel quality indicators, calculating a variance of the values of the channel quality indicators, or applying different weights to the values of the channel quality indicators to add the values. Further, results of the weighted combination may be combined by at least one combining method of another weighted combination, the ordered combination, the difference/ratio combination, the comparison combination, the selection combination, the logical combination, and the parameter normalization combination.

As one exemplary embodiment, when the terminal which is connected to three base stations obtains a delay time as a channel quality indicator from each of the three base stations, a delay time for a first base station is 500 msec, a delay time for a second base station is 700 msec, and a delay time for a third base station is 300 msec, an average of delay times for three base stations is calculated to be weighted-combined to create 500 msec which is the average of the delay times for three base stations as another channel quality indicator and the region monitoring is performed using the channel quality indicator.

⑥ Logical Combination

The logical combination which determines truth or false for the values of the channel quality indicators for at least two base stations which are currently connected in accordance with a condition or logically combines truth and false conditions may be performed. In this case, the logical combination may be performed by various methods of determining whether each value of the channel quality indicators is higher than a specific reference value, determining whether each value of the channel quality indicators is lower than a specific reference value, or determining whether each value of the channel quality indicators is contained in a specific range. Further, results of the logical combination may be combined by at least one combining method of another logical combination, the ordered combination, the difference/ratio combination, the comparison combination, the selection combination, the weighted combination, and the parameter normalization combination.

As one exemplary embodiment, when the terminal which is connected to three base stations obtains a downloading time as a channel quality indicator from each of the three base stations, a downloading time for a first base station is 60 sec, a downloading time for a second base station is 90 sec, and a downloading time for a third base station is 30 sec, the downloading times for three base stations are logically combined and a result that the first base station and the second base station are false and the third base station is true with respect to a condition which has a downloading time which is shorter than a reference time of 50 sec is created as another channel quality indicator and the region monitoring is performed using the channel quality indicator.

⑦ Parameter Normalization Combination

The parameter normalization combination which normalizes values of different types of channel quality indicators for at least two base stations which are currently connected into one parameter and combines the channel quality indicators may be performed. In this case, the parameter normalization combination may be performed by various methods of normalizing values of different types of channel quality indicators into one parameter of obtained channel quality indicator parameters or converting values of different types of channel quality indicators into another parameter. Further, a result of the parameter normalization combination may be combined by at least one combining method of another parameter normalization combination, the ordered combination, the difference/ratio combination, the comparison combination, the selection combination, the weighted combination, and the logical combination.

As one exemplary embodiment, when the terminal which is connected to three base stations obtains 15 dB of an SINR for a first base station, 12 of CQI for a second base station, and 10 dB of SINR for a third base station as channel quality indicators from the three base stations, the values of the channel quality indicators for three base stations are parameter-normalized by SINR to convert 13 of CQI for the second base station is 16 dB of SNR, so that 15 dB of the SINR for the first base station, 16 dB of the SINR for the second base station, and 10 dB of the SINR for the third base station are created as another channel quality indicators and the region monitoring is performed using the channel quality indicators.

The region rescanning step will be specifically described.

The region rescanning step is a step in which a terminal searches at least one base station and measures a channel quality between the searched at least one base station and the terminal. When the base stations are not synchronized, the terminal may perform synchronization with the base stations and then perform searching and channel quality measuring.

1) The terminal performs the region rescanning on base stations which are included in a neighbor list which is provided from the base station.

The base station may obtain information on neighbor base stations and periodically updates the information. The base station configures the information on neighbor base stations as the neighbor list and provides the neighbor list to the terminal through a system information message or through a region rescanning control message.

As one exemplary embodiment, when the terminal receives a region rescanning control message including a neighbor list in which 20 base stations of first base station to twentieth base station are included, the terminal measures channel qualities for 20 base stations which are included in the neighbor list to perform the region rescanning and provides the region rescanning results for 20 base stations to the base stations.

2) The terminal may perform the region rescanning on at least one base station, which is capable of performing CoMP transmission to the terminal, in the neighbor list which is provided by the base station.

The terminal does not perform the region rescanning on all base stations included in the neighbor list which is provided by the base station but perform the region rescanning only on a part of base stations which is located near the terminal and is capable of performing CoMP transmission to the terminal so that a region rescanning time may be shortened and unnecessary power consumption of the terminal may be reduced. Such a region rescanning method is called CoMP scanning.

As one exemplary embodiment, when the terminal receives a region rescanning control message including a neighbor list in which 20 base stations of first base station to twentieth base station are included, the terminal measures channel qualities for four adjacent base stations among 20 base stations which are included in the neighbor list to perform the CoMP scanning and provides the CoMP scanning results for four base stations to the base stations.

The terminal which performs the CoMP scanning may provide the CoMP scanning result to at least one base station which is currently connected so that the base station redecides the region of the terminal or the terminal may autonomously redecide the region of own terminal using the CoMP scanning result.

When the base stations are not synchronized, the terminal may perform synchronization with the base stations and then perform searching and channel quality measuring.

When the base stations are not synchronized, the terminal performs the searching and the channel quality measuring while performing the synchronization with the base stations. As one exemplary embodiment, when the terminal performs the region rescanning on three base stations, the terminal measures a channel quality for a first base station after being synchronized with the first base station and then measures a channel quality for a second base station after being synchronized with the second base station. Finally, the terminal measures a channel quality for a third base station after being synchronized with the first base station.

When the base stations are not synchronized, the terminal performs synchronization with one of the base stations and performs searching and channel quality measuring. As one exemplary embodiment, when the terminal performs the region rescanning on three base stations, the terminal is synchronized with the first base station having the shortest transmission delay among three base stations and then measures the channel qualities for the first base station, the second base station, and the third base station at the same time.

The region redecision will be specifically described.

The region redecision step is a step of redeciding a region where a terminal is located, using the region rescanning result and a base station may initiatively perform the region redecision or the terminal may autonomously perform the region redecision.

1) The base station may initiatively redecide a region where a terminal to which a service is provided is located.

The base station receives the region rescanning result from the terminal to which a service is provided to redecide the region where the terminal is located.

As one exemplary embodiment, when as the region rescanning result which is received by a first base station, which is currently connected to the terminal, from the terminal, a CQI for the first station is 8, a CQI for a second base station is 7, a CQI for a third base station is 4, and a CQI for a fourth base station is 3, the first base station redecides the region of the terminal as a boundary region B12 of the first base station and the second base station.

When region shift of the terminal is decided as the region redecision result of the terminal, a CoMP connection reconfiguration step is performed through CoMP access connection establishment with the terminal and CoMP establishment and releasing with another base stations.

2) The terminal may autonomously redecide a region where the terminal is located.

The terminal redecides the region where the terminal is located using the region rescanning result. When the region shift of the terminal is decided as the region redecision result of the terminal, the terminal requests the CoMP establishment to at least one base station which is currently connected.

As one exemplary embodiment, when as a result of the region rescanning performed by a terminal which is currently connected to the first base station, an SNR for the first station is 20 dB, an SNR for the second base station is 7 dB, an SNR for the third base station is 5 dB, and an SNR for the fourth base station is 3 dB, the terminal redecides the region as a center region C1 of the first base station.

When the terminal autonomously performs the region redecision, the region where the terminal is located is redecided using a channel quality which is measured by itself so that exact region redecision may be allowed.

Further, when the terminal monitors the region and region shift is suspected by the region monitoring, the terminal autonomously performs the region rescanning and then performs the region redecision. As described above, when the terminal autonomously performs all the region monitoring step, the region rescanning step, and the region redecision step, signaling overhead for exchanging control messages of providing the region scanning result, requesting the region rescanning, and controlling the region rescanning between the terminal and the at least one base station which is currently connected to the terminal may be reduced.

In this case, the terminal transmits a CoMP reestablishment request message including the region redecision result to the base station so that the base station performs the CoMP connection reconfiguration step.

The CoMP connection reconfiguration step will be specifically described.

This step is a step of reconfiguring connection between the terminal and the base stations in accordance with the region redecision result. The CoMP connection reconfiguration step includes a CoMP access connection establishment step and CoMP establishment and/or releasing step.

The CoMP access connection establishment step is a step of reconfiguring connection between the terminal and the base station and includes a step of transmitting, by the base station, a connection reconfiguration message to the terminal and a step of transmitting, by the terminal, a connection reconfiguration completed message to the base station as a response therefor.

The CoMP establishment step is a step for changing CoMP connection establishment with the terminal or establishing the CoMP connection or releasing the CoMP connection and includes a step of transmitting, by at least one base station which is currently connected to the terminal, a CoMP establishment request message to another at least one base station and a step of transmitting, by another at least one base station, a CoMP establishment response message to the at least one base station which is currently connected to the terminal. The CoMP releasing step includes a step of transmitting, by at least one base station which is currently connected to the terminal, a CoMP releasing request message to another at least one base station which is being CoMP connected with the terminal after completing the CoMP access connection establishment between the terminal and the base station and a step of transmitting, by another at least one base station which is being CoMP connected with the terminal a CoMP releasing response message to the at least one base station which is currently connected to the terminal, as a response therefor.

1) The base station may perform the region monitoring during the CoMP connection reconfiguration step.

The base station may perform the region monitoring while performing the CoMP connection reconfiguration. By doing this, the base station may monitor that the terminal moves to another region even during the CoMP connection reconfiguration step.

Specifically, the base station may perform the region monitoring even during the CoMP access connection establishment step.

Figure 6:
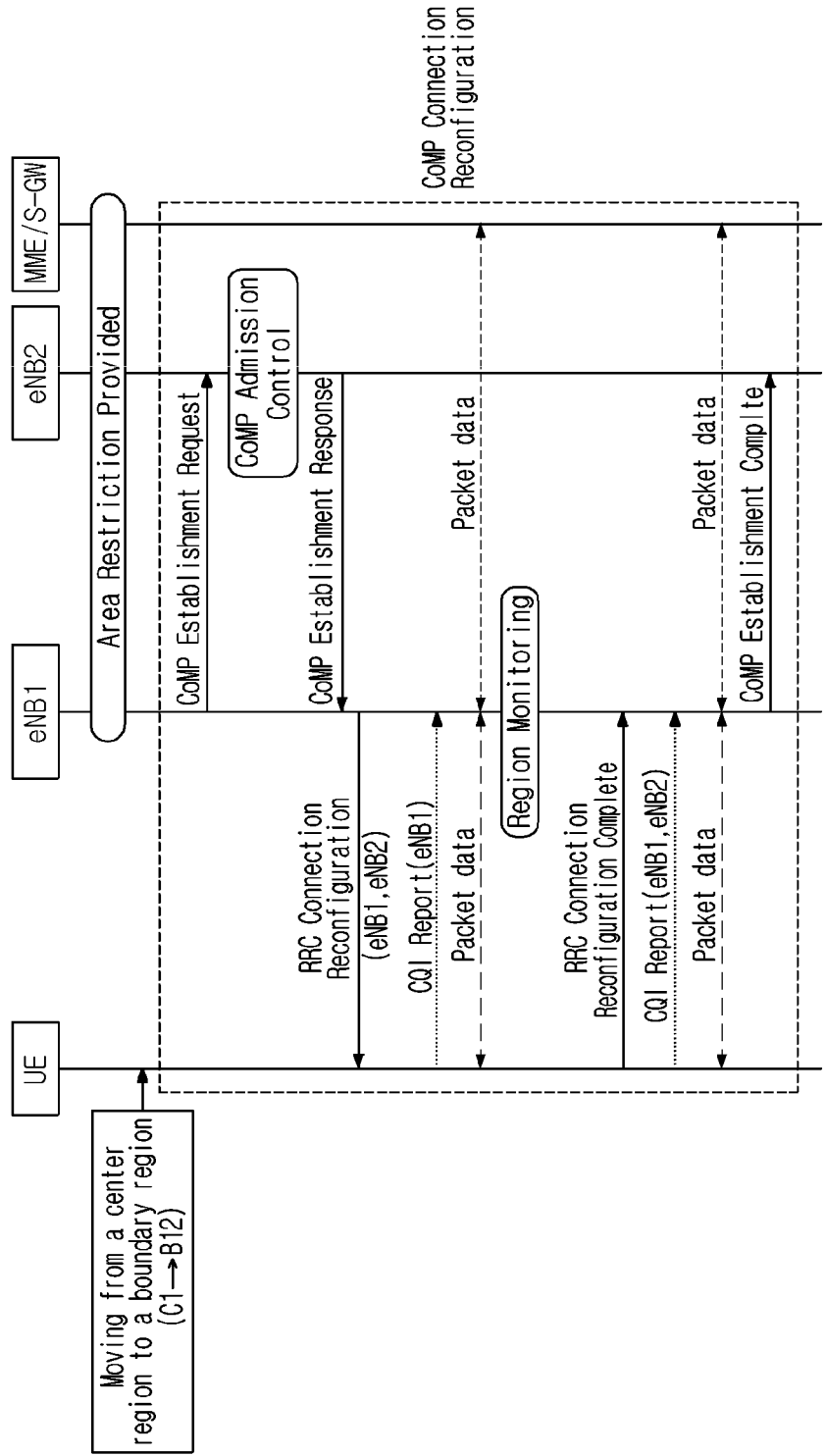
FIG. 6 is a view illustrating a part of an inter-region handover procedure in which a base station performs region monitoring during a CoMP connection reconfiguration step according to an exemplary embodiment of the present invention.

FIG. 6 is a view illustrating a part of an inter-region handover procedure in which a base station performs region monitoring during a CoMP connection reconfiguration step according to an exemplary embodiment of the present invention.

Referring to FIG. 6, in the case where the terminal moves from the center region C1 of the first base station to the boundary region B12 of the first base station and the second base station so that additional connection establishment with the second base station is required, the first base station exchanges the CoMP establishment request message and the CoMP establishment response message with the second base station to perform the CoMP connection establishment and then the first base station transmits the CoMP access connection reconfiguration message to the terminal. Even during this step, the first base station performs the region monitoring using a CQI report message which is received from the terminal so that the base station performs the region monitoring during the CoMP connection reconfiguration step, specifically, during the CoMP access connection establishment step.

2) The terminal may perform the region monitoring even during the CoMP connection reconfiguration step.

The terminal may autonomously perform the region monitoring for own terminal while performing the CoMP connection reconfiguration. By doing this, the terminal may monitor own movement to another region even during the CoMP connection reconfiguration step.

Specifically, the terminal may perform the region monitoring during the CoMP access connection establishment step.

Figure 7:
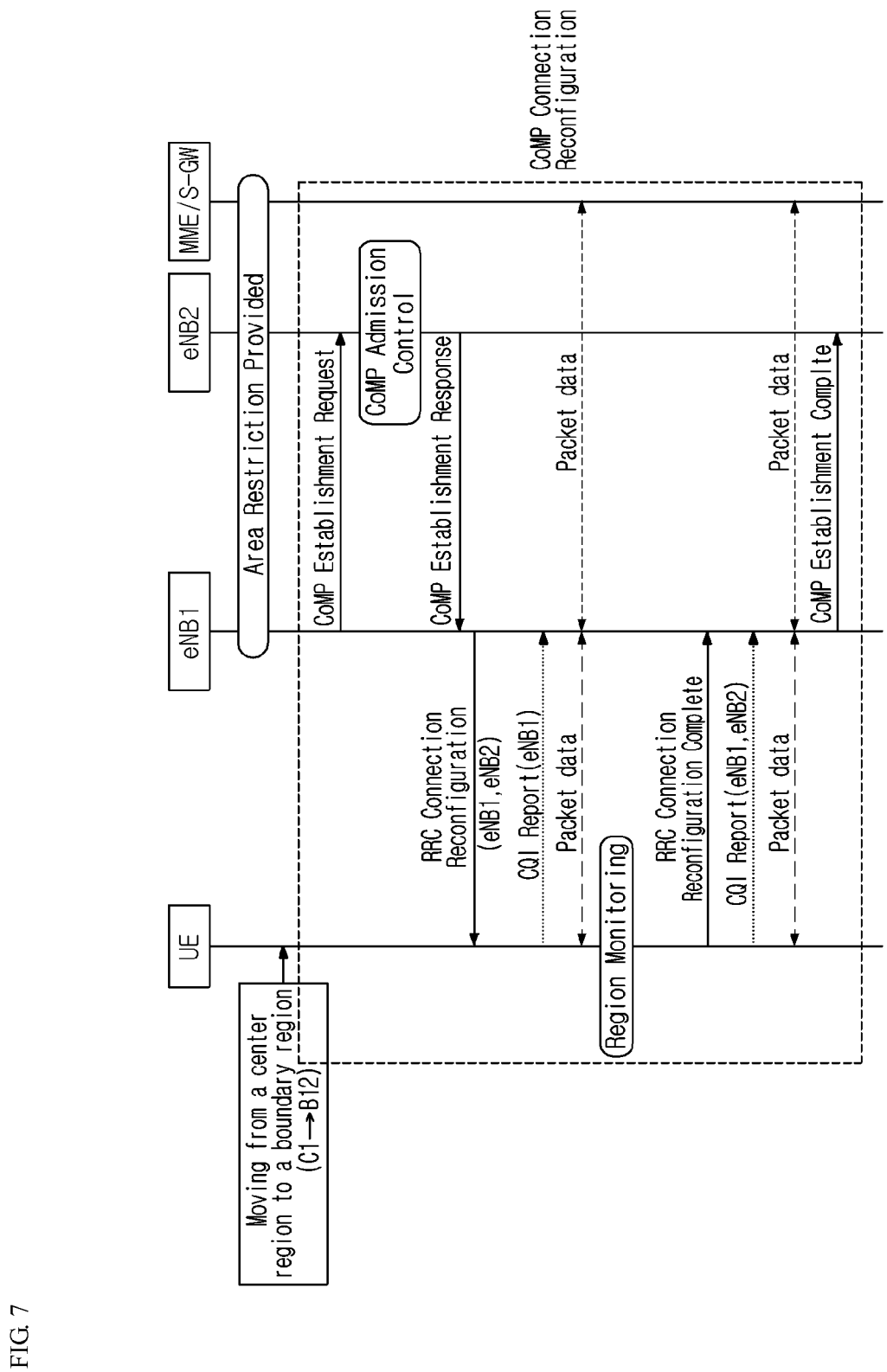
FIG. 7 is a view illustrating a part of an inter-region handover procedure in which a terminal monitors a region even during a CoMP connection reconfiguration step according to an exemplary embodiment of the present invention.

FIG. 7 is a view illustrating a part of an inter-region handover procedure in which a terminal performs region monitoring even during a CoMP connection reconfiguration step according to an exemplary embodiment of the present invention.

Referring to FIG. 7, in the case where the terminal moves from the center region C1 of the first base station to the boundary region B12 of the first base station and the second base station so that additional CoMP connection establishment with the second base station is required, the first base station exchanges the CoMP establishment request message and the CoMP establishment response message with the second base station to perform the CoMP connection establishment and then the first base station transmits a CoMP access connection reconfiguration message to the terminal. The terminal which receives the CoMP access connection reconfiguration message performs the region monitoring and provides a CQI report message and a connection reconfiguration completed message to the first base station to notify that the CoMP access connection establishment for the CoMP connection is completed. As a result of performing the region monitoring by the terminal, if the region shift is suspected, the terminal transmits a region rescanning request message to the base station to allow the base station to perform the region rescanning step or the terminal may autonomously perform the region rescanning By doing this, the terminal may perform the region monitoring even during the CoMP connection reconfiguration step, specifically, during the CoMP access connection establishment step.

3) The base station may perform the region redecision even during the CoMP connection reconfiguration step.

The terminal may move a region even while performing the CoMP connection reconfiguration step between the terminal and the base station so that the base station may receive the region rescanning result from the terminal even during the CoMP connection reconfiguration step to perform the region redecision.

Specifically, the base station may perform the region redecision even during the CoMP access connection establishment step.

When the terminal moves during the CoMP connection reconfiguration step, the service connectivity of the terminal may be secured by quick response and ping-pong phenomenon may be solved.

Figure 8:
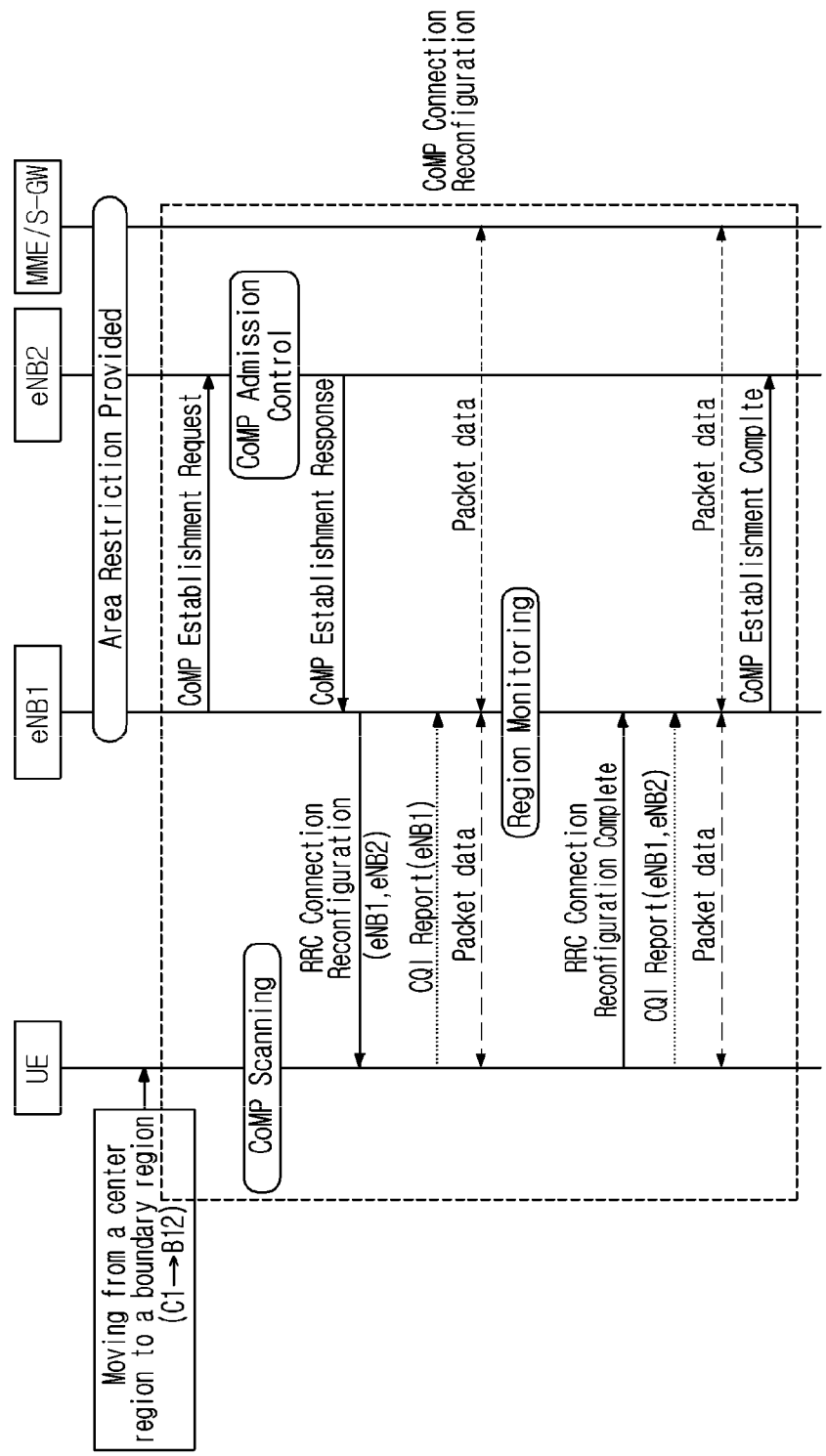
FIG. 8 is a view illustrating a part of an inter-region handover procedure in which a base station performs region redecision even during a CoMP connection reconfiguration step according to an exemplary embodiment of the present invention.

FIG. 8 is a view illustrating a part of an inter-region handover procedure in which a base station performs region redecision even during a CoMP connection reconfiguration step according to an exemplary embodiment of the present invention.

Referring to FIG. 8, in the case where the terminal moves from the center region C1 of the first base station to the boundary region B12 of the first base station and the second base station so that additional CoMP connection establishment with the second base station is required, the first base station exchanges the CoMP establishment request message and the CoMP establishment response message with the second base station to perform the CoMP connection establishment and then the first base station transmits the CoMP access connection reconfiguration message to the terminal. In this case, the terminal may provide a CoMP scanning report message including a CoMP scanning result to the first base station even during the CoMP connection reconfiguration step. The first base station which receives the CoMP scanning result from the terminal may redecide the region of the terminal even during the CoMP connection reconfiguration, using the CoMP scanning result. When it is decided that the region of the terminal is changed as a result of the region redecision of the first base station, the CoMP connection reconfiguration step may be performed on a newly decided region. By doing this, the base station may perform the region redecision even during the CoMP connection reconfiguration step, specifically, during the CoMP access connection establishment step.

4) The terminal may perform the region redecision even during the CoMP connection reconfiguration step.

The terminal may move a region even while performing the CoMP connection reconfiguration step between the terminal and the base station so that the terminal may autonomously perform the region redecision even during the CoMP connection reconfiguration step using the region rescanning result.

Specifically, the terminal may perform the region redecision even during the CoMP access connection establishment step.

When the terminal moves during the CoMP connection reconfiguration step, the service connectivity of the terminal may be secured by quick response and ping-pong phenomenon may be solved.

Figure 9:
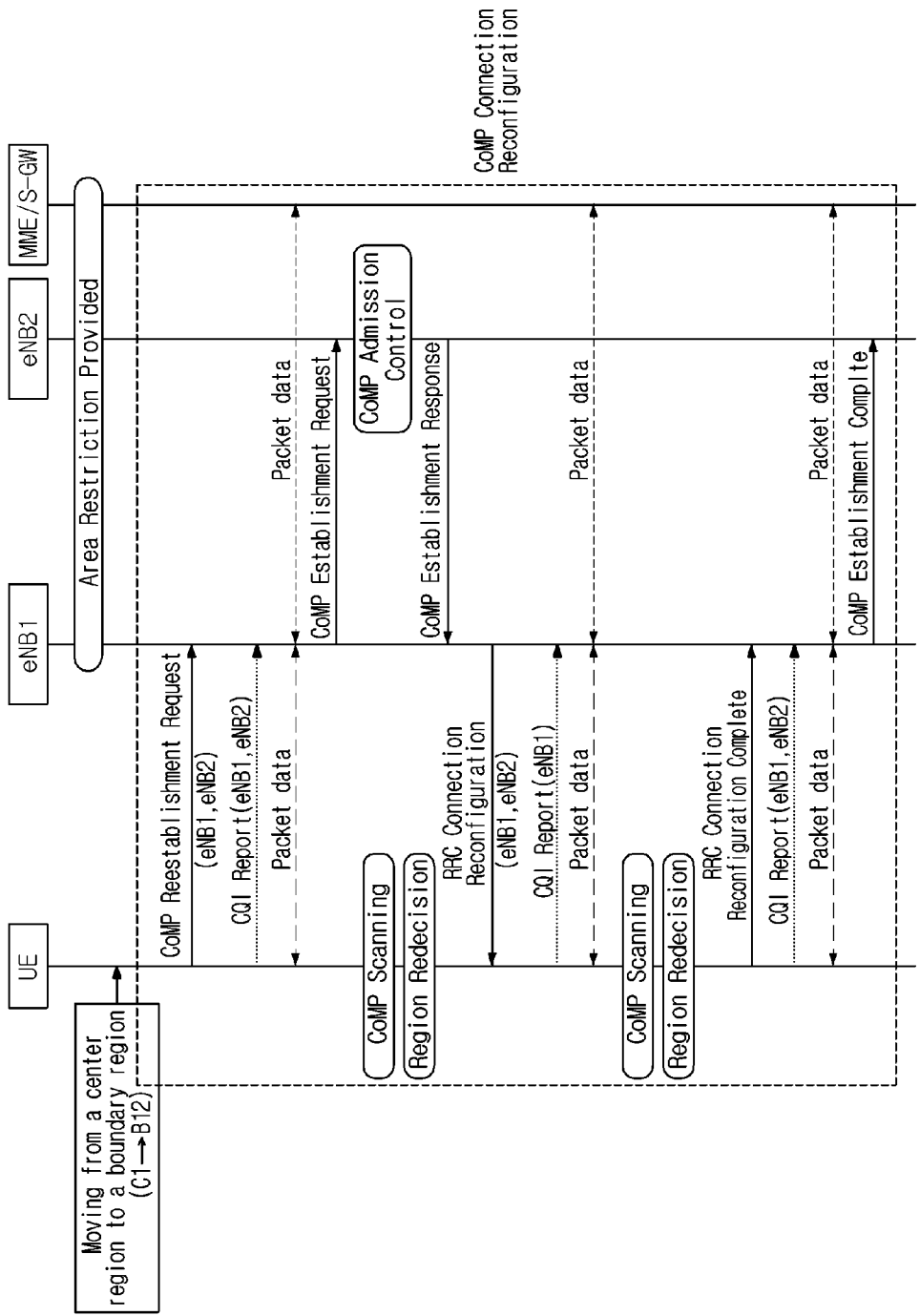
FIG. 9 is a view illustrating a part of an inter-region handover procedure in which a base station performs region redecision during a CoMP connection reconfiguration step according to an exemplary embodiment of the present invention.

FIG. 9 is a view illustrating a part of an inter-region handover procedure in which a base station performs region redecision during a CoMP connection reconfiguration step according to an exemplary embodiment of the present invention.

Referring to FIG. 9, in the case where the terminal moves from the center region C1 of the first base station to the boundary region B12 of the first base station and the second base station so that additional connection establishment with the second base station is required, the first base station, which receives a CoMP reestablishment request message from the terminal, exchanges the CoMP establishment request message and the CoMP establishment response message with the second base station to perform the CoMP connection establishment and then the first base station transmits the CoMP access connection reconfiguration message to the terminal. In this case, the terminal performs the CoMP scanning even during the CoMP connection reconfiguration step and performs the region redecision using the result thereof. Further, before transmitting the CoMP access connection reconfiguration completed message, the terminal performs the CoMP scanning and performs the region redecision using the result thereof. When the region shift of the terminal is decided as a result of the region redecision, the terminal transmits the CoMP reestablishment request message for a newly decided region to the first base station to allow the first base station to perform the CoMP connection reconfiguration step for the newly decided region. By doing this, the terminal may perform the region redecision even during the CoMP connection reconfiguration step, specifically, during the CoMP access connection setting step.

5) The terminal may perform the CoMP connection reconfiguration step for CoMP connection establishment.

When the terminal moves to a region for connection establishment with at least one base station different from the at least one base station which is currently connected, the terminal performs the following CoMP connection reconfiguration step after performing the region redecision.

The base station transmits the CoMP establishment request message to another at least one base station after the region redecision, and the base station transmits the CoMP access connection reconfiguration message to the terminal after receiving the CoMP establishment response message from the another at least one base station.

Figure 10:
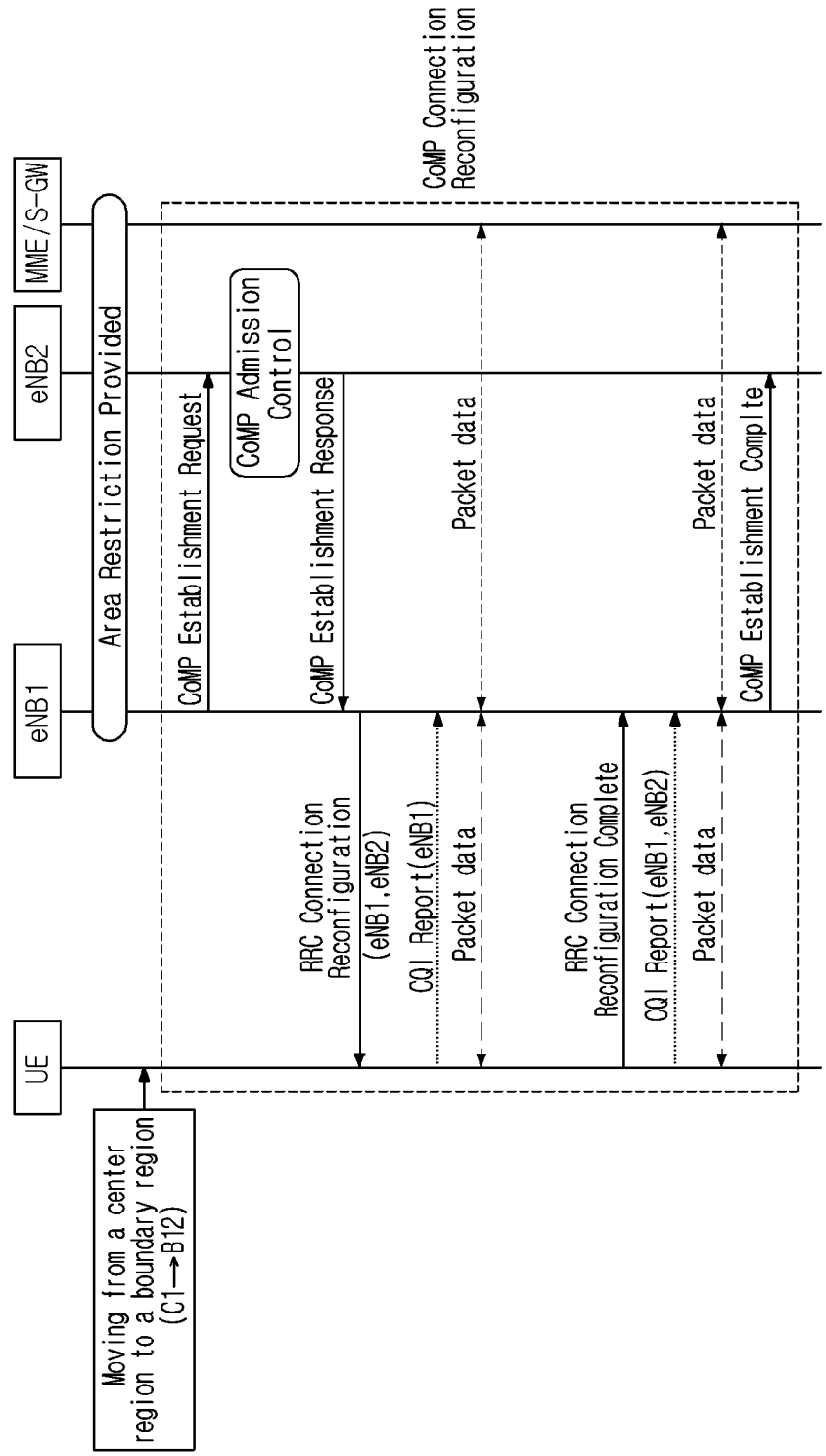
FIG. 10 is a view illustrating a part of an inter-region handover procedure which includes a CoMP connection reconfiguration step for CoMP connection establishment according to an exemplary embodiment of the present invention.

The base station transmits the CoMP establishment request message to another at least one base station after the region redecision and the base station transmits a CoMP access connection reconfiguration message to the terminal after receiving a CoMP establishment response message from the another at least one base station, and transmits a CoMP establishment completed message to the another at least one base station after receiving a CoMP access connection reconfiguration completed message from the terminal FIG. 10 is a view illustrating a part of an inter-region handover procedure which includes a CoMP connection reconfiguration step for CoMP connection establishment according to an exemplary embodiment of the present invention.

Referring to FIG. 10, when the terminal moves from the center region C1 of the first base station to the boundary region B12 of the first base station and the second base station, the first base station transmits the CoMP establishment request message to the second base station after the region redecision, the first base station transmits the CoMP access connection reconfiguration message to the terminal after receiving the CoMP establishment response message from the second base station, and transmits the CoMP establishment completed message to the second base station after receiving the CoMP access connection reconfiguration completed message from the terminal.

6) The terminal may perform the CoMP connection reconfiguration step for CoMP connection release.

When the terminal moves to a region where connection with at least one base station among the at least one base station which is currently connected is released, the terminal performs the following CoMP connection reconfiguration step after performing the region redecision.

The base station transmits a connection reconfiguration message to the terminal after the region redecision, transmits a CoMP release request message to another at least one base station after receiving the CoMP access connection reconfiguration completed message from the terminal, and receives a CoMP release response message from another at least one base station.

Figure 11:
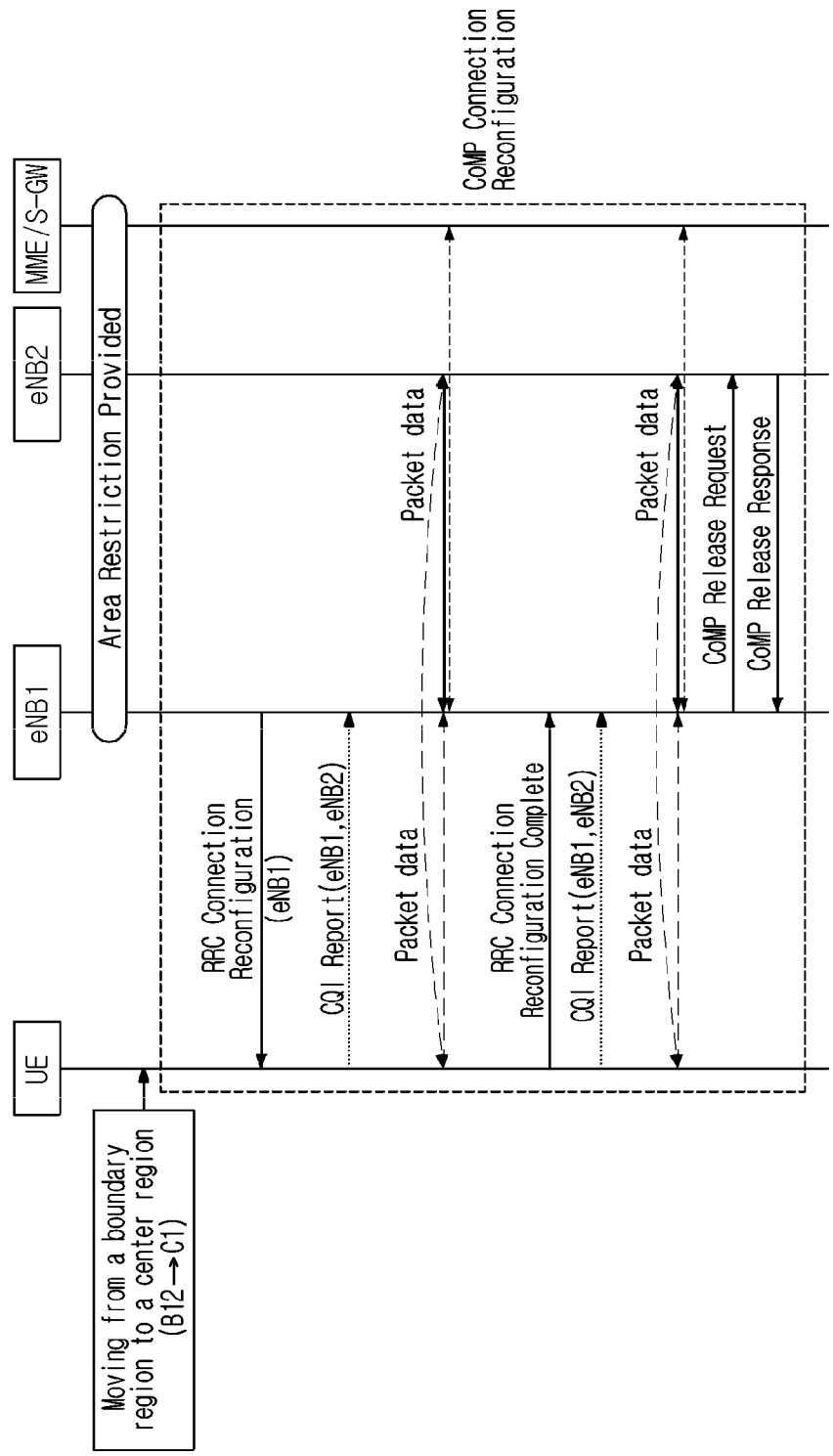
FIG. 11 is a view illustrating a part of an inter-region handover procedure which includes a CoMP connection reconfiguration step for CoMP connection release according to an exemplary embodiment of the present invention.

FIG. 11 is a view illustrating a part of an inter-region handover procedure which includes a CoMP connection reconfiguration step for CoMP connection release according to an exemplary embodiment of the present invention.

Referring to FIG. 11, when the terminal moves from the boundary region B12 of the first base station and the second base station to the center region C1 of the first base station, after the region redecision of the first base station, the first base station transmits a connection reconfiguration message to the terminal and receives the CoMP access connection reconfiguration completed message from the terminal, and then the first base station transmits a CoMP release request message to the second base station and receives a CoMP release response message from the second base station.

7) The CoMP connection reconfiguration step for simultaneously performing the CoMP connection establishment and the CoMP connection release may be performed.

When the terminal moves to a region where the terminal needs to establish additional connection with at least one base station different from the at least one base station which is currently connected to the terminal and also release the connection with at least one base station among the at least one base station which is currently connected, the terminal performs the following CoMP connection reconfiguration step after the region redecision.

After the region redecision, a CoMP connection leading base station which is currently connected to the terminal transmits the CoMP establishment request message to at least one new base station and the CoMP connection leading base station transmits the CoMP access connection reconfiguration message to the terminal after receiving the CoMP establishment response message from the at least one new base station, transmits the CoMP establishment completed message to the at least one now base station after receiving the CoMP access connection reconfiguration completed message from the terminal, transmits a CoMP release request message to another at least one base station among the currently connected base stations and receives a CoMP release response message from another at least one base station among the currently connected base stations.

Figure 12:
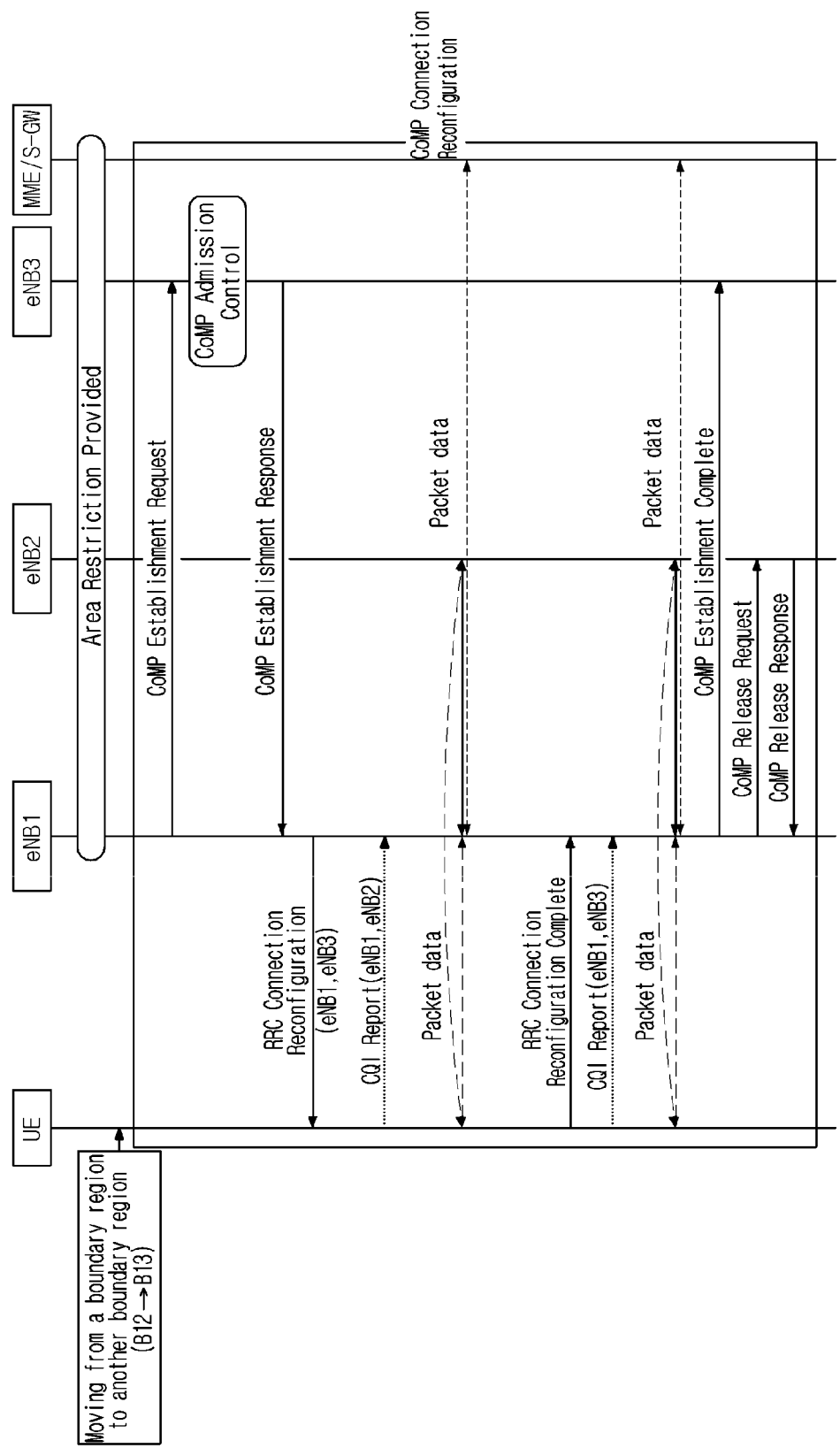
FIG. 12 is a view illustrating a part of an inter-region handover procedure which includes a CoMP connection reconfiguration step to simultaneously perform CoMP connection establishment and CoMP connection release according to an exemplary embodiment of the present invention.

FIG. 12 is a view illustrating a part of an inter-region handover procedure which includes a CoMP connection reconstitution step to simultaneously perform CoMP connection establishment and CoMP connection release according to an exemplary embodiment of the present invention.

Referring to FIG. 12, when the terminal moves from the boundary region B12 of the first base station and the second base station to the boundary region B13 of the first base station and the third base station, the first base station transmits the CoMP establishment request message to the third base station after the region redecision of the terminal, the first base station transmits the CoMP access connection reconfiguration message to the terminal after receiving the CoMP establishment response message from the third base station, and transmits the CoMP establishment completed message to the third base station after receiving the CoMP access connection reconfiguration completed message from the terminal, transmits the CoMP release request message to the second base station and receives the CoMP release response message from the second base station.

8) The CoMP connection reconfiguration may be performed by setting a time.

During the CoMP connection reconfiguration step according to the exemplary embodiment of the present invention, the current connection configuration may be maintained for a predetermined time by setting a time or the CoMP scanning is performed for a predetermined time so that frequent movement of the terminal or the ping-pong phenomenon may be resolved.

① When the region shift of the terminal is decided, the base station may perform the region monitoring for a first predetermined time.

When the region shift of the terminal is decided, the base station may perform the region monitoring of the terminal for a first predetermined time for the purpose of quick response for another region shift within a predetermined time. By doing this, the movement of the terminal to another region may be monitored for a predetermined time.

In this case, when the base station performs the region monitoring for the first predetermined time and the region shift of the terminal is suspected before the first predetermined time elapses, the base station transmits a region rescanning control message to the terminal to control the terminal to perform the region rescanning. When the region shift of the terminal is not suspected, the region monitoring is performed for the first predetermined time.

② When the region shift of the terminal is decided, the terminal may perform the region monitoring for the first predetermined time.

When the region shift of the terminal is decided, the terminal may monitor the region for the first predetermined time for the purpose of quick response for another region shift of the terminal within a predetermined time. By doing this, the movement of the terminal to another region may be monitored for a predetermined time.

In this case, when the terminal performs the region monitoring for the first predetermined time and the region shift of the terminal is suspected before the first predetermined time elapses, the terminal autonomously performs the region rescanning or transmits the region rescanning request message to the base station. When the region shift of the terminal is not suspected, the terminal performs the region monitoring for the first predetermined time.

③ When the region shift of the terminal is decided, the base station may perform the region redecision for the first predetermined time.

When the region shift of the terminal is decided, the base station may perform the region redecision of the terminal for the first predetermined time for the purpose of quick response for another region shift within a predetermined time. By doing this, the movement of the terminal to another region may be redecided for a predetermined time.

In this case, the base station receives a CoMP scanning result from the terminal for the first predetermined time and the base station redecides the region of the terminal using the CoMP scanning result which is received from the terminal.

④ When the region shift of the terminal is decided, the terminal may CoMP scanning for the first predetermined time.

When the region shift of the terminal is decided, the terminal may autonomously perform CoMP scanning for rescanning the region for the first predetermined time for the purpose of quick response for another region shift of the terminal within a predetermined time.

⑤ When the region shift of the terminal is decided, the terminal may perform the region redecision for the first predetermined time.

When the region shift of the terminal is decided, the terminal may autonomously perform the region redecision of the terminal for the first predetermined time for the purpose of quick response for another region shift within a predetermined time. By doing this, the movement to another region of the terminal may be redecided for a predetermined time.

⑥ When the region shift of the terminal is decided, the CoMP scanning and the region redecision may be performed for the first predetermined time.

When the region shift of the terminal is decided, the terminal may perform the CoMP scanning for the first predetermined time and autonomously perform the region redecision of the terminal using a CoMP scanning result, for the purpose of quick response for another region shift within a predetermined time. By doing this, the movement to another region of the terminal may be redecided for a predetermined time.

⑦ The terminal may continuously perform the CoMP scanning and the region redecision.

The terminal continuously performs the CoMP scanning and autonomously performs the region redecision of the terminal using the CoMP scanning result, there by exactly performing the region redecision and resolving the frequent movement and the ping-pong phenomenon.

When the region of the terminal is changed as a result of the region redecision, the terminal transmits the CoMP reestablishment request message including the region redecision result to the base station to allow the base station to perform the CoMP connection reconfiguration step. When the region of the terminal is not changed, the current connection configuration is maintained.

⑧ When the region shift of the terminal is decided, if another region shift of the terminal is decided before the first predetermined time elapses while maintaining the current connection configuration for the first predetermined time, the current connection configuration may be maintained again for a second predetermined time.

When the terminal moves to a region where the terminal needs to release the connection with at least one base station among at least one base station which is currently connected, after the region redecision, if the current connection configuration is maintained for the first predetermined time and then another region shift of the terminal is decided before the first predetermined time elapses, the current connection configuration may be maintained again for a second predetermined time. If another region shift of the terminal is not decided before the first predetermined time elapses, the CoMP connection reconfiguration step for the CoMP connection release is performed after the first predetermined time elapses.

⑨ When the region shift of the terminal is decided, the CoMP connection reconfiguration is performed for the first predetermined time and if the current connection configuration is maintained for the first predetermined time and then another region shift of the terminal is decided before the first predetermined time elapses, the current connection configuration may be maintained for the second predetermined time.

When the terminal moves to a region where the terminal needs to additionally establish the connection with at least one base station different from the at least one base station which is currently connected, after the region redecision, the CoMP connection reconfiguration for CoMP connection establishment is performed and if the current connection configuration is maintained for the first predetermined time and then another region shift of the terminal is decided before the first predetermined time elapses, the current connection configuration may be maintained for the second predetermined time. If another region shift of the terminal is not decided before the first predetermined time elapses, the current connection configuration is maintained after the first predetermined time elapses.

⑩ When the region shift of the terminal is decided, if the current connection configuration is maintained for the first predetermined time and then another region shift of the terminal is decided before the first predetermined time elapses, the CoMP connection reconfiguration may be performed for the second predetermined time.

⑪ When the region shift of the terminal is decided, if the region redecision is performed during the first predetermined time and another region shift of the terminal is decided before the first predetermined time elapses, the region redecision is performed for the second predetermined time.

⑫ When the terminal moves to a region where the terminal needs to release the connection with at least one base station among the at least one base station which is currently connected, after the region redecision, when at least one base station which is currently connected to the terminal maintains the current connection configuration for the first predetermined time and then at least one base station among the at least one base station which is currently connected to the terminal transmits a CoMP release request message to at least one base station which is supposed to release the connection after the first predetermined time elapses.

⑬ When the terminal moves to a region where the terminal needs to release the connection with at least one base station among the at least one base station which is currently connected, after the region redecision, the current connection configuration is maintained for the first predetermined time and then the base station transmits a CoMP access connection reconfiguration message for the CoMP connection release, to the terminal after the first predetermined time elapses.

The terminal according to the exemplary embodiment of the present invention moves to one region to another region and accordingly, the terminal and the base stations perform the region monitoring step, the region rescanning step, the region redecision step, the CoMP connection reconfiguration step. The following describes various inter-region movement scenarios of the terminal. However, this is only exemplary embodiments and it is obvious that other various inter-region movement scenarios of the terminal are also available.

Such various inter-region movement scenarios of the terminal will be described with reference to FIGS. 13 to 22.

Figure 13:
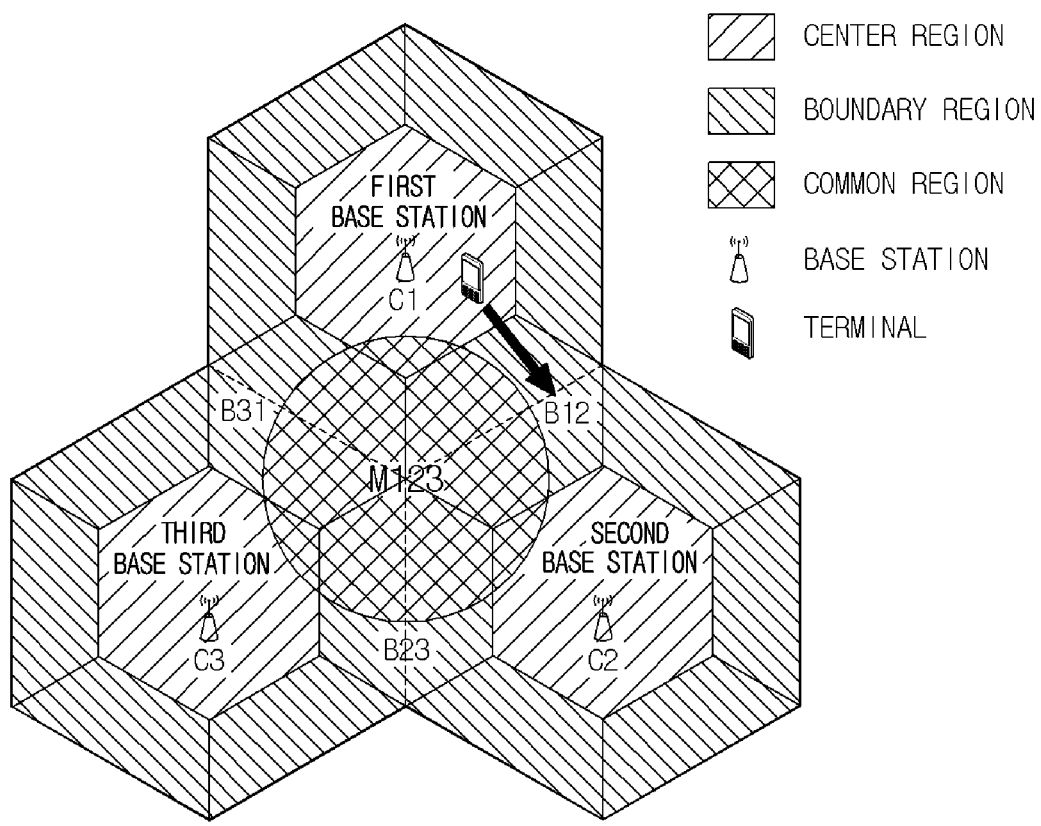
FIG. 13 is a first view illustrating an inter-region movement scenario of a terminal according to an exemplary embodiment of the present invention.
Figure 14:
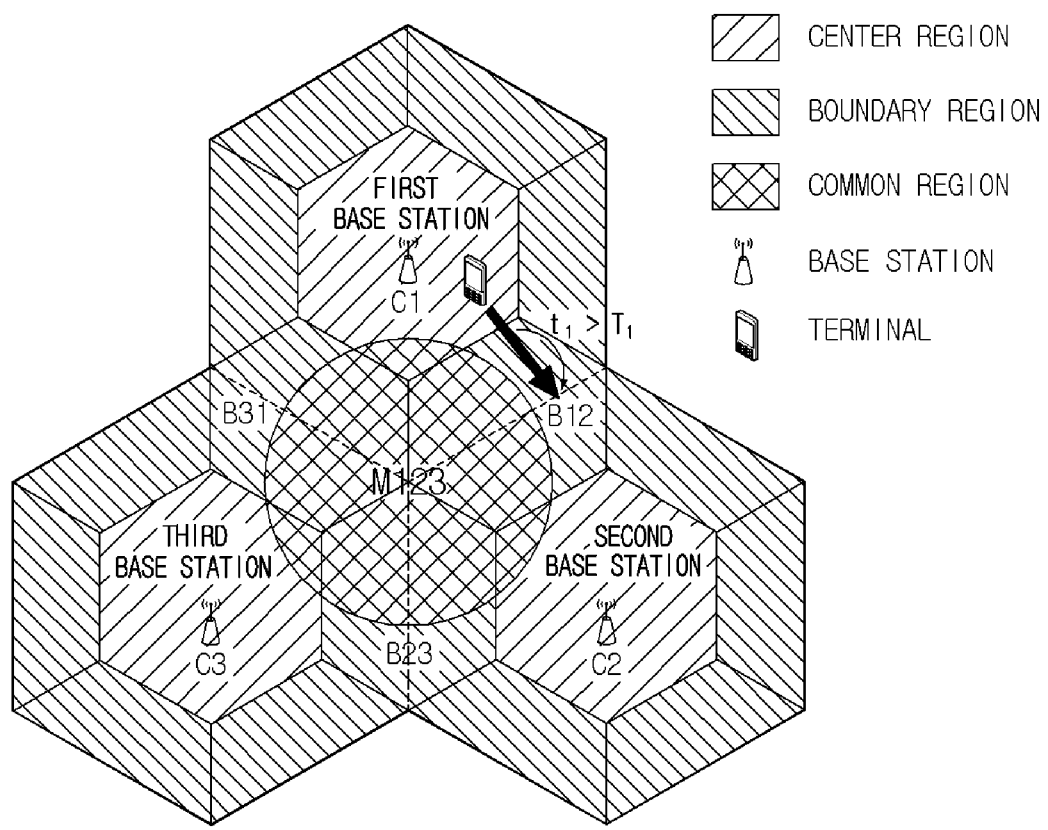
FIG. 14 is a second view illustrating an inter-region movement scenario of a terminal according to an exemplary embodiment of the present invention.
Figure 15:
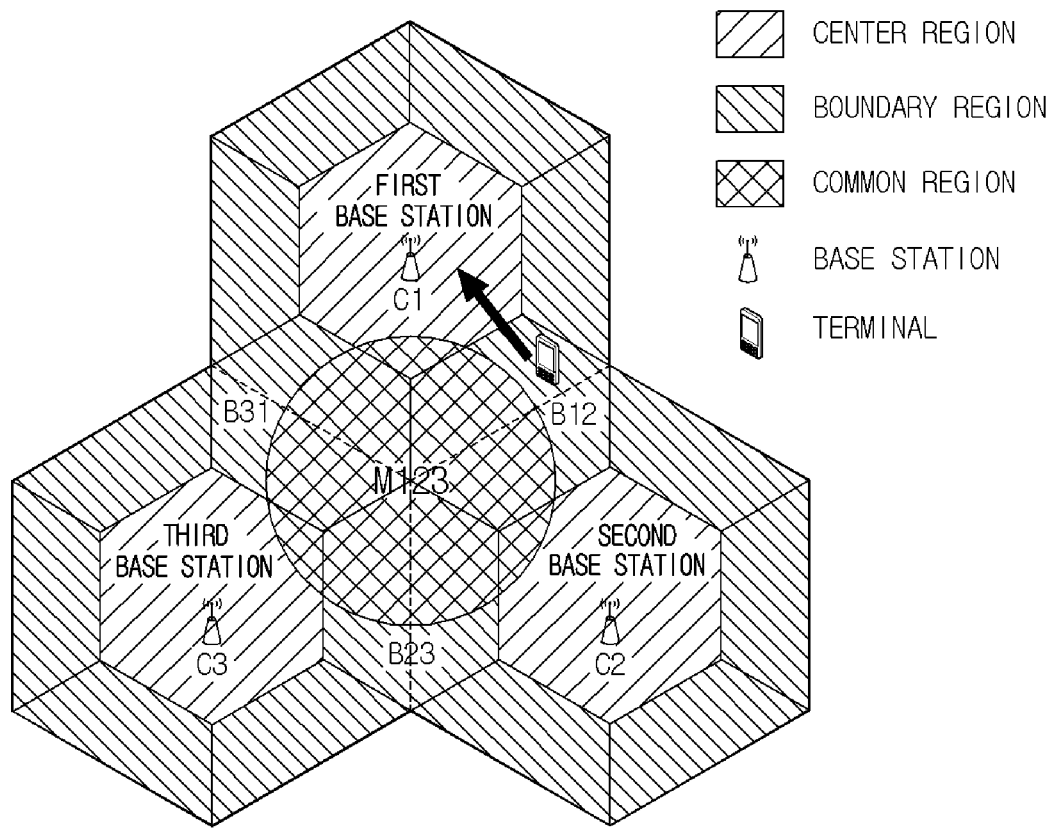
FIG. 15 is a third view illustrating an inter-region movement scenario of a terminal according to an exemplary embodiment of the present invention.
Figure 16:
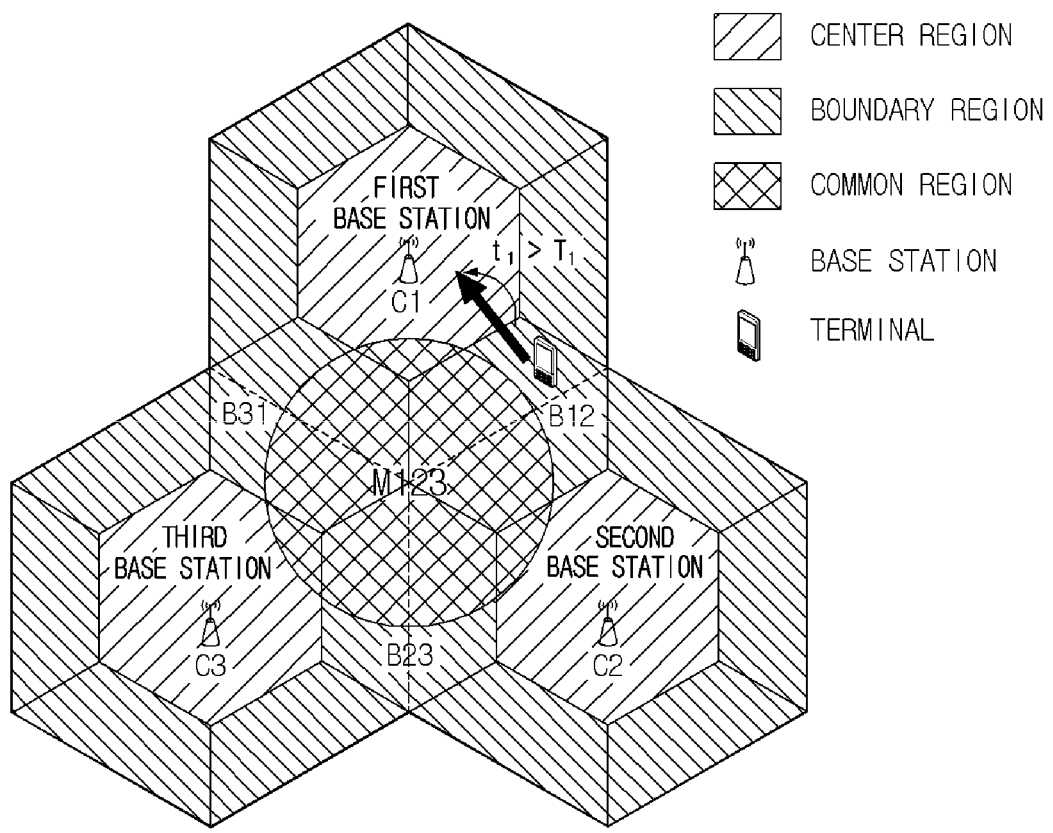
FIG. 16 is a fourth view illustrating an inter-region movement scenario of a terminal according to an exemplary embodiment of the present invention.
Figure 17:
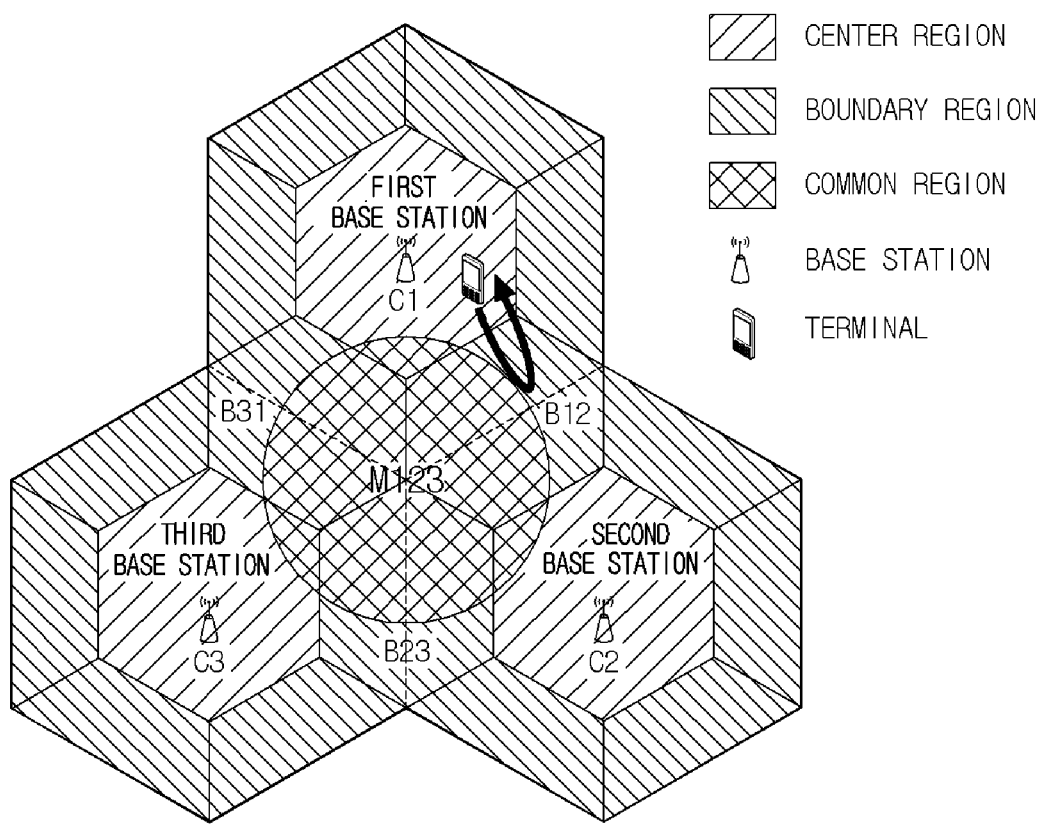
FIG. 17 is a fifth view illustrating an inter-region movement scenario of a terminal according to an exemplary embodiment of the present invention.
Figure 18:
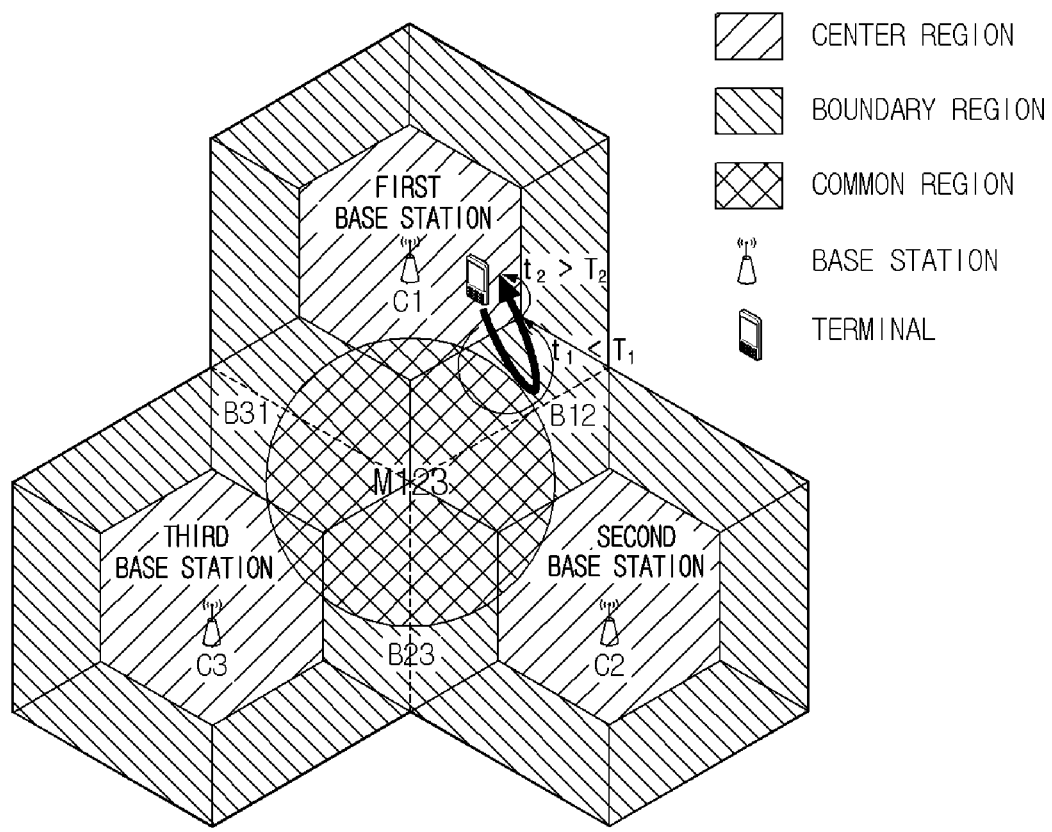
FIG. 18 is a sixth view illustrating an inter-region movement scenario of a terminal according to an exemplary embodiment of the present invention.
Figure 19:
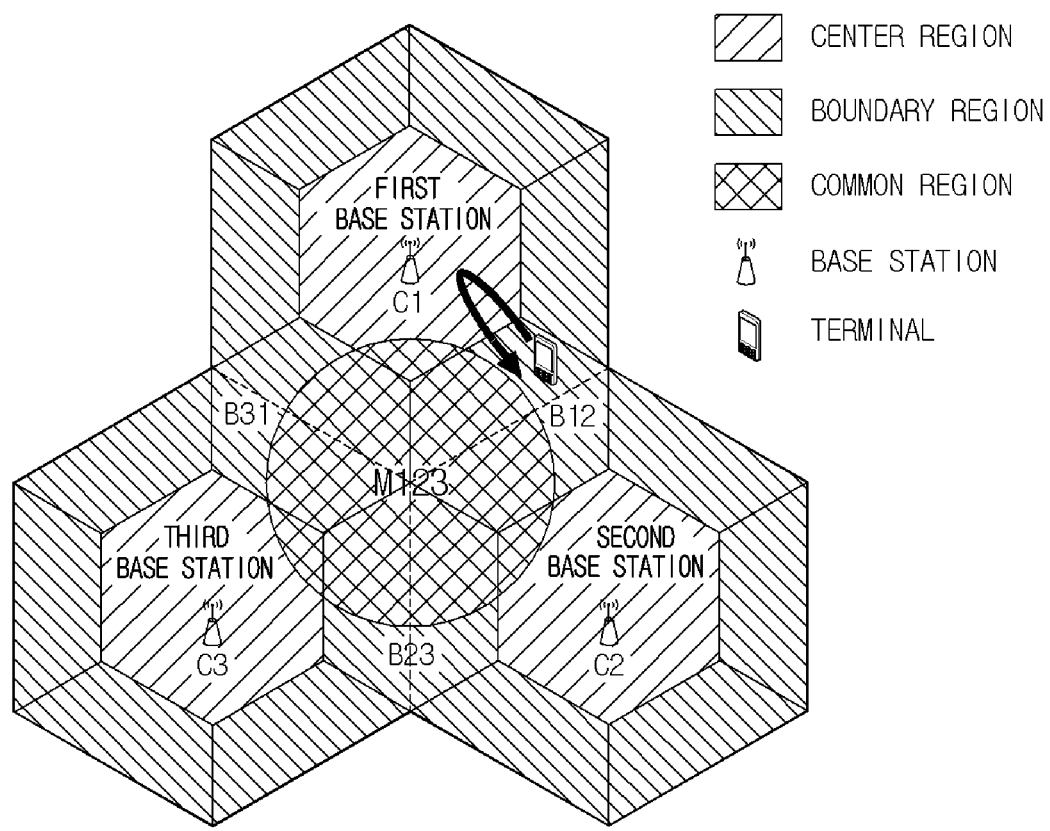
FIG. 19 is a seventh view illustrating an inter-region movement scenario of a terminal according to an exemplary embodiment of the present invention.
Figure 20:
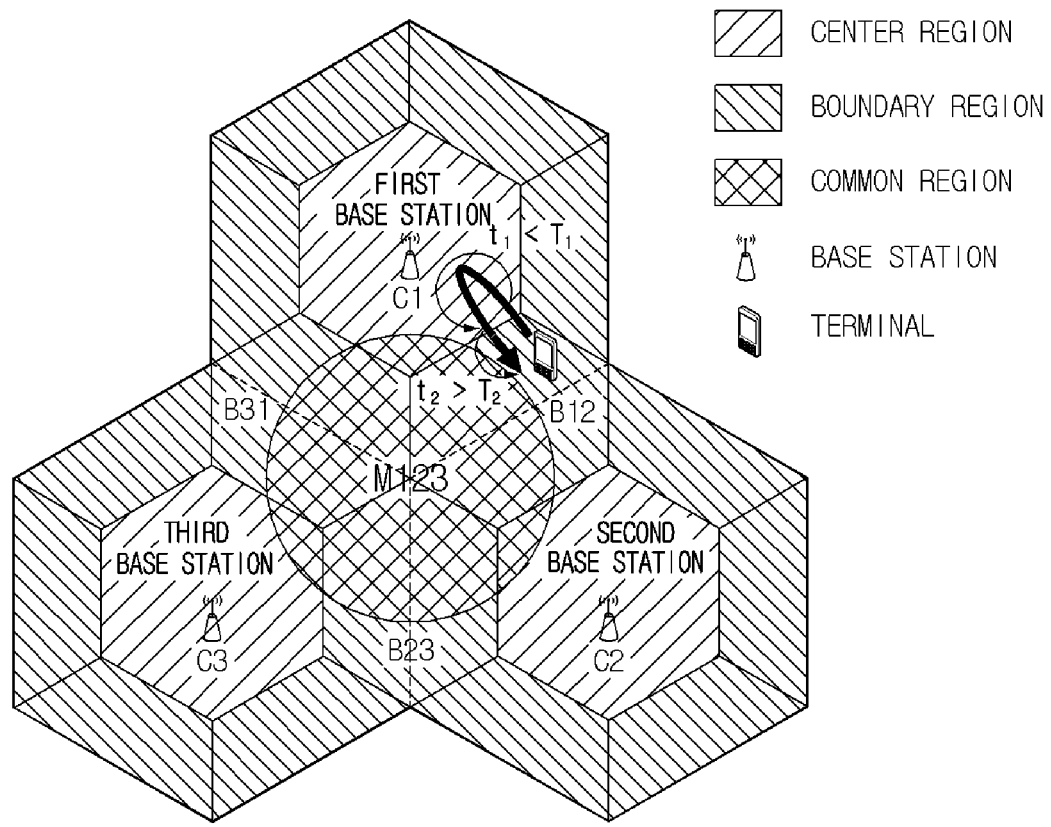
FIG. 20 is an eighth view illustrating an inter-region movement scenario of a terminal according to an exemplary embodiment of the present invention.
Figure 21:
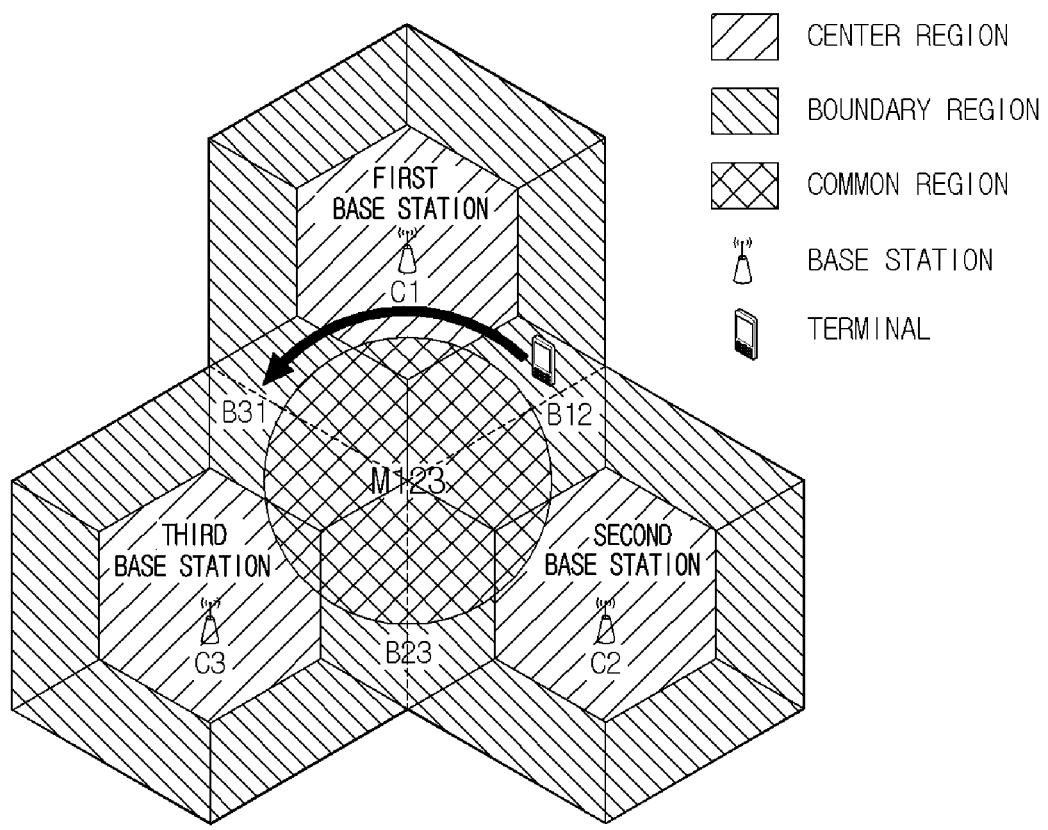
FIG. 21 is a ninth view illustrating an inter-region movement scenario of a terminal according to an exemplary embodiment of the present invention.
Figure 22:
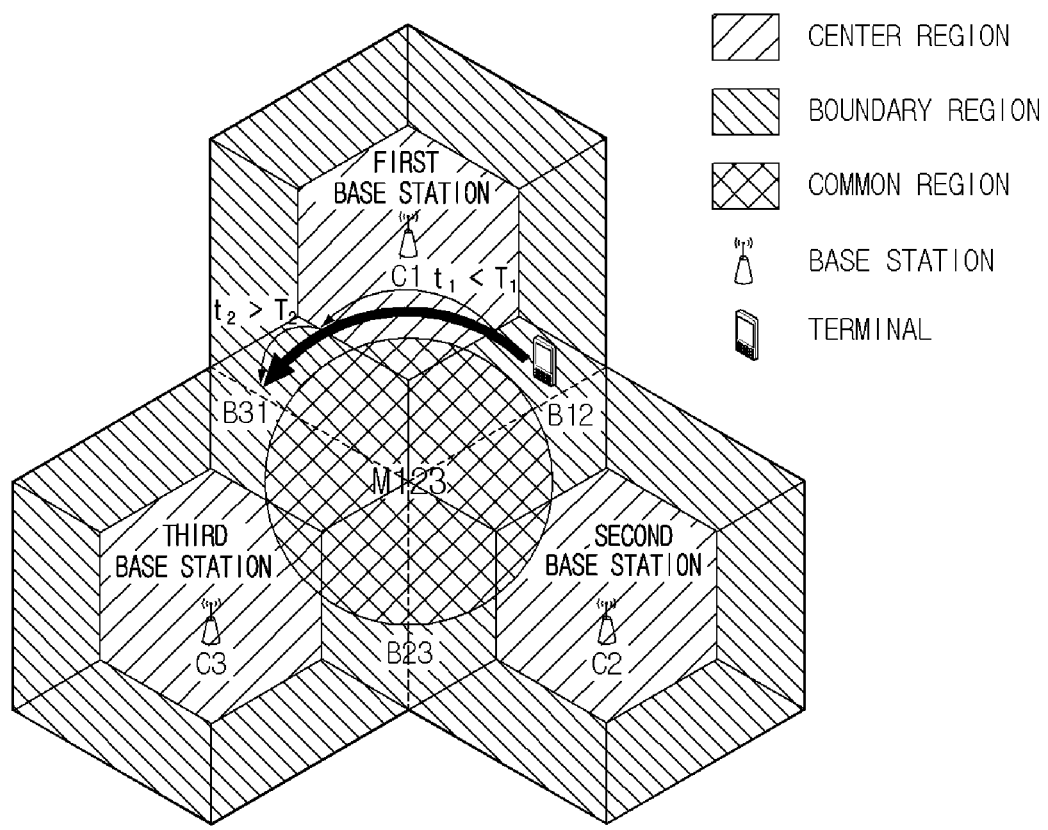
FIG. 22 is a tenth view illustrating an inter-region movement scenario of a terminal according to an exemplary embodiment of the present invention.

FIG. 13 is a first view illustrating an inter-region movement scenario of a terminal according to an exemplary embodiment of the present invention, FIG. 14 is a second view illustrating an inter-region movement scenario of a terminal according to an exemplary embodiment of the present invention, FIG. 15 is a third view illustrating an inter-region movement scenario of a terminal according to an exemplary embodiment of the present invention, FIG. 16 is a fifth view illustrating an inter-region movement scenario of a terminal according to an exemplary embodiment of the present invention, FIG. 17 is a fifth view illustrating an inter-region movement scenario of a terminal according to an exemplary embodiment of the present invention, FIG. 18 is a sixth view illustrating an inter-region movement scenario of a terminal according to an exemplary embodiment of the present invention, FIG. 19 is a seventh view illustrating an inter-region movement scenario of a terminal according to an exemplary embodiment of the present invention, FIG. 20 is an eighth view illustrating an inter-region movement scenario of a terminal according to an exemplary embodiment of the present invention, FIG. 21 is a ninth view illustrating an inter-region movement scenario of a terminal according to an exemplary embodiment of the present invention, and FIG. 22 is a tenth view illustrating an inter-region movement scenario of a terminal according to an exemplary embodiment of the present invention.

Referring to FIG. 13, in the case where a time is not set, when the terminal moves from the center region C1 to the boundary region B12, inter-region handover without setting the time may be performed.

Referring to FIG. 14, in the case where a time is set, when the terminal moves from the center region C1 to the boundary region B12, inter-region handover may be performed by setting the time.

Referring to FIG. 15, in the case where a time is not set, when the terminal moves from the boundary region B12 to the center region C1, inter-region handover without setting the time may be performed.

Referring to FIG. 16, in the case where a time is set, when the terminal moves from the boundary region B12 to the center region C1, inter-region handover may be performed by setting the time.

Referring to FIG. 17, in the case where a time is not set, when the terminal moves from the center region C1 to the boundary region B12 and then returns to the same center region C1, inter-region handover without setting the time may be performed.

Referring to FIG. 18, in the case where a time is set, when the terminal moves from the center region C1 to the boundary region B12 and then returns to the same center region C1, inter-region handover may be performed by setting the time.

Referring to FIG. 19, in the case where a time is not set, when the terminal moves from the boundary region B12 to the center region C1 and then returns to the same boundary region B12, inter-region handover without setting the time may be performed.

Referring to FIG. 20, in the case where a time is set, when the terminal moves from the boundary region B12 to the center region C1 and then returns to the same center region B12, inter-region handover may be performed by setting the time.

Referring to FIG. 21, in the case where a time is not set, when the terminal moves from the boundary region B12 to the center region C1 and then moves to another boundary region B13, inter-region handover without setting the time may be performed.

Referring to FIG. 22, in the case where a time is set, when the terminal moves from the boundary region B12 to the center region C1 and then moves to another boundary region B13, inter-region handover may be performed by setting the time.

Inter-region Handover Procedure in Accordance with Inter-region Movement Scenario The inter-region handover procedure includes the region monitoring step, the region rescanning step, the region redecision step, and the CoMP connection reconfiguration step as described above. Individual steps independently operate and each step may be configured by various methods. The region monitoring step is divided into a method of performing the region monitoring by the base station and a method of performing the region monitoring by the terminal. The region rescanning step is divided into a method in which the base station initiatively performs the region rescanning using a scanning method of the related art, a method in which the base station initiatively perform the region rescanning using CoMP scanning, and a method in which the terminal autonomously performs the region rescanning using the CoMP scanning. The region redecision step is divided into a method of performing the region redecision by the base station and a method of performing the region redecision by the terminal. The CoMP connection reconfiguration step is divided into a method of performing the connection reconfiguration without checking whether to maintain the region configuration condition, a method of performing the connection reconfiguration after checking whether to maintain the region configuration condition, a method of not performing the region monitoring or the region redecision during the CoMP connection reconfiguration step, a method of performing the region monitoring by the base station during the CoMP connection reconfiguration step, a method of performing the region monitoring by the terminal during the CoMP connection reconfiguration step, a method of performing the region rescanning by the base station during the CoMP connection reconfiguration step, and a method of performing the region rescanning by the terminal during the CoMP connection reconfiguration step. The CoMP connection reconfiguration step may be diversely configured by combining whether to check whether to maintain the region configuration condition for a predetermined time and whether to perform the region monitoring or the region redecision during the CoMP connection reconfiguration step. Accordingly, the inter-region handover procedure may combine one method in the region monitoring step, one method in the region rescanning step, one method in the region redecision step, and one method in the CoMP connection reconfiguration step to configure various inter-region handover procedures.

Next, an inter-region handover procedure according to an exemplary embodiment of the present invention with respect to various inter-region movement scenarios of the terminal will be described. The terminal according to an exemplary embodiment of the present invention may move from one region among the center region C1 of the first base station, the center region C2 of the second base station, the center region C3 of the third base station, the boundary region B12 of the first base station and the second base station, the boundary region B23 of the first base station and the second base station, the boundary region B13 of the first base station and the third base station, and the common region M123 of the first base station, the second base station, and the third base station to another region. Further, the terminal according to an exemplary embodiment of the present invention may move from one region among the center region C1 of the first base station, the center region C2 of the second base station, the center region C3 of the third base station, the boundary region B12 of the first base station and the second base station, the boundary region B23 of the first base station and the second base station, the boundary region B13 of the first base station and the third base station, and the common region M123 of the first base station, the second base station, and the third base station to another region and then return to the original region or move to a third region.

In the following inter-region handover procedure, for the convenience of the description, various inter-region handover procedures will be described for a third scenario (see FIGS. 17 and 18) where the terminal moves from the center region C1 to the boundary region B12 and then returns to the same center region C as an inter-region movement scenario where the terminal moves from one region to another one region and then returns to the original region will be described. Further, three inter-region handover procedures are described for a second scenario (see FIGS. 15 and 16) where the terminal moves from the boundary region B12 to the center region C1 as an inter-region movement scenario where the terminal moves from one region to another one region will be described and one inter-region handover procedure is described for a fifth scenario (see FIGS. 21 and 22) where the terminal moves from the boundary region B12 to the center region C1 and then moves to another boundary region B12 as an inter-region movement scenario where the terminal moves from one region to another one region and then moves to the third region. However, various inter-region handover procedures which will not be described below may be configured according to the exemplary embodiment of the present invention. Further, the inter-region movement scenario which is not described below may be easily inferred from the exemplary embodiment of the present invention. Further, when the common region M123 is defined, if the terminal moves from the center region or the boundary region to the common region according to the exemplary embodiment of the present invention, an inter-region handover procedure for CoMP connection reconfiguration for the connection establishment may be configured and if the terminal moves from the common region to the center region or the boundary region, an inter-region handover procedure for CoMP connection reconfiguration for the release establishment may be configured.

1) Method for Configuring Inter-region Handover Procedure

The inter-region handover procedure may be categorized as an inter-region handover procedure in which the base station performs the region redecision and an inter-region handover procedure in which the terminal performs the region redecision. Accordingly, the inter-region handover procedure in accordance with inter-region movement scenario will be described to be divided into an inter-region handover procedure in which the base station performs the region redecision and an inter-region handover procedure in which the terminal performs the region redecision. When the base station performs the region redecision, the region monitoring step and the region rescanning step may be combined in some cases so that the region monitoring step and the region rescanning step may be described to be combined. Next, when the base station performs the region redecision step, the region redecision step needs to be performed prior to the CoMP connection reconfiguration step so that the region redecision step and the CoMP connection reconfiguration step may be described to be combined. Therefore, when the base station performs the region redecision, the inter-region handover procedure combines one of various combinations of the region monitoring step and the region rescanning step which will be described below and one of various combinations of the region redecision step and the CoMP connection reconfiguration step which will be described below to configure various inter-region handover procedures. When the terminal performs the region redecision, the inter-region handover procedure may combine four steps (the region monitoring step, the region rescanning step, the region redecision step, and the CoMP connection reconfiguration step) into various types so that the inter-region handover procedures including all four steps will be described.

The region monitoring step and the region rescanning step in the procedure in which the base station performs the region redecision will be divided into various types depending on a principal agent which performs the region monitoring step, a principal agent which performs the region rescanning step, and whether to be synchronized between the base stations. For procedures when the base stations are not synchronized, an exemplary embodiment only when the terminal moves from C1 region to B12 region will be described and another inter-region movement scenario will not be described. However, the same method may be applied to another inter-region movement scenario when the base stations are not synchronized.

① A procedure in which the base station performs the region monitoring and the base station initiatively performs the region rescanning using the scanning method of the related art.

② A procedure in which the base station performs the region monitoring and the base station initiatively performs the region rescanning using the CoMP scanning in a communication environment in which the base stations are synchronized.

③ A procedure in which the terminal performs the region monitoring and the base station initiatively performs the region rescanning using the scanning method of the related art.

④ A procedure in which the terminal performs the region monitoring and the base station initiatively performs the region rescanning using the CoMP scanning in a communication environment in which the base stations are synchronized.

⑤ A procedure in which the terminal performs the region monitoring and the terminal autonomously performs the region rescanning using the CoMP scanning in a communication environment in which the base stations are synchronized.

A procedure in which the base station performs the region monitoring and the base station initiatively performs the region rescanning using the CoMP scanning in a communication environment in which the base stations are not synchronized.

⑥ A procedure in which the terminal performs the region monitoring and the base station initiatively performs the region rescanning using the CoMP scanning in a communication environment in which the base stations are not synchronized.

⑦ A procedure in which the terminal performs the region monitoring and the terminal autonomously performs the region rescanning using the CoMP scanning in a communication environment in which the base stations are not synchronized.

The region redecision step and the CoMP connection reconfiguration step in the procedure in which the base station performs the region redecision will be divided into various types depending on a principal agent which performs the region monitoring step, whether to check whether to maintain the region configuration condition for a predetermined time, whether to perform the region monitoring or the region redecision during the CoMP connection reconfiguration step, and whether to be synchronized between the base stations. Also, for procedures when the base stations are not synchronized, an exemplary embodiment only when the terminal moves from C1 region to B12 region will be described and another inter-region movement scenario will not be described. However, the same method may be applied to another inter-region movement scenario when the base stations are not synchronized. The region redecision step and the CoMP connection reconfiguration step when the base station performs the region redecision may be formed by various procedures as follows:

① A procedure in which the base station performs the region redecision and the base station performs the region monitoring in the communication environment in which the base stations are synchronized.

② A procedure in which the base station performs the region redecision, the base station performs the region monitoring, and the region monitoring is performed even during the CoMP connection reconfiguration step, in the communication environment in which the base stations are synchronized.

③ A procedure in which the base station performs the region redecision, the base station performs the region monitoring, and the region redecision is performed even during the CoMP connection reconfiguration step, in the communication environment in which the base stations are synchronized.

④ A procedure in which the base station performs the region redecision and the terminal performs the region monitoring in the communication environment in which the base stations are synchronized.

⑤ A procedure in which the base station performs the region redecision, the terminal performs the region monitoring, and the region monitoring is performed even during the CoMP connection reconfiguration step, in the communication environment in which the base stations are synchronized.

⑥ A procedure in which the base station performs the region redecision, the terminal performs the region monitoring, and the region redecision is performed even during the CoMP connection reconfiguration step, in the communication environment in which the base stations are synchronized.

⑦ A procedure in which the base station performs the region redecision, the base station checks whether to maintain the region configuration condition of the region which is currently redecided while continuously performing the region monitoring for a predetermined time even during the CoMP connection reconfiguration step and then performs the CoMP connection reconfiguration, in the communication environment in which the base stations are synchronized.

⑧ A procedure in which the base station performs the region redecision, the terminal checks whether to maintain the region configuration condition of the region which is currently redecided while continuously performing the region monitoring for a predetermined time even during the CoMP connection reconfiguration step and then performs the CoMP connection reconfiguration, in the communication environment in which the base stations are synchronized.

⑨ A procedure in which the base station performs the region redecision, the base station checks whether to maintain the region configuration condition of the region which is currently redecided while continuously performing the region redecision for a predetermined time even during the CoMP connection reconfiguration step and then performs the CoMP connection reconfiguration, in the communication environment in which the base stations are synchronized.

⑩ A procedure in which the base station performs the region redecision and the base station performs the region monitoring in the communication environment in which the base stations are not synchronized.

⑪ A procedure in which the base station performs the region redecision, the base station performs the region monitoring, and the region monitoring is performed even during the CoMP connection reconfiguration step, in the communication environment in which the base stations are not synchronized.

⑫ A procedure in which the base station performs the region redecision, the base station performs the region monitoring, and the region redecision is performed even during the CoMP connection reconfiguration step, in the communication environment in which the base stations are not synchronized.

⑬ A procedure in which the base station performs the region redecision and the terminal performs the region monitoring in the communication environment in which the base stations are not synchronized.

⑭ A procedure in which the base station performs the region redecision, the terminal performs the region monitoring, and the region monitoring is performed even during the CoMP connection reconfiguration step, in the communication environment in which the base stations are not synchronized.

⑮ A procedure in which the base station performs the region redecision, the terminal performs the region monitoring, and the region redecision is performed even during the CoMP connection reconfiguration step, in the communication environment in which the base stations are not synchronized.

(16) A procedure in which the base station performs the region redecision, the base station checks whether to maintain the region configuration condition of the region which is currently redecided while continuously performing the region monitoring for a predetermined time even during the CoMP connection reconfiguration step and then performs the CoMP connection reconfiguration, in the communication environment in which the base stations are not synchronized.

(17) A procedure in which the base station performs the region redecision, the terminal checks whether to maintain the region configuration condition of the region which is currently redecided while continuously performing the region monitoring for a predetermined time even during the CoMP connection reconfiguration step and then performs the CoMP connection reconfiguration, in the communication environment in which the base stations are not synchronized.

(18) A procedure in which the base station performs the region redecision, the base station checks whether to maintain the region configuration condition of the region which is currently redecided while continuously performing the region redecision for a predetermined time even during the CoMP connection reconfiguration step and then performs the CoMP connection reconfiguration, in the communication environment in which the base stations are not synchronized.

The procedure in which the base station performs the region redecision step may be formed by various types depending on whether to continuously perform the region rescanning step and the region redecision step, whether to check whether to maintain the region configuration condition for a predetermined time, whether to perform the region monitoring or the region redecision during the CoMP connection reconfiguration step, and whether to be synchronized between the base stations as follows.

①A procedure in which the terminal performs the region redecision and the terminal performs the region monitoring in the communication environment in which the base stations are synchronized.

②A procedure in which the terminal continuously performs the region rescanning and the region redecision in the communication environment in which the base stations are synchronized.

③A procedure in which the terminal performs the region redecision, the terminal checks whether to maintain the region configuration condition of the region which is currently redecided while continuously performing the region monitoring for a predetermined time even during the CoMP connection reconfiguration step and then performs the CoMP connection reconfiguration, in the communication environment in which the base stations are synchronized.

④A procedure in which the terminal performs the region redecision, the terminal checks whether to maintain the region configuration condition of the region which is currently redecided while continuously performing the region redecision for a predetermined time even during the CoMP connection reconfiguration step and then performs the CoMP connection reconfiguration, in the communication environment in which the base stations are synchronized.

⑤A procedure in which the terminal performs the region redecision and the terminal performs the region monitoring in the communication environment in which the base stations are not synchronized.

⑥A procedure in which the terminal continuously performs the region rescanning and the region redecision in the communication environment in which the base stations are not synchronized.

⑦A procedure in which the terminal performs the region redecision, the terminal checks whether to maintain the region configuration condition of the region which is currently redecided while continuously performing the region monitoring for a predetermined time even during the CoMP connection reconfiguration step and then performs the CoMP connection reconfiguration, in the communication environment in which the base stations are not synchronized.

⑧A procedure in which the terminal performs the region redecision, the terminal checks whether to maintain the region configuration condition of the region which is currently redecided while continuously performing the region redecision for a predetermined time even during the CoMP connection reconfiguration step and then performs the CoMP connection reconfiguration, in the communication environment in which the base stations are not synchronized.

2) Exemplary Embodiment of Inter-region Handover Procedure in Accordance with Inter-region Movement Scenario Next, described are inter-region handover procedures for a scenario where the terminal illustrated in FIGS. 17 and 18 moves from the center region C1 of the first base station to the boundary region B12 of the first base station and the second base station and then moves to the center region C1 of the first base station again. Inter-region handover procedures in which the base station performs the region redecision will be described first and then inter-region handover procedure in which the terminal performs the region redecision will be described. When the base station performs the region redecision, procedures which perform the region monitoring step and the region rescanning step among the inter-region handover procedures will be described first and then procedures which perform the region redecision step and the CoMP connection reconfiguration step will be described.

Next, the region monitoring step and the region rescanning step in the inter-region handover procedure in which the base station performs the region redecision when the terminal moves from the center region C1 to the boundary region B12 of the first base station and the second base station and then moves to the center region C1 of the first base station again will be described. Here, various procedures are available depending on a principal agent which performs the region monitoring step, a principal agent which performs the region rescanning step, and whether to be synchronized between base stations.

Figure 23:
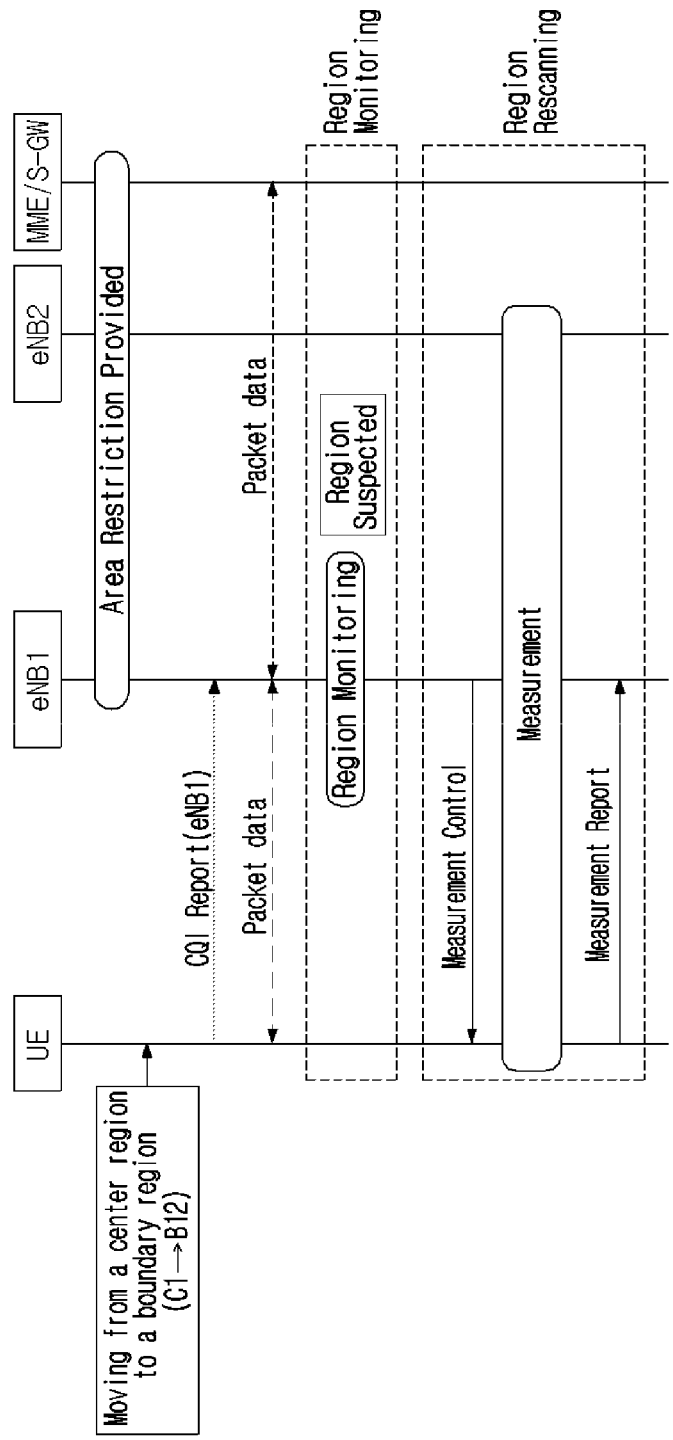
FIG. 23 is a view illustrating a step in which a base station performs a region monitoring step and the base station initiatively performs a region rescanning step using a scanning method of a related art.

FIG. 23 is a view illustrating a step in which the base station performs a region monitoring step and the base station initiatively performs the region rescanning step using a scanning method of a related art.

Referring to FIG. 23, when a terminal UE is located at a center region C1 of a first base station eNB1, the first base station eNB1 which is connected to the terminal UE to transmit and receive data performs the region monitoring step using a channel quality indicator between the terminal UE and the first base station eNB1 which is periodically received from the terminal UE through a CQI (channel quality indicator) report (eNB1). In the region monitoring step, the first base station eNB1 determines whether a region where the terminal UE is located satisfies the region configuration condition of the currently decided region using the channel quality indicator which is received from the terminal UE.

When the terminal UE moves from the center region C1 of the first base station eNB1 to a boundary region B12 of the first base station eNB1 and a second base station eNB2, if the channel quality indicator in the region where the terminal UE is currently located does not satisfy the region configuration condition of the center region C1 of the first base station eNB1 which is currently decided in accordance with the region monitoring result, the first base station sets a region shift suspected state and performs the region rescanning step. When the region configuration condition of the center region C1 of the first base station eNB1 is satisfied, the region monitoring state is continuously maintained. In the region rescanning step, the base station initiatively performs the region rescanning using the scanning method of the related art so that the first base station eNB1 transmits a measurement control message for region rescanning to the terminal UE. In this case, the terminal UE which receives the measurement control message performs measurement for neighbor base stations using a neighbor list which is provided by the first base station eNB1 and transmits a measurement result to the first base station eNB1 through a measurement report message to complete the region rescanning step. Here, when the base stations are not synchronized, the terminal UE performs the measurement after synchronizing target base stations to be measured.

Figure 24:
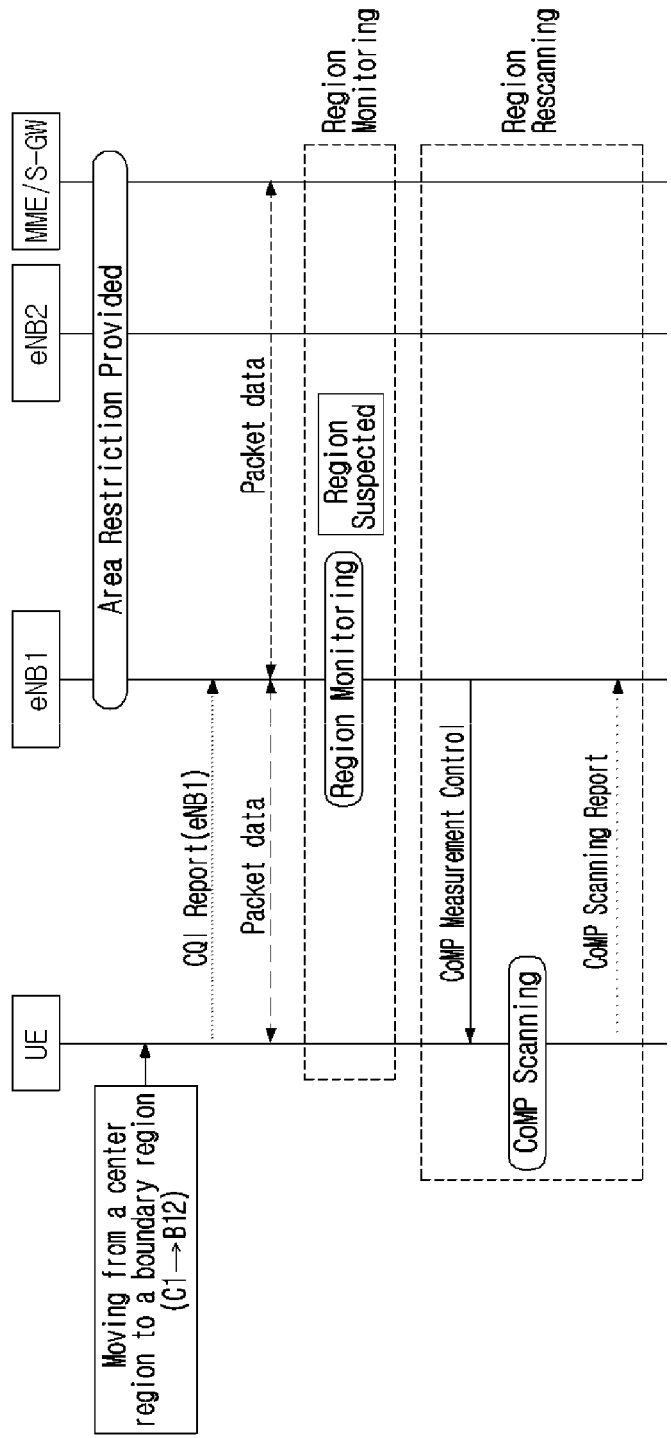
FIG. 24 is a view illustrating a step in which a base station performs a region monitoring step and the base station initiatively performs a region rescanning step using a scanning method of a related art in a communication environment in which base stations are synchronized.

FIG. 24 is a view illustrating a step in which the base station performs the region monitoring step and the base station initiatively performs a region rescanning step using a scanning method of the related art in a communication environment in which base stations are synchronized.

Referring to FIG. 24, in the communication environment in which the base stations are synchronized, when a terminal UE is located at a center region C1 of a first base station eNB1, the first base station eNB1 which is connected to the terminal UE to transmit and receive data performs the region monitoring step using a channel quality indicator between the terminal UE and the first base station eNB1 which is periodically received from the terminal UE through a CQI report (eNB1). In the region monitoring step, the first base station eNB1 determines whether a region where the terminal UE is located satisfies the region configuration condition of the currently decided region using the channel quality indicator which is received from the terminal UE.

When the terminal UE moves from the center region C1 of the first base station eNB1 to a boundary region B12 of the first base station eNB1 and a second base station eNB2, if the channel quality indicator in the region where the terminal UE is located does not satisfy the region configuration condition of the center region C1 of the first base station eNB1 which is currently decided in accordance with the region monitoring result, the first base station sets a region shift suspected state and performs the region rescanning step. When the region configuration condition of the center region C1 of the first base station eNB1 is satisfied, the region monitoring state is continuously maintained. In the region rescanning step, the base station initiatively performs the region rescanning using the CoMP scanning method so that the first base station eNB1 transmits a CoMP measurement control message for region rescanning to the terminal UE. In this case, the terminal UE which receives the CoMP measurement control message performs the CoMP scanning on some of neighbor base stations, which is capable of performing the CoMP transmission to the terminal UE, in the neighbor list which is provided by the first base station eNB1 and transmits a measurement result to the first base station eNB1 through a CoMP scanning report to complete the region rescanning step.

Figure 25:
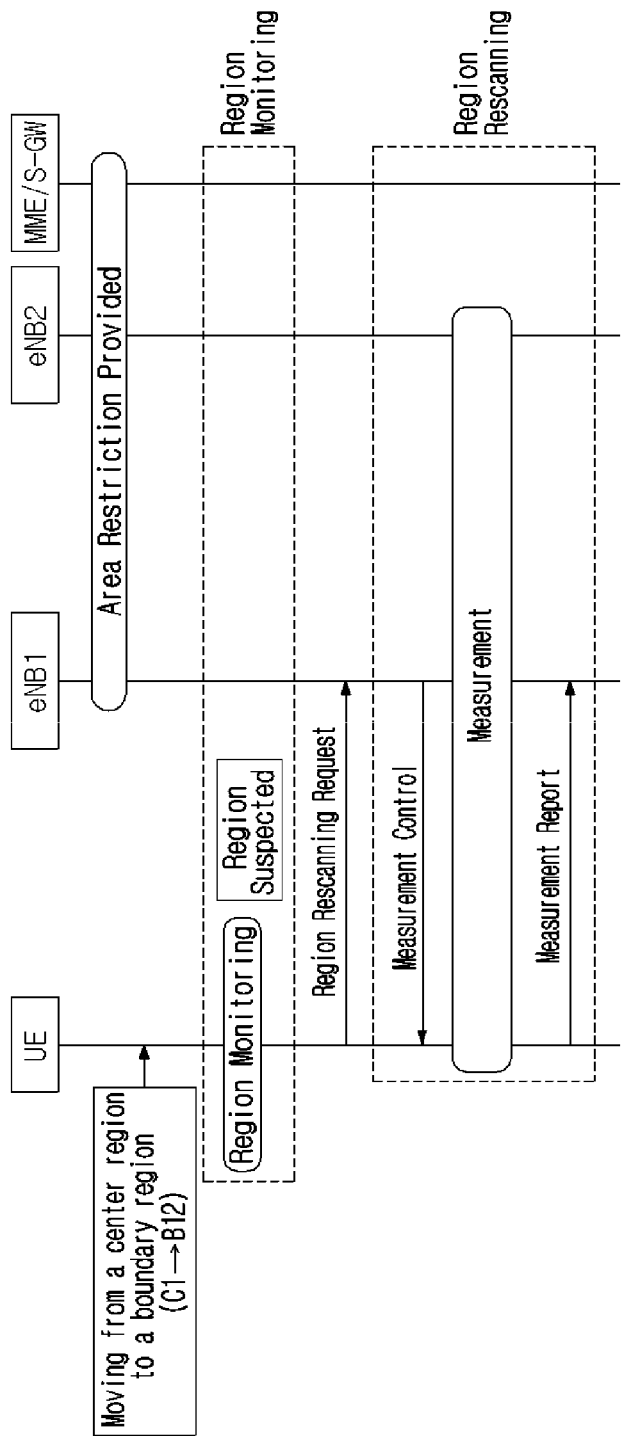
FIG. 25 is a view illustrating a step in which a terminal performs a region monitoring step and a base station initiatively performs a region rescanning step using a scanning method of a related art.

FIG. 25 is a view illustrating a step in which a terminal performs a region monitoring step and the base station initiatively performs a region rescanning step using a scanning method of the related art.

Referring to FIG. 25, when the terminal UE is located in the center region C1 of the first base station eNB1, the terminal UE performs the region monitoring step using a channel quality indicator between the terminal UE and the first base station eNB1 which is directly measured. In the region monitoring step, the terminal UE determines whether a region where the terminal UE is located satisfies the region configuration condition of the currently decided region using the channel quality indicator which is directly measured by the terminal UE.

When the terminal UE moves from the center region C1 of the first base station eNB1 to the boundary region B12 of the first base station eNB1 and the second base station eNB2, if the channel quality indicator in the region where the terminal UE is located does not satisfy the region configuration condition of the center region C1 of the first base station eNB1 which is currently decided in accordance with the region monitoring result, a region shift suspected state is set and the terminal transmits a region rescanning request message to the first base station eNB1 to allow the first base station eNB1 to perform the region rescanning step. When the region configuration condition of the center region C1 of the first base station eNB1 is satisfied, the region monitoring state is continuously maintained. In the region rescanning step, the base station initiatively performs the region rescanning using the scanning method of the related art so that the first base station eNB1 transmits a measurement control message for region rescanning to the terminal UE. In this case, the terminal UE which receives the measurement control message performs measurement for neighbor base stations using a neighbor list which is provided by the first base station eNB1 and transmits a measurement result to the first base station eNB1 through a measurement report message to complete the region rescanning step. Here, when the base stations are not synchronized, the terminal UE performs the measurement after synchronizing target base stations to be measured.

Figure 26:
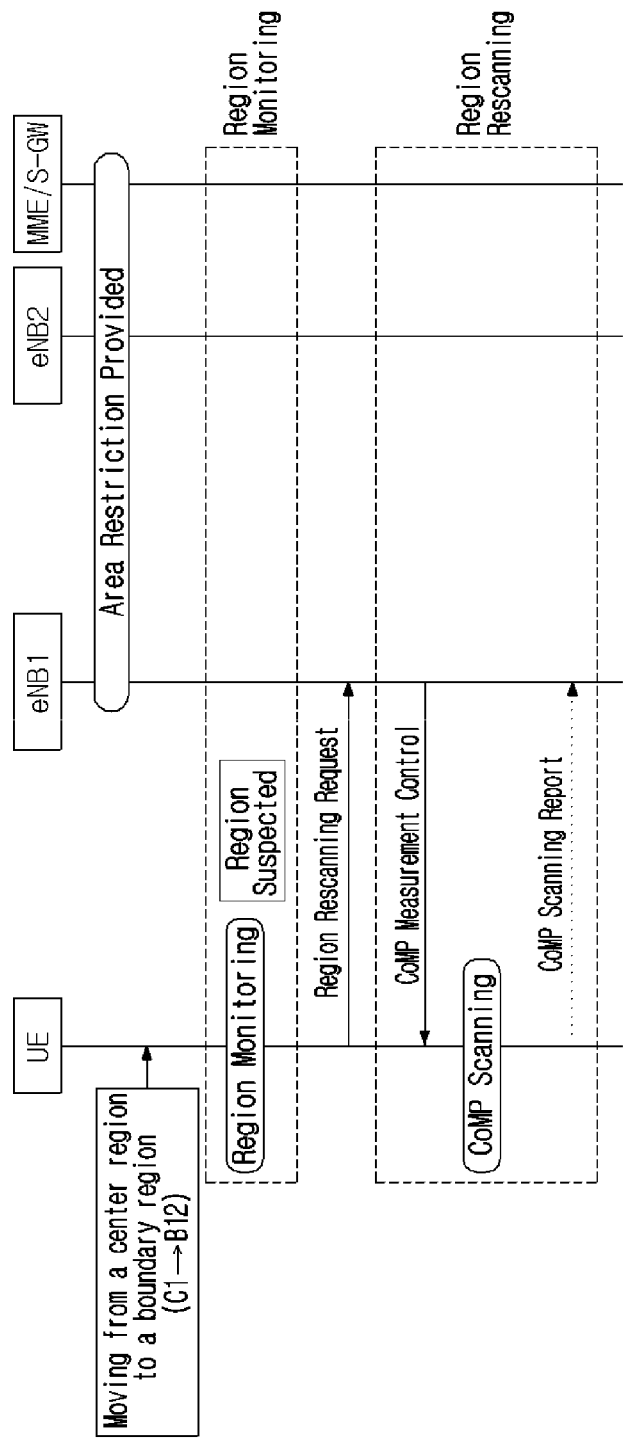
FIG. 26 is a view illustrating a step in which a terminal performs a region monitoring step and a base station initiatively performs a region rescanning step using a CoMP scanning method in a communication environment in which base stations are synchronized.

FIG. 26 is a view illustrating a step in which a terminal performs a region monitoring step and the base station initiatively performs a region rescanning step using the CoMP scanning method in a communication environment in which base stations are synchronized.

Referring to FIG. 26, in a communication environment in which base stations are synchronized, when the terminal UE is located in the center region C1 of the first base station eNB1, the terminal UE performs the region monitoring step using a channel quality indicator between the terminal UE and the first base station eNB1 which is directly measured. In the region monitoring step, the terminal UE determines whether a region where the terminal UE is located satisfies the region configuration condition of the currently decided region using the channel quality indicator which is directly measured by the terminal UE.

When the terminal UE moves from the center region C1 of the first base station eNB1 to a boundary region B12 of the first base station eNB1 and a second base station eNB2, if the channel quality indicator in the region where the terminal UE is located does not satisfy the region configuration condition of the center region C1 of the first base station eNB1 which is currently decided in accordance with the region monitoring result, a region shift suspected state is set and the terminal transmits a region rescanning request message to the first base station eNB1 to allow the first base station eNB1 to perform the region rescanning step. When the region configuration condition of the center region C1 of the first base station eNB1 is satisfied, the region monitoring state is continuously maintained. In the region rescanning step, the base station initiatively performs the region rescanning using the CoMP scanning method so that the first base station eNB1 transmits a CoMP measurement control message for region rescanning to the terminal UE. In this case, the terminal UE which receives the CoMP measurement control message performs the CoMP scanning on some of neighbor base stations, which is capable of performing the CoMP transmission to the terminal UE, in the neighbor list which is provided by the first base station eNB1 and transmits a measurement result to the first base station eNB1 through a CoMP scanning report to complete the region rescanning step.

Figure 27:
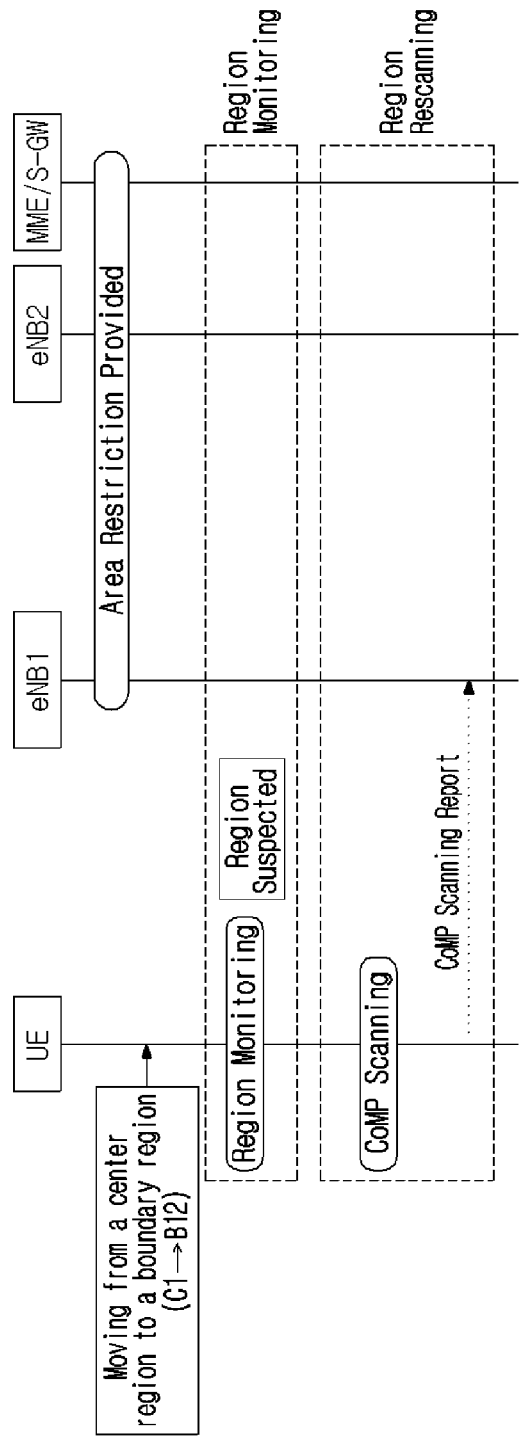
FIG. 27 is a view illustrating a step in which a terminal performs a region monitoring step and the terminal autonomously performs a region rescanning step using a CoMP scanning method in a communication environment in which base stations are synchronized.

FIG. 27 is a view illustrating a step in which a terminal performs a region monitoring step and the terminal autonomously performs a region rescanning step using the CoMP scanning method in a communication environment in which base stations are synchronized.

As illustrated in FIG. 27, in a communication environment in which the base stations are synchronized, when the terminal UE is located in the center region C1 of the first base station eNB1, the terminal UE performs the region monitoring step using a channel quality indicator between the terminal UE and the first base station eNB1 which is directly measured. In the region monitoring step, the terminal UE determines whether a region where the terminal UE is located satisfies the region configuration condition of the currently decided region using the channel quality indicator which is directly measured by the terminal UE.

When the terminal UE moves from the center region C1 of the first base station eNB1 to a boundary region B12 of the first base station eNB1 and a second base station eNB2, if the channel quality indicator in the region where the terminal UE is located does not satisfy the region configuration condition of the center region C1 of the first base station eNB1 which is currently decided in accordance with the region monitoring result, the terminal is set to a region shift suspected state and the terminal autonomously performs the region rescanning step. When the region configuration condition of the center region C1 of the first base station eNB1 is satisfied, the region monitoring state is continuously maintained. In the region rescanning step, the terminal autonomously performs the region rescanning using the CoMP scanning method so that the terminal UE performs the CoMP scanning on some of neighbor base stations, which is capable of performing the CoMP transmission to the terminal UE, in the neighbor list which is provided by the first base station eNB1 and transmits a measurement result to the first base station eNB1 through the CoMP scanning report to complete the region rescanning step.

Figure 28:
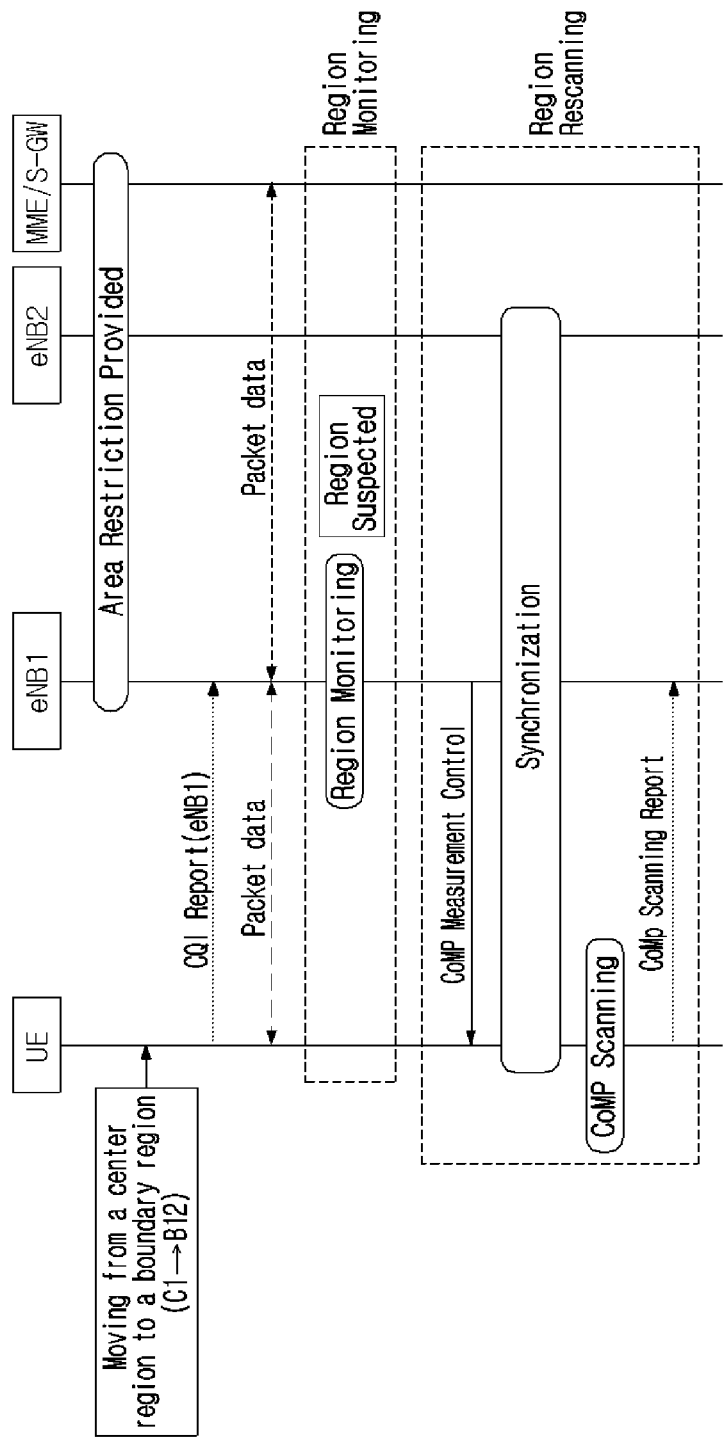
FIG. 28 is a view illustrating a step in which a base station performs a region monitoring step and the base station initiatively performs a region rescanning step using a CoMP scanning method in a communication environment in which base stations are not synchronized.

FIG. 28 is a view illustrating a step in which a base station performs a region monitoring step and the base station initiatively performs the region rescanning using the CoMP scanning method in a communication environment in which base stations are not synchronized.

Referring to FIG. 28, in the communication environment in which the base stations are not synchronized, when a terminal UE is located at a center region C1 of a first base station eNB1, the first base station eNB1 which is connected to the terminal UE to transmit and receive data performs the region monitoring step using a channel quality indicator between the terminal UE and the first base station eNB1 which is periodically received from the terminal UE through a CQI report (eNB1). In the region monitoring step, the first base station eNB1 determines whether a region where the terminal UE is located satisfies the region configuration condition of the currently decided region using the channel quality indicator which is received from the terminal UE.

When the terminal UE moves from the center region C1 of the first base station eNB1 to a boundary region B12 of the first base station eNB1 and a second base station eNB2, if the channel quality indicator in the region where the terminal UE is located does not satisfy the region configuration condition of the center region C1 of the first base station eNB1 which is currently decided in accordance with the region monitoring result, the first base station sets a region shift suspected state and performs the region rescanning step. When the region configuration condition of the center region C1 of the first base station eNB1 is satisfied, the region monitoring state is continuously maintained. In the region rescanning step, the base station initiatively performs the region rescanning using the CoMP scanning method so that the first base station eNB1 transmits a CoMP measurement control message for region rescanning to the terminal UE. In this case, the terminal UE which receives the CoMP measurement control message performs synchronization with neighbor base stations and then performs the CoMP scanning on some of neighbor base stations, which is capable of performing the CoMP transmission to the terminal UE, in the neighbor list which is provided by the first base station eNB1 and transmits a measurement result to the first base station eNB1 through a CoMP scanning report to complete the region rescanning step. In this case, in the synchronization step, prior to performing the CoMP scanning by the terminal UE, the terminal UE may perform the synchronization with a base station which has the shortest transmission delay among the neighbor base stations which are not synchronized.

In addition, in the communication environment in which the base stations are not synchronized, in a step in which the terminal performs the region monitoring and the base station initiatively performs the region rescanning using the CoMP scanning method or a step in which the terminal performs the region monitoring and the base station autonomously performs the region rescanning using the CoMP scanning method, the terminal UE performs the CoMP scanning on some of neighbor base stations which is capable of performing the CoMP transmission to the terminal UE, in the neighbor list which is provided by the first base station eNB1 and transmits a measurement result to the first base station eNB1 through a CoMP scanning report to complete the region rescanning step after performing the synchronization with the neighbor base stations.

Next, the region redecision step and the CoMP connection reconfiguration step in the inter-region handover procedure in which the base station initiatively performs the region redecision when the terminal moves from the center region C1 to the boundary region B12 of the first base station and the second base station and then moves to the center region C1 of the first base station again will be described. Here, various procedures are available depending on whether to check whether to maintain the region configuration condition for a predetermined time or whether to perform the region monitoring or the region redecision during the CoMP connection configuration step.

Figure 29A:
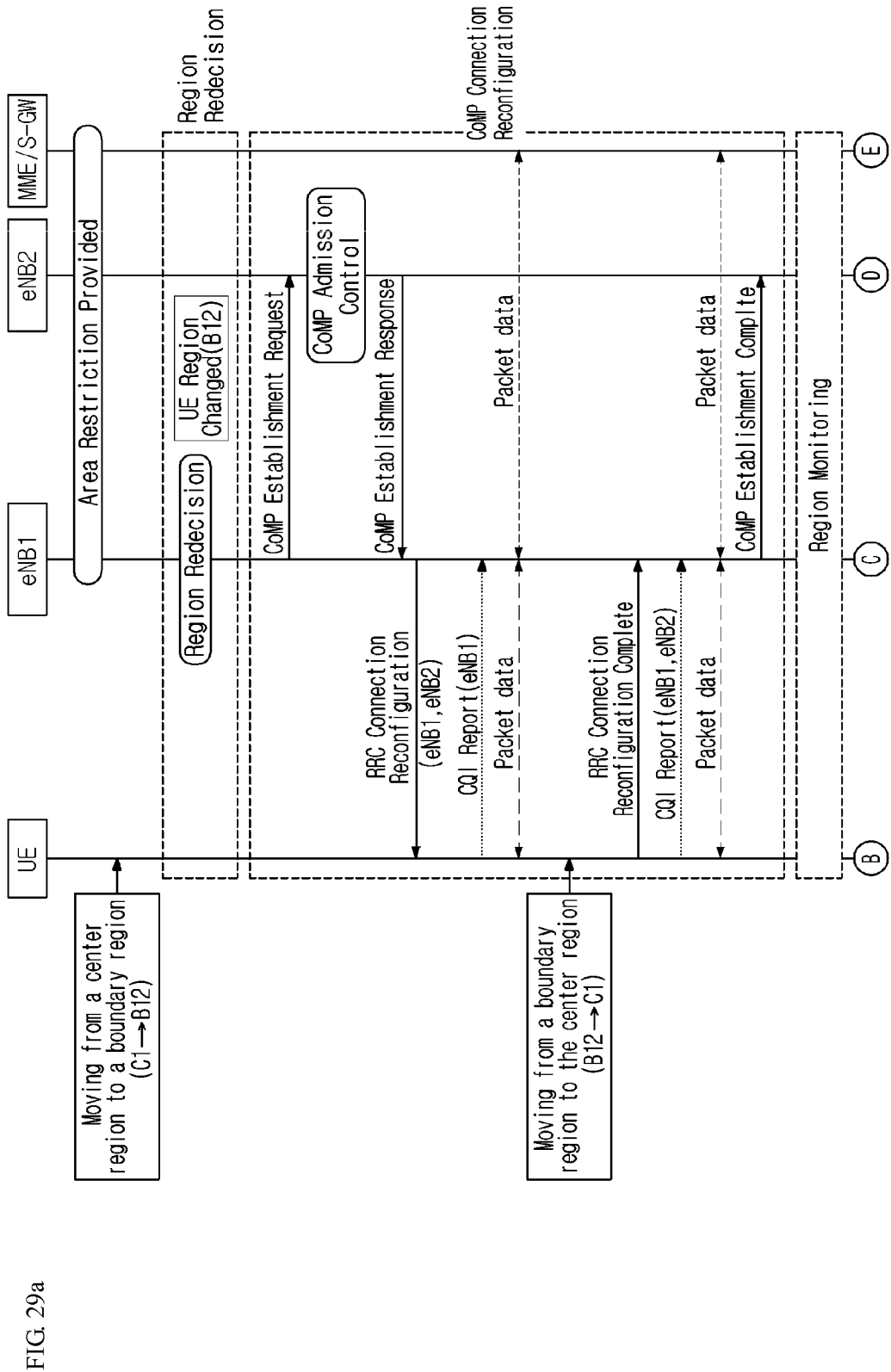
FIGS. 29A and 29B are views illustrating a CoMP connection reconfiguration step in which region monitoring or region redecision is not performed during the CoMP connection reconfiguration step.
Figure 29B:
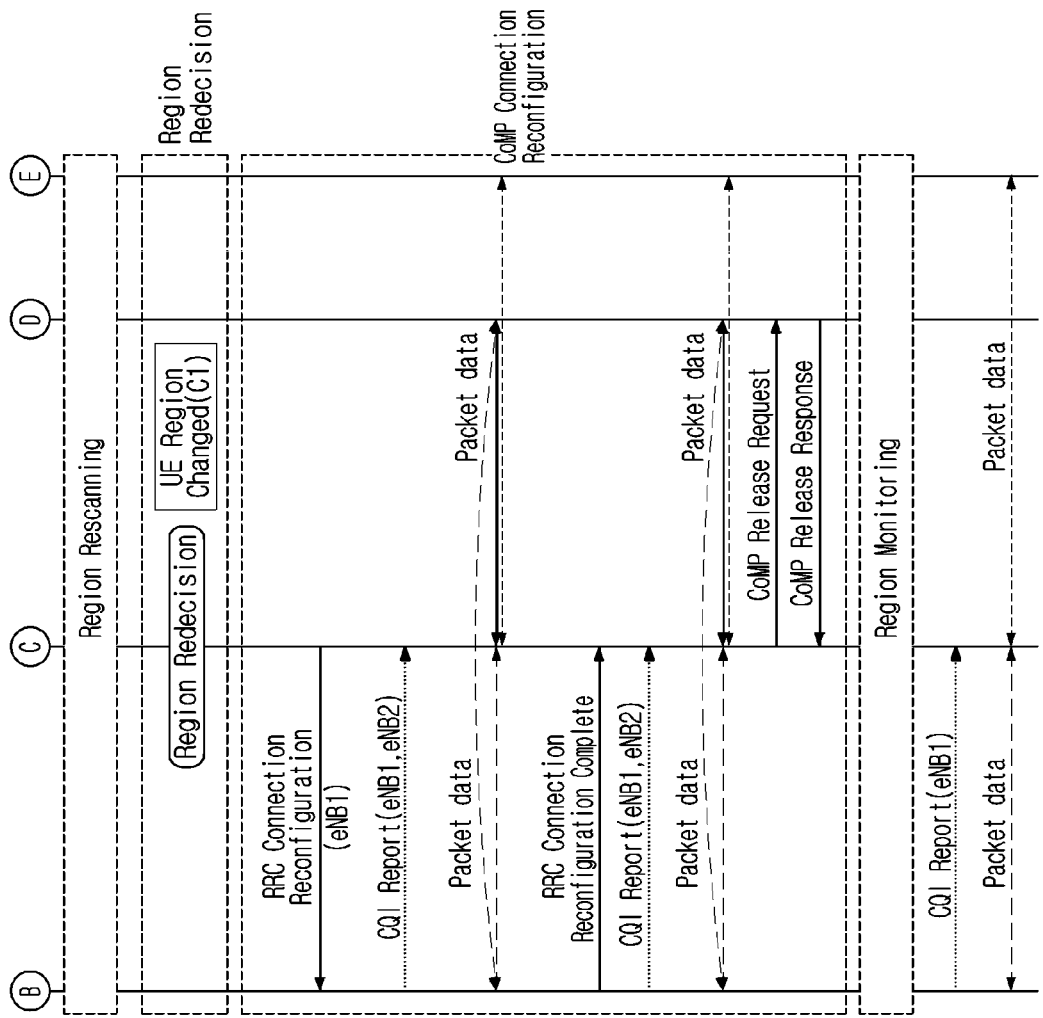

FIGS. 29A and 29B are views illustrating a CoMP connection reconfiguration step in which region monitoring or region redecision is not performed during the CoMP connection reconfiguration step.

Referring to FIGS. 29A and 29B, the region monitoring or the region redecision is not performed during a CoMP connection reconfiguration step. An inter-region handover procedure where when the terminal moves from the center region C1 of the first base station to the boundary region B12 of the first base station and the second base station, the region monitoring and the region rescanning are performed and the first base station redecides the region based on the result thereof and then completes the CoMP connection reconfiguration step which establishes the connection with the second base station and when the terminal moves from the boundary region B12 of the first base station and the second base station to the center region C1 of the first base station, the region monitoring and the region rescanning are performed and the first base station performs the CoMP connection reconfiguration step which releases the connection with the second base station which is currently connected after performing the region redecision based on the result thereof and then is illustrated.

Specifically, in the communication environment in which the base stations are synchronized, when the terminal UE moves from the center region C1 of the first base station eNB1 to the boundary region B12 of the first base station eNB1 and the second base station eNB2, in the region redecision step, the first base station eNB1 redecides whether the terminal UE is located in the boundary region B12 of the first base station eNB1 and the second base station eNB2 using the region rescanning result.

As a result of the region redecision, when the region where the terminal UE is located is changed from the center region C1 of the first base station eNB1 to the boundary region B12 of the first base station eNB1 and the second base station eNB2, the first base station eNB1 needs to perform the CoMP connection reconfiguration step for the boundary region B12 of the first base station eNB1 and the second base station eNB2. In this case, in the redecision step, if the region is redecided as the center region C1 of the first base station eNB1 so that it is decided that the region of the terminal UE is not changed, the current connection state is maintained and the terminal enters the region monitoring state. When it is redecided that the terminal UE moves to the boundary region B12 of the first base station eNB1 and the second base station eNB2, in the CoMP connection reconfiguration step, the first base station eNB1 transmits a CoMP establishment request message to the second base station eNB2 and receives a CoMP establishment response message from the second base station eNB2 as a response therefor. In this case, the second base station eNB2 performs CoMP admission control to decide whether to accept the CoMP connection of the terminal and transmits the result to the first base station through the CoMP establishment response message. When the second base station eNB2 is capable of accepting the CoMP connection of the terminal, the first base station eNB1 transmits an RRC connection reconfiguration message to the terminal UE to control the terminal UE to establish access connection for the CoMP connection with the first base station eNB1 and the second base station eNB2. When the second base station eNB2 cannot accept the CoMP connection of the terminal, the first base station eNB1 tries another base station to establish the CoMP connection or maintains the current connection establishment. After the terminal UE completes the CoMP access connection establishment with the first base station eNB1 and the second base station eNB2, when the first base station eNB1 receives a RRC connection reconfiguration completed message from the terminal UE, the first base station eNB1 transmits a CoMP establishment completed message to the second base station eNB2 to complete the CoMP connection reconfiguration step for the boundary region B12 of the first base station eNB1 and the second base station eNB2 and enter to the region monitoring state.

In this case, during the CoMP connection reconfiguration step for the boundary region B12 of the first base station eNB1 and the second base station eNB2, when the terminal moves from the boundary region B12 of the first base station eNB1 and the second base station eNB2 to the center region C1 of the first base station eNB1 again, in the region monitoring step, if the channel quality indicator in the region where the terminal UE is located does not satisfy the region configuration condition of the boundary region B12 of the first base station eNB1 and the second base station eNB2 which is currently decided as the result of the region monitoring, the terminal is set to the region shift suspected state and performs the region rescanning step. One of procedures illustrated in FIGS. 23 to 27 may be applied to the region monitoring step and the region rescanning step.

In the region redecision step, the first base station eNB1 redecides whether the terminal UE is located in the boundary region B12 of the first base station eNB1 and the second base station eNB2 using the region rescanning result.

As a result of the region redecision, when the region where the terminal UE is located is changed from the boundary region B12 of the first base station eNB1 and the second base station eNB2 to the center region C1 of the first base station eNB1, the first base station eNB1 needs to perform the CoMP connection reconfiguration step for the center region C1 of the first base station eNB1. In the CoMP connection reconfiguration step, the first base station eNB1 transmits an RRC connection reconfiguration message to the terminal UE to control the terminal UE to establish the access connection for the CoMP connection release from the second base station eNB2. After the terminal UE completes the CoMP access connection establishment for the CoMP connection release from the second base station eNB2, when the first base station eNB1 receives an RRC connection reconfiguration completed message from the terminal UE, the first base station eNB1 transmits a CoMP release request message to the second base station eNB2 and receives a CoMP release response message from the second base station eNB2 as a response therefor, to complete the CoMP connection reconfiguration step for the center region C1 of the first base station eNB1 and enters to the region monitoring state.

Figure 30A:
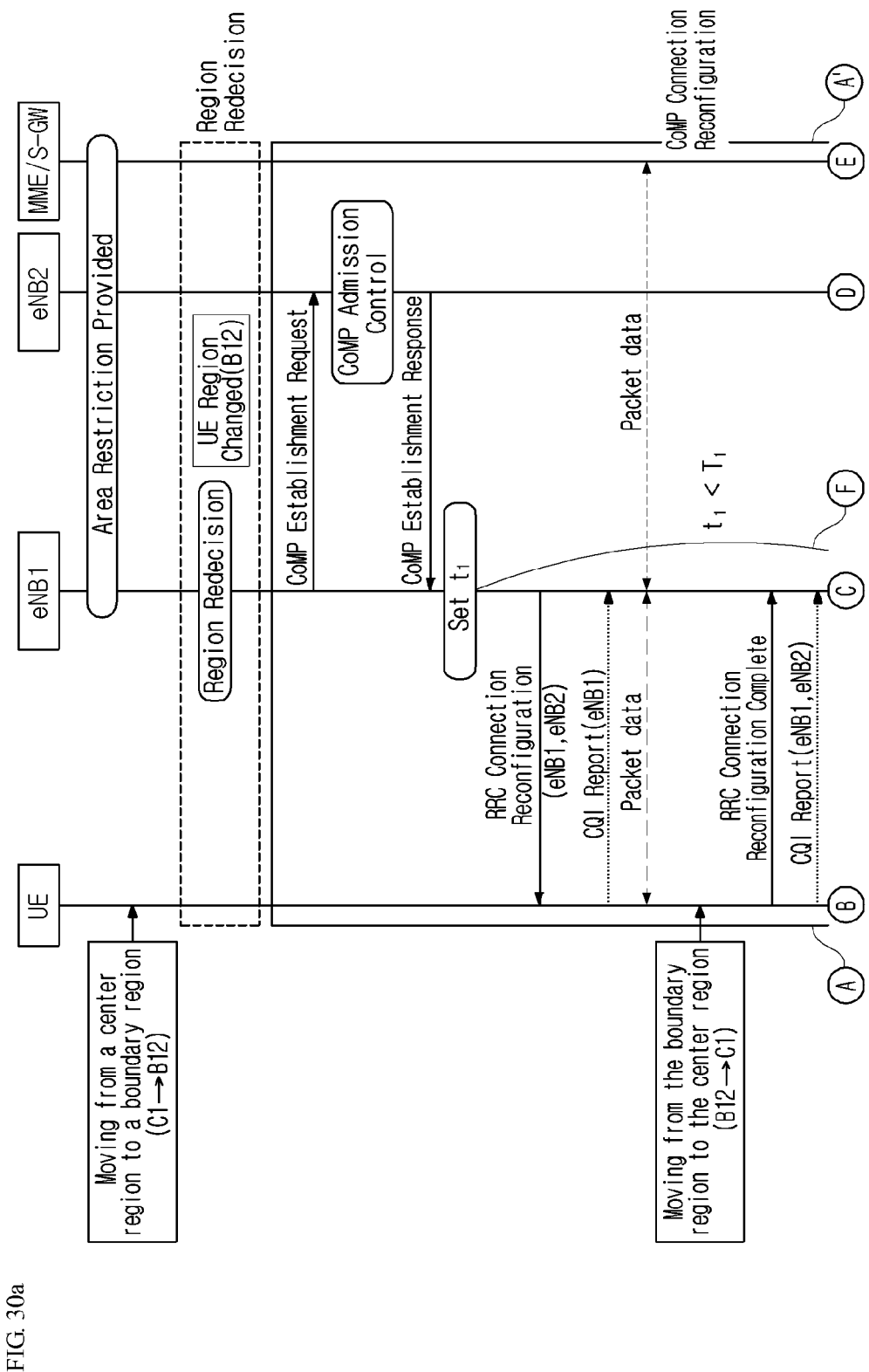
FIGS. 30A to 30C are views illustrating a CoMP connection reconfiguration step in which a base station continuously performs a region monitoring step even during a CoMP connection establishment step and a CoMP access connection establishment step by setting a timer.
Figure 30B:
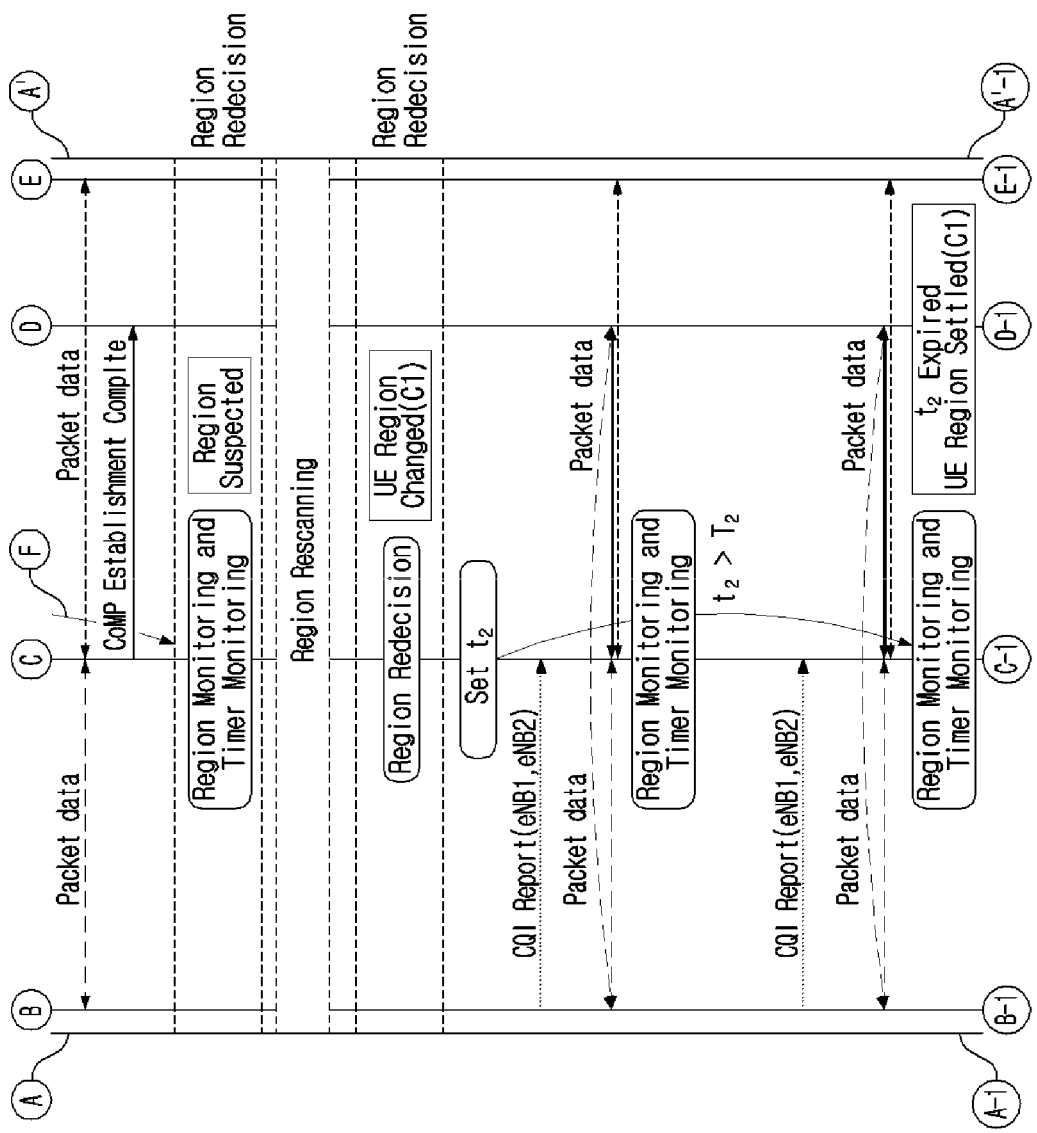
Figure 30C:
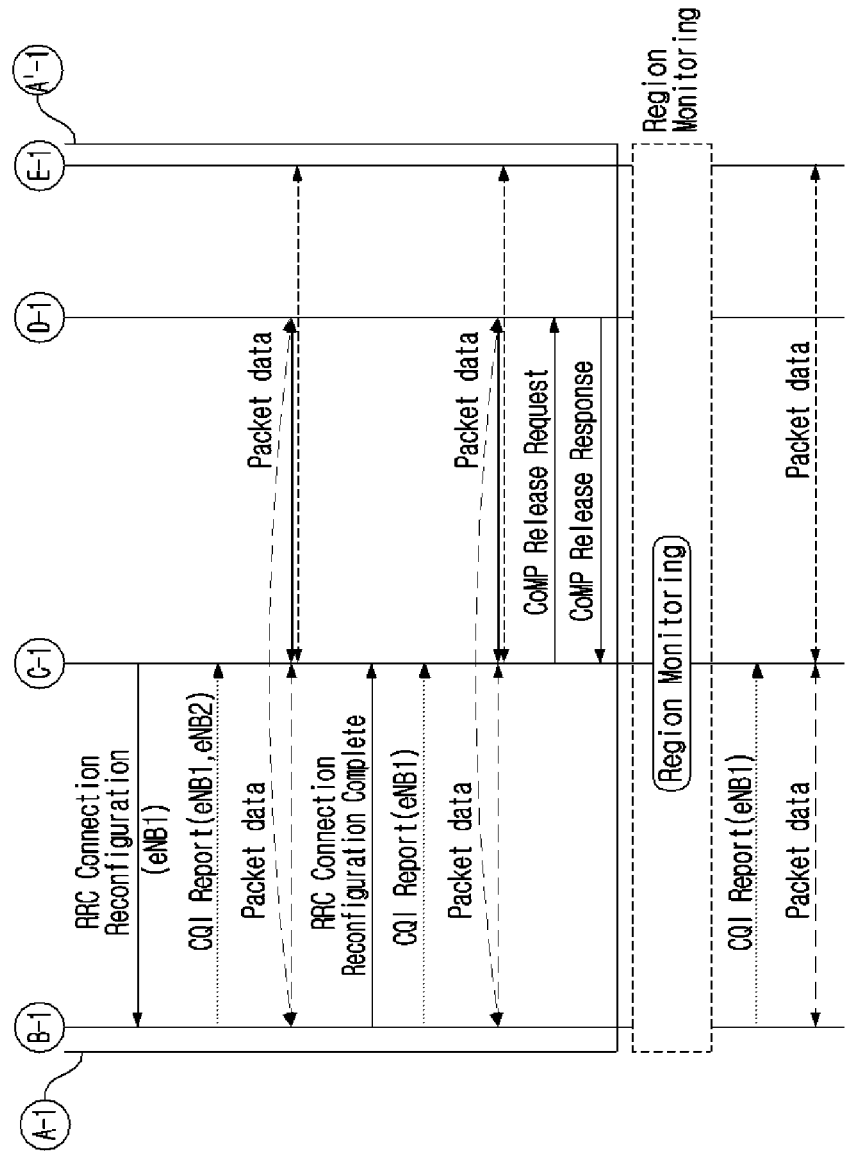

FIGS. 30A to 30C are views illustrating a CoMP connection reconfiguration step in which a base station continuously performs a region monitoring step even during the CoMP connection reconfiguration step and a CoMP access connection establishment step by setting a timer.

Referring to FIGS. 30A to 30C, the base station performs the region monitoring even during a CoMP connection establishment step which is a part of the CoMP connection reconfiguration step and specifically, the base station performs the region monitoring even during a CoMP access connection establishment step which is a part of the CoMP connection establishment step. That is, an inter-region handover procedure where when the terminal moves from the center region C1 of the first base station to the boundary region B12 of the first base station and the second base station, the region monitoring and the region rescanning are performed and the first base station redecides the region based on the result thereof and then completes the CoMP connection reconfiguration step which establishes the connection with the second base station and when the terminal moves from the boundary region B12 of the first base station and the second base station to the same center region C1 of the first base station before a first predetermined time elapses, the region monitoring and the region rescanning are performed and the first base station performs the CoMP connection reconfiguration step which releases the connection with the second base station which is currently connected when a second setting elapses after performing the region redecision based on the result therefor is illustrated.

Specifically, in the communication environment in which the base stations are synchronized, when the terminal UE moves from the center region C1 of the first base station eNB1 to the boundary region B12 of the first base station eNB1 and the second base station eNB2, in the region redecision step, the first base station eNB1 redecides whether the terminal UE is located in the boundary region B12 of the first base station eNB1 and the second base station eNB2 using the region rescanning result.

As a result of the region redecision, when the region where the terminal UE is located is changed from the center region C1 of the first base station eNB1 to the boundary region B12 of the first base station eNB1 and the second base station eNB2, the first base station eNB1 needs to perform the CoMP connection reconfiguration step for the boundary region B12 of the first base station eNB1 and the second base station eNB2. In this case, in the redecision step, if the region is redecided as the center region C1 of the first base station eNB1 so that it is decided that the region of the terminal UE is not changed, the current connection state is maintained and the terminal enters the region monitoring state. When it is redecided that the terminal UE moves to the boundary region B12 of the first base station eNB1 and the second base station eNB2, in the CoMP connection reconfiguration step, the first base station eNB1 transmits a CoMP establishment request message to the second base station eNB2 and receives a CoMP establishment response message from the second base station eNB2 as a response therefor. In this case, the second base station eNB2 performs CoMP admission control to decide whether to accept the CoMP connection of the terminal and transmits the result to the first base station eNB1 through the CoMP establishment response message. When the second base station eNB2 is capable of accepting the CoMP connection of the terminal, the first base station eNB1 sets a first timer t1 and transmits an RRC connection reconfiguration message to the terminal UE to control the terminal UE to establish access connection for the CoMP connection with the first base station eNB1 and the second base station eNB2. After the terminal UE completes the CoMP access connection establishment with the first base station eNB1 and the second base station eNB2, when the first base station eNB1 receives a RRC connection reconfiguration completed message from the terminal UE, the first base station eNB1 transmits a CoMP establishment completed message to the second base station eNB2 to complete the CoMP connection reconfiguration step for the boundary region of the first base station eNB1 and the second base station eNB2. In this case, even during the CoMP connection establishment step, the first base station eNB1 performs the region monitoring using the channel quality indicator of the first base station eNB1 which is received from the terminal UE through a CQI report (eNB1). Here, before the first timer t1 elapses a first predetermined time T1, when the terminal moves from the boundary region B12 of the first base station eNB1 and the second base station eNB2 to the center region C1 of the first base station eNB1, the channel quality indicator in the region where the terminal UE is located does not satisfy the region configuration condition of the boundary region B12 of the first base station eNB1 and the second base station eNB2 which is currently decided in accordance with the region monitoring result, the first base station eNB1 sets the region shift suspected state and performs the region rescanning step. The first base station eNB1 redecides whether the terminal UE is located in the center region C1 of the first base station eNB1 using the region rescanning result and operates a second timer t2. When the CoMP connection establishment step for the boundary region B12 of the first base station eNB1 and the second base station eNB2 is completed, the terminal UE may transmit and receive data to and from the first base station eNB1 and the second eNB2 through the CoMP connection configuration. However, the first base station eNB1 may continuously perform the region monitoring even during the CoMP connection establishment step or the CoMP access connection establishment step in order to check a continuous state of the region configuration condition before the second timer t1 elapses the second predetermined time T2. The continuous region monitoring step is performed for a second predetermined time T2 and when the second timer t2 exceeds the second predetermined time T2, the first base station eNB1 stops the continuous region monitoring, confirms that the terminal moves to the center region C1 of the first base station eNB1 which is currently redecided, and the first base station eNB1 transmits an RRC connection reconfiguration message to the terminal UE to control the terminal UE to establish the access connection for the CoMP connection release from the second base station eNB2. After the terminal UE completes the CoMP access connection establishment for the CoMP connection release from the second base station eNB2, when the first base station eNB1 receives an RRC connection reconfiguration completed message from the terminal UE, the first base station eNB1 transmits a CoMP release request message to the second base station eNB2 and receives a CoMP release response message from the second base station eNB2 as a response therefor, to complete the CoMP connection establishment step for the center region C1 of the first base station eNB1 and enters to the region monitoring state.

Here, when the region of the terminal UE is changed by the region monitoring even during the CoMP connection reconfiguration step, the CoMP connection establishment step, the CoMP access connection establishment step, the CoMP connection reconfiguration step for the changed region may be started again.

Figure 31A:
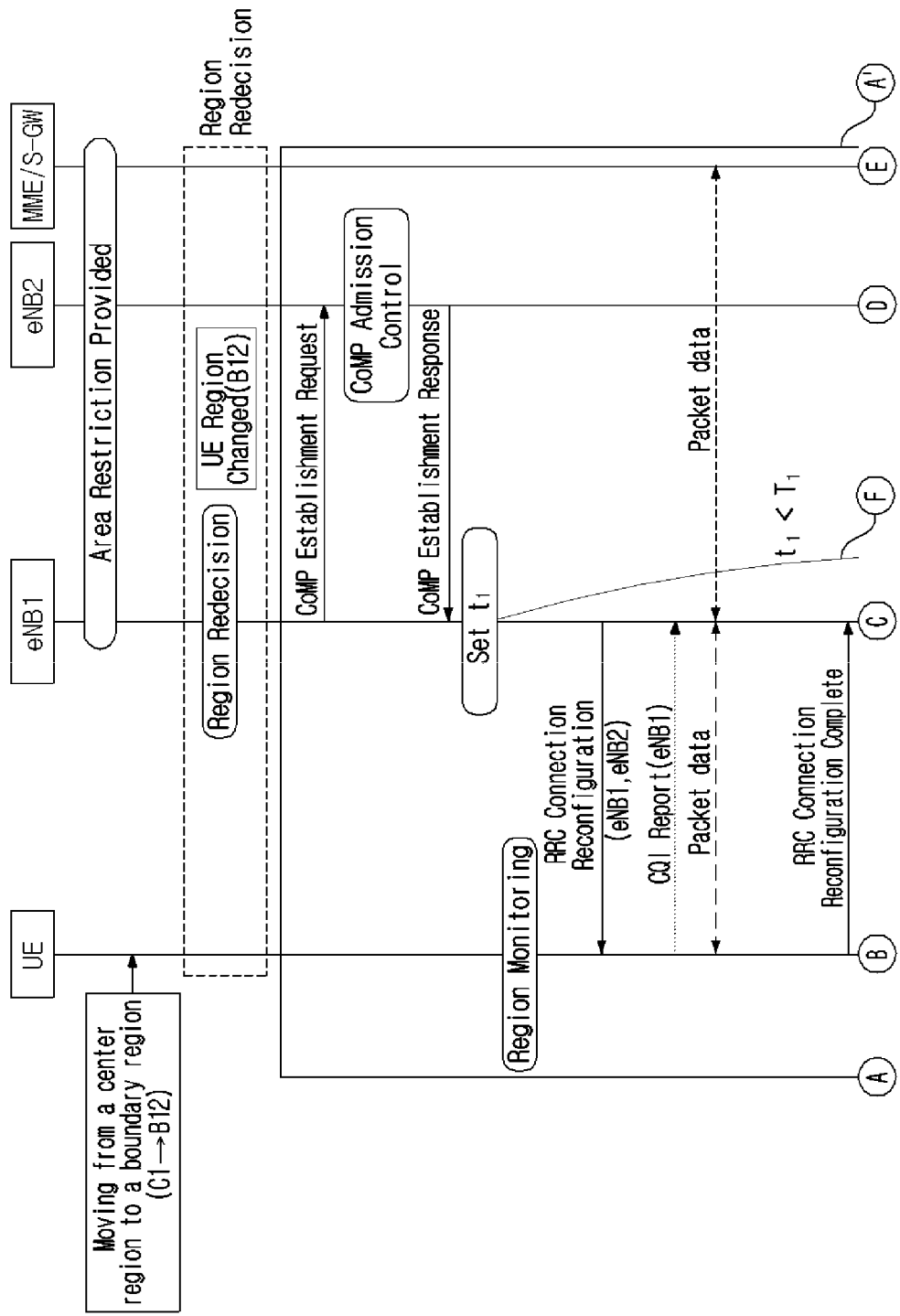
FIGS. 31A to 31C are views illustrating a CoMP connection reconfiguration step in which a terminal continuously performs a region monitoring step even during a CoMP connection establishment and a CoMP access connection establishment step by setting a timer.
Figure 31B:
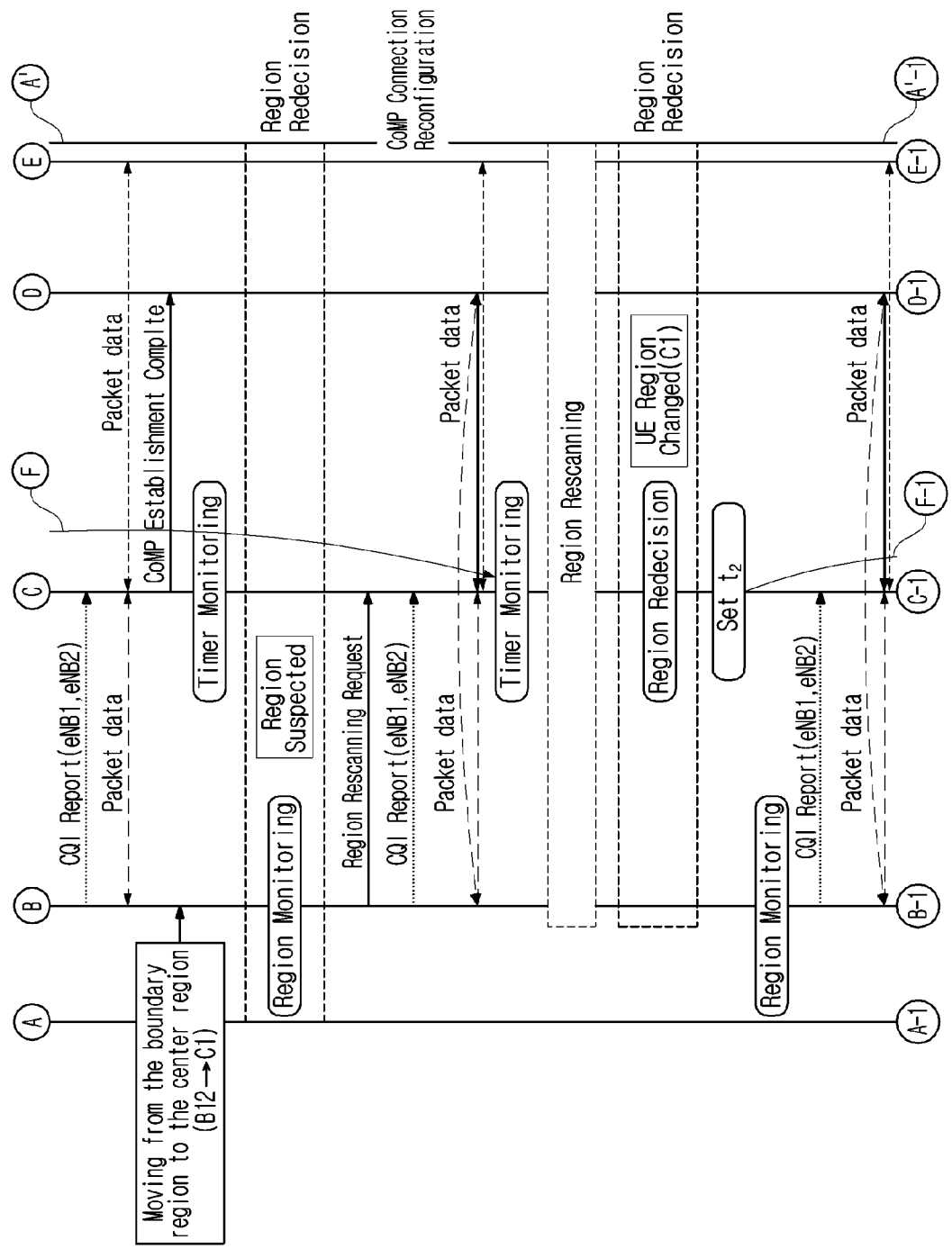
Figure 31C:
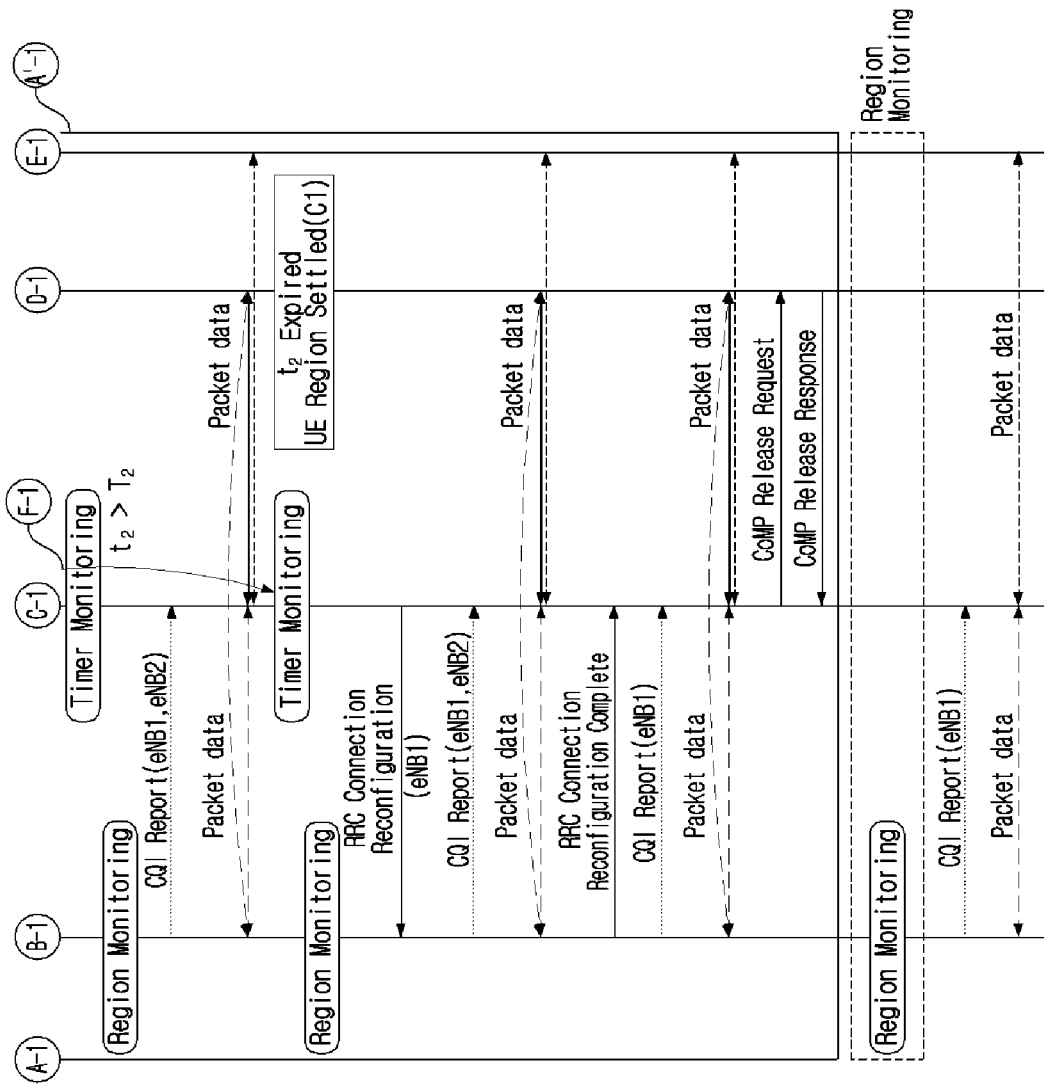

FIGS. 31A to 31C are views illustrating a CoMP connection reconfiguration step in which a terminal continuously performs the region monitoring step even during the CoMP connection reconfiguration step and a CoMP access connection establishment step by setting a timer.

Referring to FIGS. 31A to 31C, the terminal performs the region monitoring even during a CoMP connection establishment step which is a part of the CoMP connection reconfiguration step and specifically, the terminal performs the region monitoring even during a CoMP access connection establishment step which is a part of the CoMP connection establishment step. That is, an inter-region handover procedure where when the terminal moves from the center region C1 of the first base station to the boundary region B12 of the first base station and the second base station, the region monitoring and the region rescanning are performed and the first base station redecides the region based on the result thereof and then completes the CoMP connection reconfiguration step which establishes the connection with the second base station and when the terminal moves from the boundary region B12 of the first base station and the second base station to the same center region C1 of the first base station before a first predetermined time elapses, the region monitoring and the region rescanning are performed and the first base station performs the CoMP connection reconfiguration step which releases the connection with the second base station which is currently connected when a second setting elapses after performing the region redecision based on the result therefor is illustrated.

Specifically, in the communication environment in which the base stations are synchronized, when the terminal UE moves from the center region C1 of the first base station eNB1 to the boundary region B12 of the first base station eNB1 and the second base station eNB2, in the region redecision step, the first base station eNB1 redecides whether the terminal UE is located in the boundary region B12 of the first base station eNB1 and the second base station eNB2 using the region rescanning result.

As a result of the region redecision, when the region where the terminal UE is located is changed from the center region C1 of the first base station eNB1 to the boundary region B12 of the first base station eNB1 and the second base station eNB2, the first base station eNB1 needs to perform the CoMP connection reconfiguration step for the boundary region B12 of the first base station eNB1 and the second base station eNB2. In this case, in the redecision step, if the region is redecided as the center region C1 of the first base station eNB1 so that it is decided that the region of the terminal UE is not changed, the current connection state is maintained and the terminal enters the region monitoring state. When it is redecided that the terminal UE moves to the boundary region B12 of the first base station eNB1 and the second base station eNB2, in the CoMP connection reconfiguration step, the first base station eNB1 transmits a CoMP establishment request message to the second base station eNB2 and receives a CoMP establishment response message from the second base station eNB2 as a response therefor. In this case, the second base station eNB2 performs CoMP admission control to decide whether to accept the CoMP connection of the terminal and transmits the result to the first base station eNB1 through the CoMP establishment response message. When the second base station eNB2 is capable of accepting the CoMP connection of the terminal, the first base station eNB1 sets a first timer t1 and transmits an RRC connection reconfiguration message to the terminal UE to control the terminal UE to establish access connection for the CoMP connection with the first base station eNB1 and the second base station eNB2. After the terminal UE completes the CoMP access connection establishment with the first base station eNB1 and the second base station eNB2, when the first base station eNB1 receives a RRC connection reconfiguration completed message from the terminal UE, the first base station eNB1 transmits a CoMP establishment completed message to the second base station eNB2 to complete the CoMP connection reconfiguration step for the boundary region of the first base station eNB1 and the second base station eNB2. In this case, the terminal UE performs the region monitoring step using the channel quality indicator of the first base station eNB1 even during the CoMP connection establishment step. Here, before the first timer t1 elapses a first predetermined time T1, when the terminal moves from the boundary region B12 of the first base station eNB1 and the second base station eNB2 to the center region C1 of the first base station eNB1, the channel quality indicator in the region where the terminal UE is located does not satisfy the region configuration condition of the boundary region B12 of the first base station eNB1 and the second base station eNB2 which is currently decided in accordance with the region monitoring result, the terminal UE sets the region shift suspected state and performs the region rescanning step. The first base station eNB1 redecides whether the terminal UE is located in the center region C1 of the first base station eNB1 using the region rescanning result and operates a second timer t2. When the CoMP connection establishment step for the boundary region B12 of the first base station eNB1 and the second base station eNB2 is completed, the terminal UE may transmit and receive data to and from the first base station eNB1 and the second eNB2 through the CoMP connection configuration. However, the terminal UE may continuously perform the region monitoring even during the CoMP connection establishment step or the CoMP access connection establishment step in order to check a continuous state of the region configuration condition before the second timer t1 elapses the second predetermined time T2. The continuous region monitoring step is performed for a second predetermined time T2 and when the second timer t2 exceeds the second predetermined time T2, the first base station eNB1 confirms that the terminal moves to the center region C1 of the first base station eNB1 which is currently redecided, and the first base station eNB1 transmits an RRC connection reconfiguration message to the terminal UE so as to control the terminal UE to stop the continuous region monitoring and establish the access connection for the CoMP connection release from the second base station eNB2. After the terminal UE completes the CoMP access connection establishment for the CoMP connection release from the second base station eNB2, when the first base station eNB1 receives an RRC connection reconfiguration completed message from the terminal UE, the first base station eNB1 transmits a CoMP release request message to the second base station eNB2 and receives a CoMP release response message from the second base station eNB2 as a response therefor, to complete the CoMP connection establishment step for the center region C1 of the first base station eNB1 and enters to the region monitoring state.

Here, when the region of the terminal UE is changed by the region monitoring even during the CoMP connection reconfiguration step, the CoMP connection establishment step, the CoMP access connection establishment step, the CoMP connection reconfiguration step for the changed region may be started again.

Figure 32A:
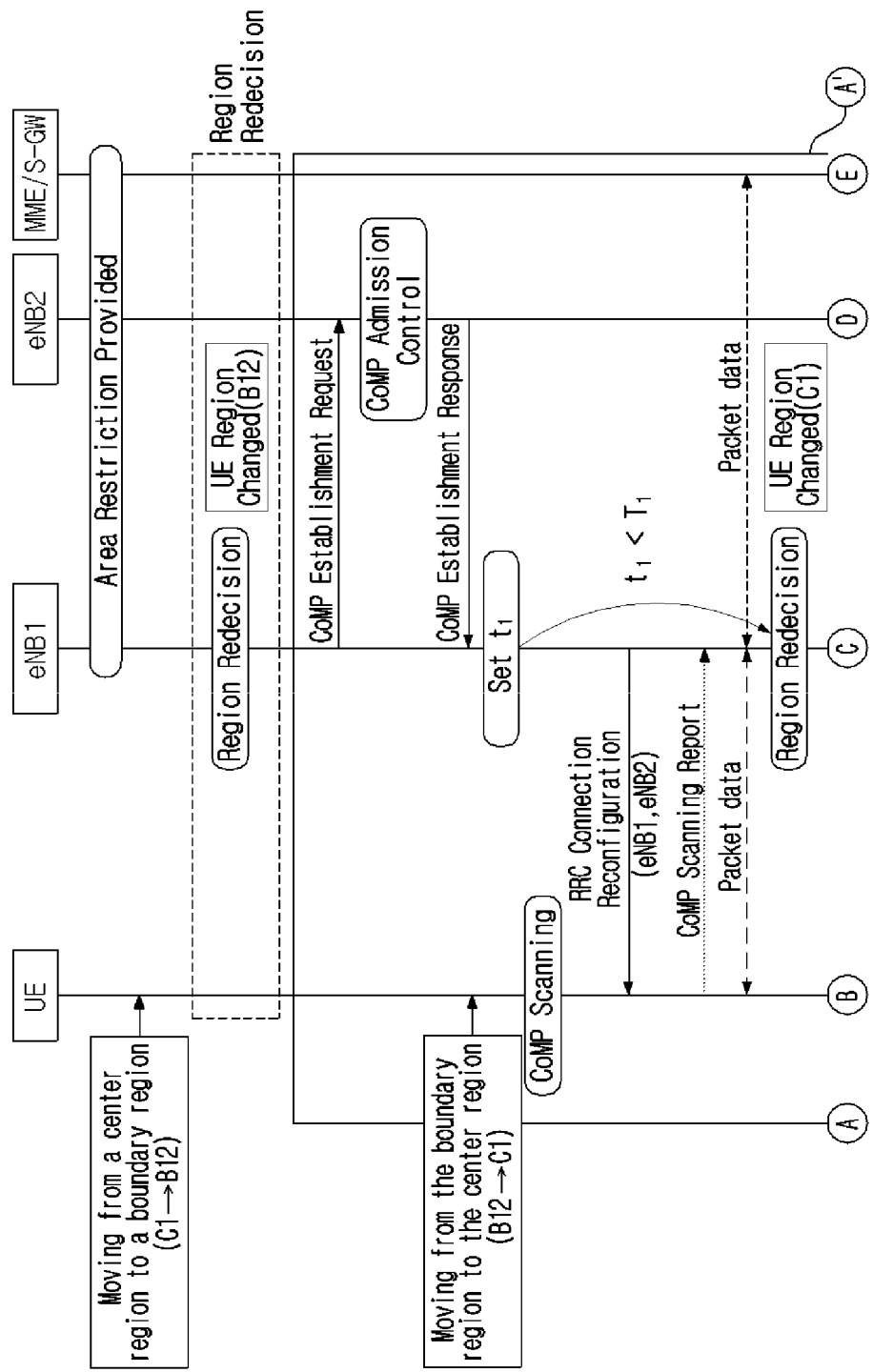
FIGS. 32A to 32C are views illustrating a CoMP connection reconfiguration step in which a terminal continuously performs region redecision even during a CoMP connection establishment step and a CoMP access connection establishment step by setting a timer.
Figure 32B:
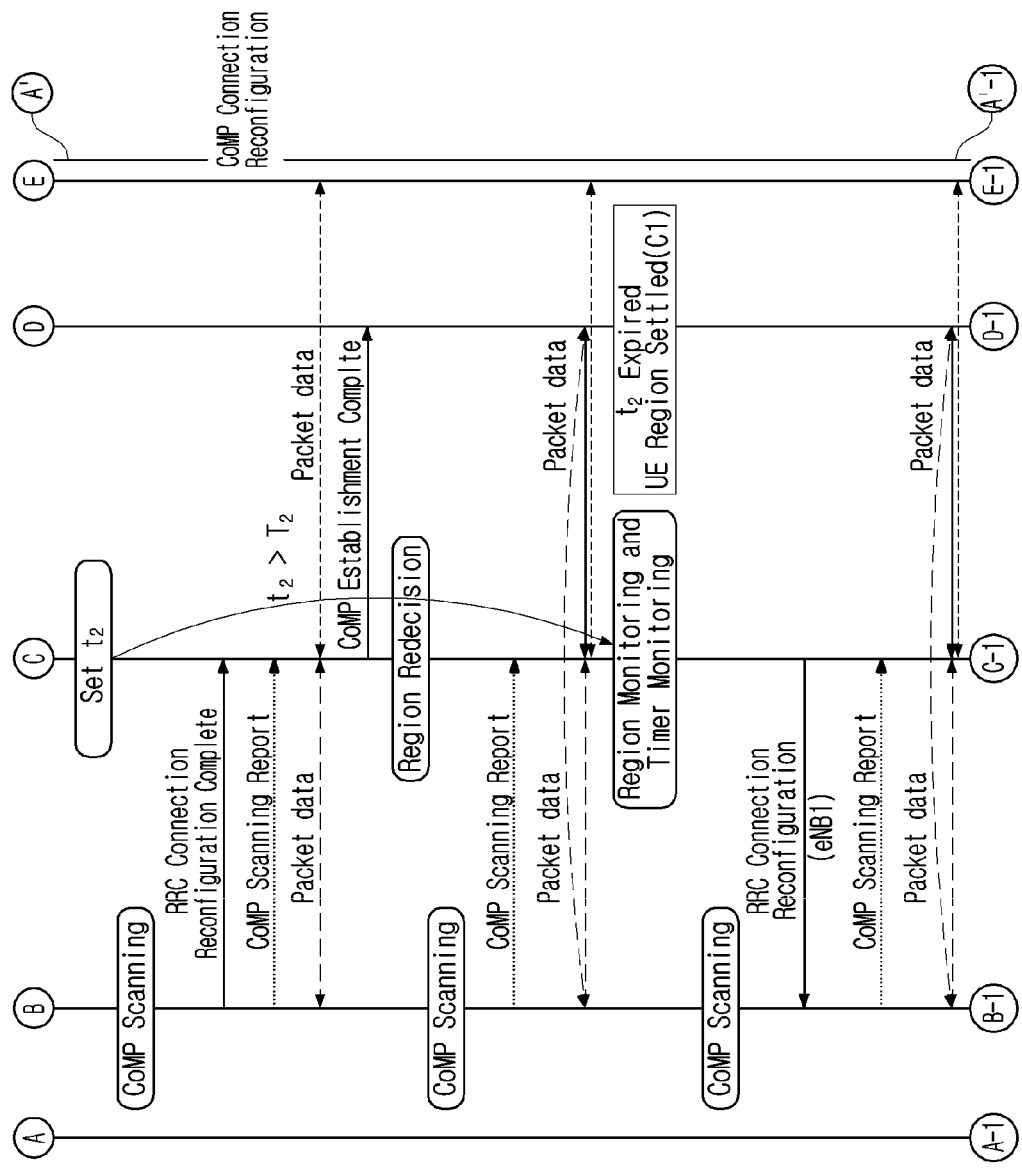
Figure 32C:
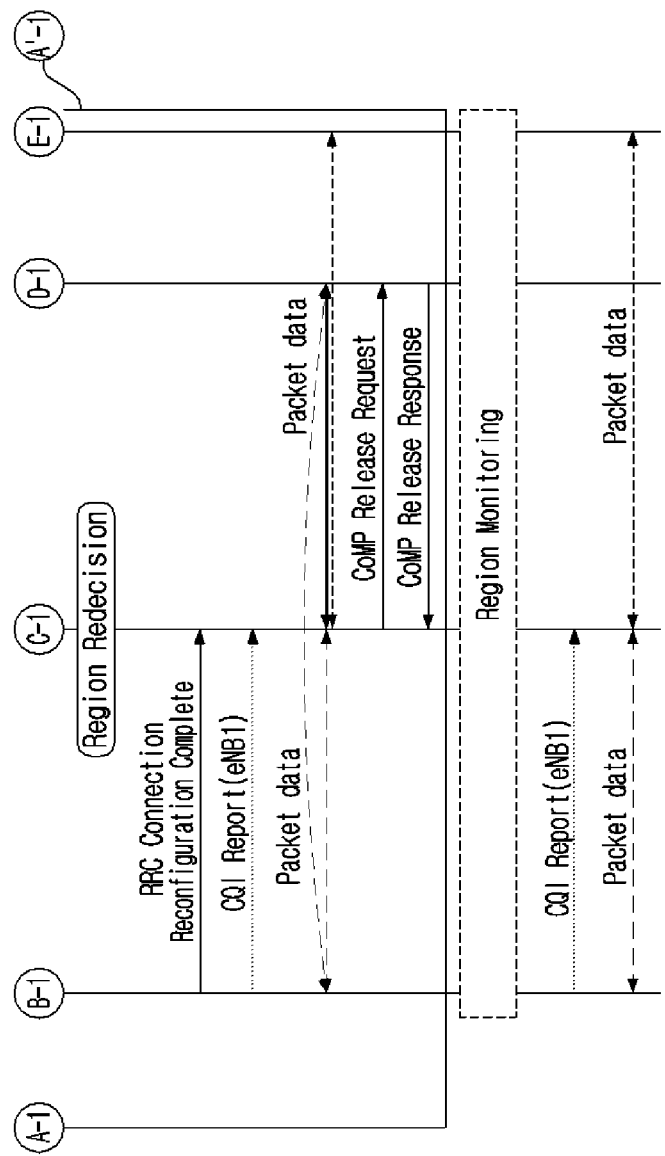

FIGS. 32A to 32C are views illustrating a CoMP connection reconfiguration step in which a base station continuously performs a region redecision step even during the CoMP connection reconfiguration step and a CoMP access connection establishment step by setting a timer.

Referring to FIGS. 32A to 32C, the first base station performs the region redecision even during a CoMP connection establishment step which is a part of the CoMP connection reconfiguration step and specifically, the first base station performs the region redecision even during a CoMP access connection establishment step which is a part of the CoMP connection establishment step. That is, an inter-region handover procedure where when the terminal moves from the center region C1 of the first base station to the boundary region B12 of the first base station and the second base station, the first base station performs the region monitoring and the region rescanning and the first base station redecides the region based on the result thereof and then completes the CoMP connection reconfiguration step which establishes the connection with the second base station and when the terminal moves from the boundary region B12 of the first base station and the second base station to the same center region C1 of the first base station before a first predetermined time elapses, the region monitoring and the region rescanning are performed and the first base station performs the CoMP connection reconfiguration step which releases the connection with the second base station which is currently connected when a second setting has elapsed after performing the region redecision based on the result therefor is illustrated.

Specifically, in the communication environment in which the base stations are synchronized, when the terminal UE moves from the center region C1 of the first base station eNB1 to the boundary region B12 of the first base station eNB1 and the second base station eNB2, in the region redecision step, the first base station eNB1 redecides whether the terminal UE is located in the boundary region B12 of the first base station eNB1 and the second base station eNB2 using the region rescanning result.

As a result of the region redecision, when the region where the terminal UE is located is changed from the center region C1 of the first base station eNB1 to the boundary region B12 of the first base station eNB1 and the second base station eNB2, the first base station eNB1 needs to perform the CoMP connection reconfiguration step for the boundary region B12 of the first base station eNB1 and the second base station eNB2. In this case, in the redecision step, if the region is redecided as the center region C1 of the first base station eNB1 so that it is decided that the region of the terminal UE is not changed, the current connection state is maintained and the terminal enters the region monitoring state. When it is redecided that the terminal UE moves to the boundary region B12 of the first base station eNB1 and the second base station eNB2, in the CoMP connection reconfiguration step, the first base station eNB1 transmits a CoMP establishment request message to the second base station eNB2 and receives a CoMP establishment response message from the second base station eNB2 as a response therefor. In this case, the second base station eNB2 performs CoMP admission control to decide whether to accept the CoMP connection of the terminal and transmits the result to the first base station eNB1 through the CoMP establishment response message. When the second base station eNB2 is capable of accepting the CoMP connection of the terminal, the first base station eNB1 sets a first timer t1 and transmits an RRC connection reconfiguration message to the terminal UE to control the terminal UE to establish access connection for the CoMP connection with the first base station eNB1 and the second base station eNB2. In this case, the first base station eNB1 receives a CoMP scanning report from the terminal UE to perform the region redecision. Here, before the timer t1 elapses the first predetermined time T1, when the terminal UE moves from the boundary region B12 of the first base station eNB1 and the second base station eNB2 to the center region C1 of the first base station eNB1, the first base station eNB1 redecides whether the terminal UE is located in the center region C1 of the first base station eNB1 using the region rescanning result and the first base station eNB1 operates the second timer t2. After the terminal UE completes the CoMP access connection establishment with the first base station eNB1 and the second base station eNB2, when the first base station eNB1 receives a RRC connection reconfiguration completed message from the terminal UE, the first base station eNB1 transmits a CoMP establishment completed message to the second base station eNB2 to complete the CoMP connection reconfiguration step for the boundary region of the first base station eNB1 and the second base station eNB2. When the CoMP connection establishment step for the boundary region B12 of the first base station eNB1 and the second base station eNB2 is completed, the terminal UE may transmit and receive data to and from the first base station eNB1 and the second eNB2 through the CoMP connection configuration. However, the first base station eNB1 may continuously perform the region redecision even during the CoMP connection establishment step or the CoMP access connection establishment step in order to check a continuous state of the region configuration condition before the second timer t1 elapses the second predetermined time T2. In this case, the first base station eNB1 controls the terminal UE to continuously perform the CoMP scanning so as to continuously perform the region redecision for the second predetermined time T2 so that the first base station eNB1 continuously receives the CoMP scanning report from the terminal UE. The continuous region redecision step is performed for the second predetermined time T2 and when the second timer t2 exceeds the second predetermined time T2, the first base station eNB1 confirms that the terminal moves to the center region C1 of the first base station eNB1 which is currently redecided, and the first base station eNB1 transmits an RRC connection reconfiguration message to the terminal UE so as to control the terminal UE to stop the CoMP scanning and establish the access connection for the CoMP connection release from the second base station eNB2. After the terminal UE completes the CoMP access connection establishment for the CoMP connection release from the second base station eNB2, when the first base station eNB1 receives an RRC connection reconfiguration completed message from the terminal UE, the first base station eNB1 transmits a CoMP release request message to the second base station eNB2 and receives a CoMP release response message from the second base station eNB2 as a response therefor, to complete the CoMP connection establishment step for the center region C1 of the first base station eNB1 and enters to the region monitoring state.

Here, when the region of the terminal UE is changed by the region redecision even during the CoMP connection reconfiguration step, the CoMP connection establishment step, the CoMP access connection establishment step, the CoMP connection reconfiguration step for the changed region may be started again.

Next, the inter-region handover procedure in which the terminal autonomously performs the region redecision when the terminal moves from the center region C1 to the boundary region B12 of the first base station and the second base station and then moves to the center region C1 of the first base station again will be described. Here, various procedures are available depending on whether to check whether to maintain the region configuration condition for a predetermined time or whether to perform the region monitoring or the region redecision during the CoMP connection configuration step.

Figure 33A:
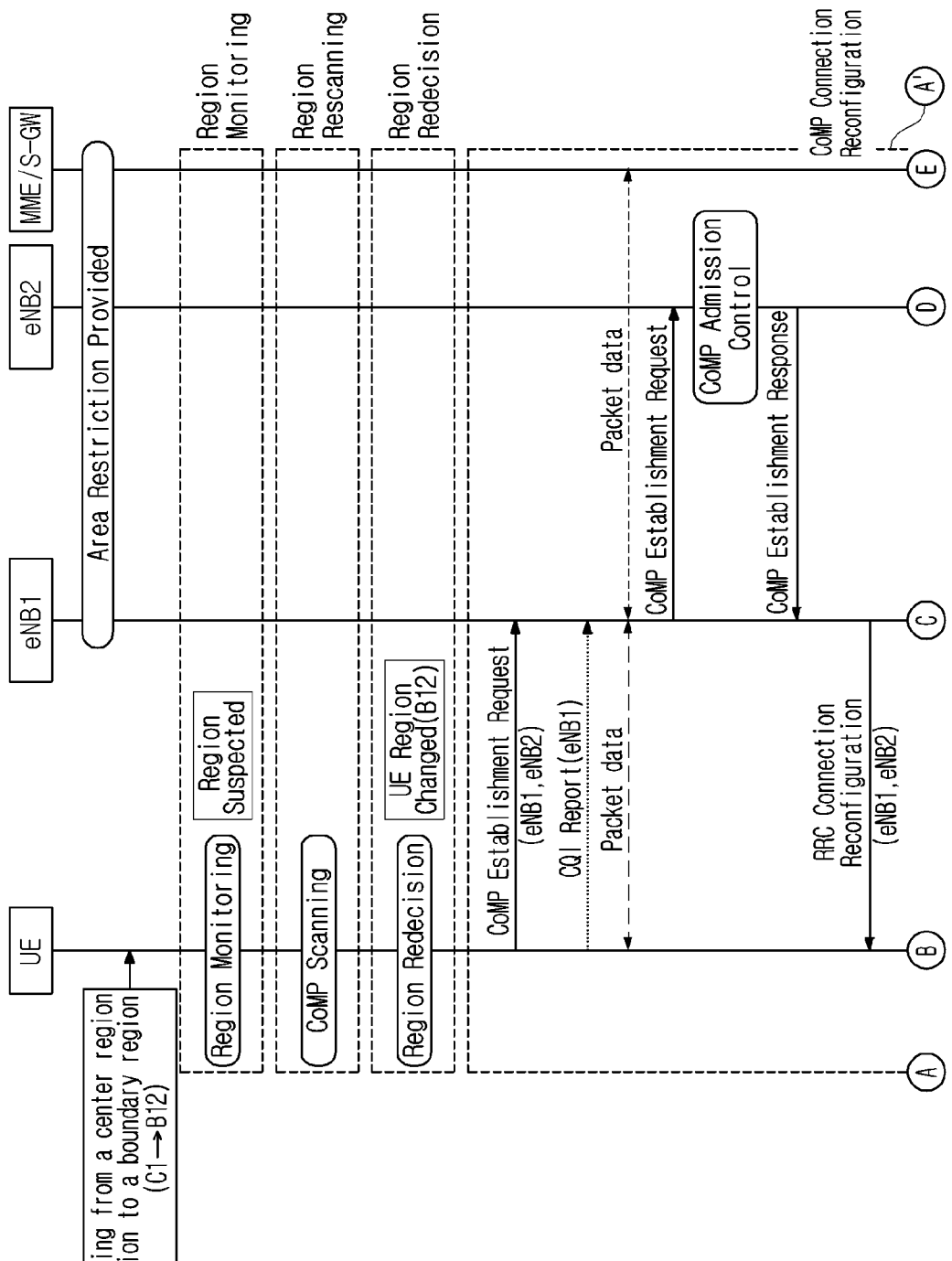
FIGS. 33A to 33C are views illustrating an inter-region handover procedure in which region monitoring or region redecision is not performed during a CoMP connection reconfiguration step.
Figure 33B:
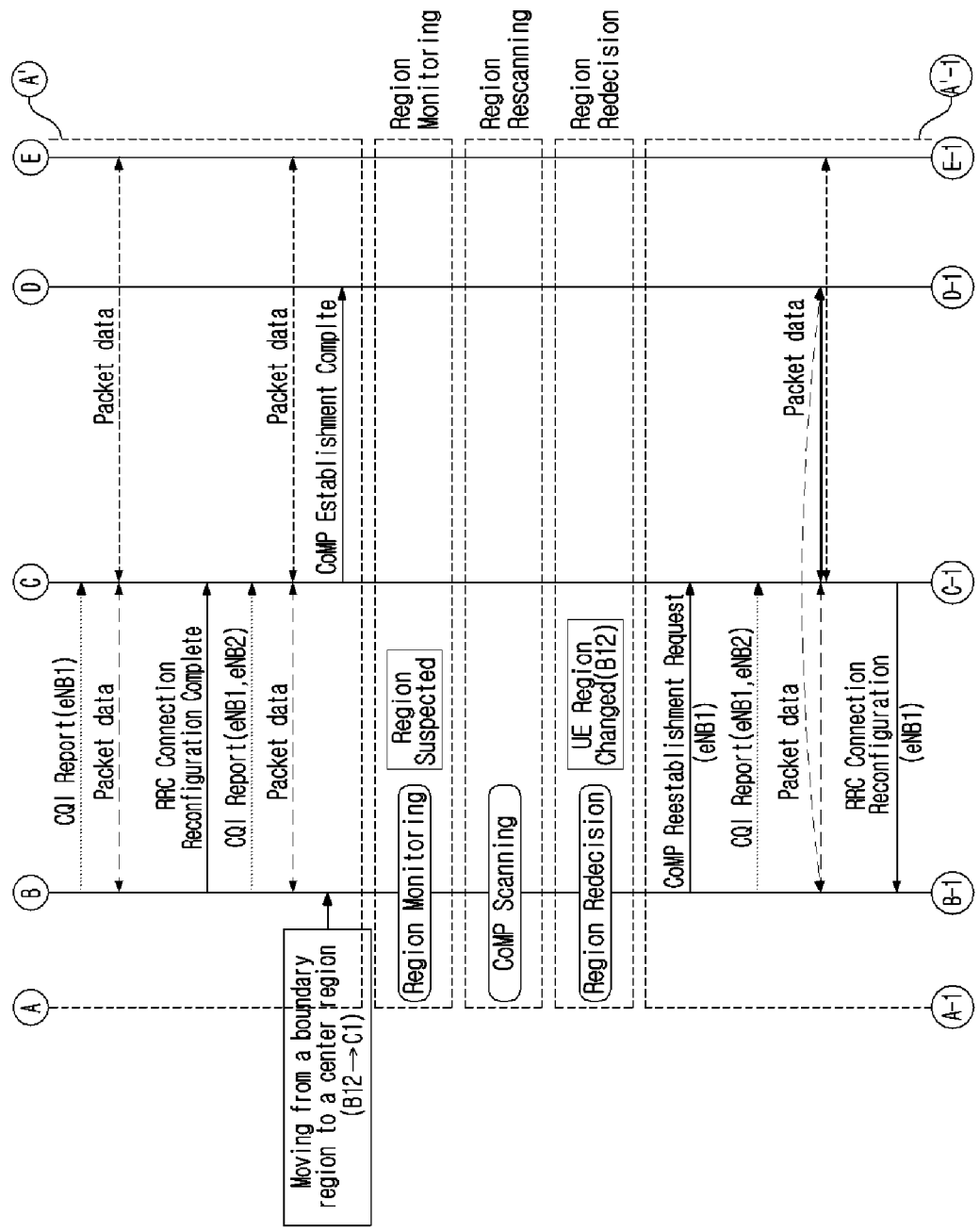
Figure 33C:
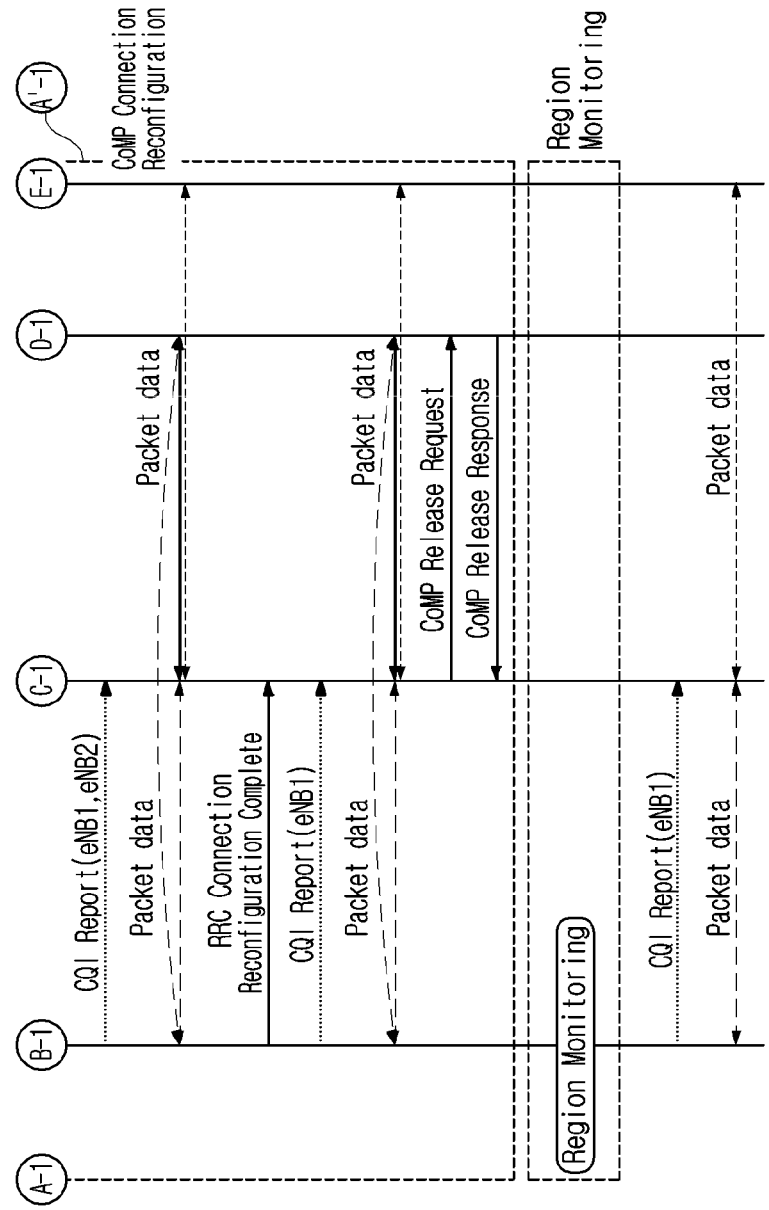

FIGS. 33A to 33C are views illustrating an inter-region handover procedure in which a region monitoring step or a region redecision step is not performed during the CoMP connection reconfiguration step.

Referring to FIGS. 33A to 33B, the region monitoring or the region redecision is not performed during the CoMP connection reconfiguration step. An inter-region handover procedure where when the terminal moves from the center region C1 of the first base station to the boundary region B12 of the first base station and the second base station, the region monitoring and the region rescanning are performed and the terminal redecides the region based on the result thereof and then provides a region redecision result to the first base station so that the first base station performs the CoMP connection reconfiguration step which establishes the connection with the second base station and when the terminal moves from the boundary region B12 of the first base station and the second base station to the center region C1 of the first base station, the region monitoring and the region rescanning are performed and the terminal redecides the region based on the result thereof and then provides the region redecision result to the first base station so that the CoMP connection reconfiguration step which releases the connection with the second base station which is currently connected is performed is illustrated.

Specifically, in a communication environment in which base stations are synchronized, when the terminal UE is located in the center region C1 of the first base station eNB1, the terminal UE performs the region monitoring step using a channel quality indicator between the terminal UE and the first base station eNB1 which is directly measured. In the region monitoring step, the terminal UE determines whether a region where the terminal UE is located satisfies the region configuration condition of the currently decided region using the channel quality indicator which is directly measured by the terminal UE.

When the terminal UE moves from the center region C1 of the first base station eNB1 to a boundary region B12 of the first base station eNB1 and a second base station eNB2, if the channel quality indicator in the region where the terminal UE is located does not satisfy the region configuration condition of the center region C1 of the first base station eNB1 which is currently decided in accordance with the region monitoring result, the terminal is set to a region shift suspected state and allows the terminal to autonomously perform the region rescanning step. When the region configuration condition of the center region C1 of the first base station eNB1 is satisfied, the region monitoring state is continuously maintained. In the region rescanning step, the terminal autonomously performs the region rescanning using the CoMP scanning method so that the terminal UE performs the CoMP scanning on a part of neighbor base stations which is capable of performing the CoMP transmission to the terminal in the neighbor list which is provided by the first base station eNB1.

The terminal UE performs the region redecision step using the region rescanning result. In the region redecision step, the terminal UE redecides whether the terminal UE is located in the boundary region B12 of the first base station eNB1 and the second base station eNB2 using the CoMP scanning result.

As a result of the region redecision, when the region where the terminal UE is located is changed from the center region C1 of the first base station eNB1 to the boundary region B12 of the first base station eNB1 and the second base station eNB2, the first base station eNB1 needs to perform the CoMP connection reconfiguration step for the boundary region B12 of the first base station eNB1 and the second base station eNB2. In this case, in the redecision step, if the region is redecided as the center region C1 of the first base station eNB1 so that it is decided that the region of the terminal UE is not changed, the current connection state is maintained and the terminal enters the region monitoring state. When it is redecided that the terminal UE moves to the boundary region B12 of the first base station eNB1 and the second base station eNB2, in the CoMP connection reconfiguration step, the terminal UE transmits a region redecision result of the boundary region B12 of the first base station eNB1 and the second base station eNB2 through a CoMP reestablishment request message to the first base station eNB1. The first base station eNB1 which receives the region redecision result from the terminal UE transmits a CoMP establishment request message to the second base station eNB2 and receives a CoMP establishment response message from the second base station eNB2 as a response therefor. In this case, the second base station eNB2 performs CoMP admission control to decide whether to accept the CoMP connection of the terminal and transmits the result to the first base station eNB1 through the CoMP establishment response message. When the second base station eNB2 is capable of accepting the CoMP connection of the terminal, the first base station eNB1 transmits an RRC connection reconfiguration message to the terminal UE to control the terminal UE to establish access connection for the CoMP connection with the first base station eNB1 and the second base station eNB2. When the second base station eNB2 cannot accept the CoMP connection of the terminal, the first base station eNB1 tries another base station to establish the CoMP connection or maintains the current connection establishment. When the first base station eNB1 receives an RRC connection reconfiguration completed message from the terminal UE after the terminal UE completes the CoMP access connection establishment with the first base station eNB1 and the second eNB2, the first base station eNB1 transmits a CoMP establishment completed message to the second base station eNB2 to complete the CoMP connection reconfiguration step.

When the CoMP connection reconfiguration step is completed, the terminal UE enters the region monitoring state in which the terminal UE performs the region monitoring step using the channel quality indicators of the first base station eNB1 and the second base station eNB2 which are measured by itself and the terminal may transmit and receive data to and from the first base station eNB1 and the second base station eNB2 through the CoMP connection configuration.

When the terminal UE moves from the boundary region B12 of the first base station eNB1 and the second base station eNB2 to the center region C1 of the first base station eNB1, if the channel quality indicator in the region where the terminal UE is located does not satisfy the region configuration condition of the boundary region B12 of the first base station eNB1 and a second base station eNB2 which is currently decided in the region monitoring step, the terminal is set to a region shift suspected state and the terminal UE autonomously perform the region rescanning step.

The terminal UE performs the region redecision step using the region rescanning result. In the region redecision step, the terminal UE redecides whether the terminal UE is located in the center region C1 of the first base station eNB1 using the CoMP scanning result.

As a result of the region redecision, when the region where the terminal UE is located is changed from the boundary region B12 of the first base station eNB1 and the second base station eNB2 to the center region C1 of the first base station eNB1, the first base station eNB1 needs to perform the CoMP connection reconfiguration step for the center region C1 of the first base station eNB1. In the CoMP connection reconfiguration step, the first base station eNB1 transmits an RRC connection reconfiguration message to the terminal UE to control the terminal UE to establish the access connection for the CoMP connection release from the second base station eNB2. After the terminal UE completes the CoMP access connection establishment for the CoMP connection release from the second base station eNB2, when the first base station eNB1 receives an RRC connection reconfiguration completed message from the terminal UE, the first base station eNB1 transmits a CoMP release request message to the second base station eNB2 and receives a CoMP release response message from the second base station eNB2 as a response therefor, to complete the CoMP connection reconfiguration step for the center region C1 of the first base station eNB1 and enters to the region monitoring state.

When the CoMP connection reconfiguration step is completed, the terminal UE enters the region monitoring state in which the terminal UE performs the region monitoring step using the channel quality indicator of the first base station eNB1 which are measured by itself and the terminal may transmit and receive data to and from the first base station eNB1.

Figure 34A:
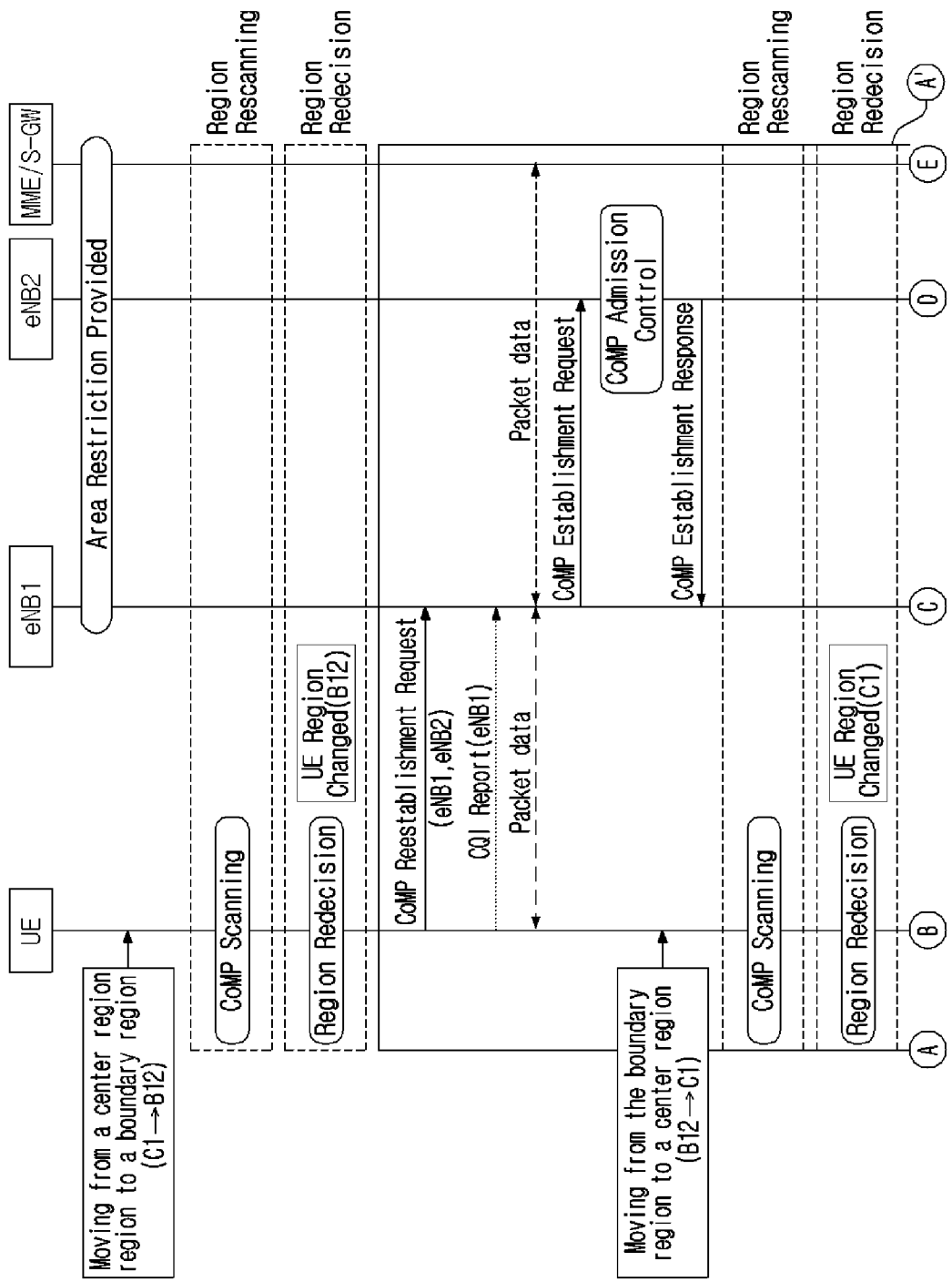
FIGS. 34A to 34C are views illustrating a terminal-oriented inter-region handover procedure in which region rescanning and region redecision are continuously performed.
Figure 34B:
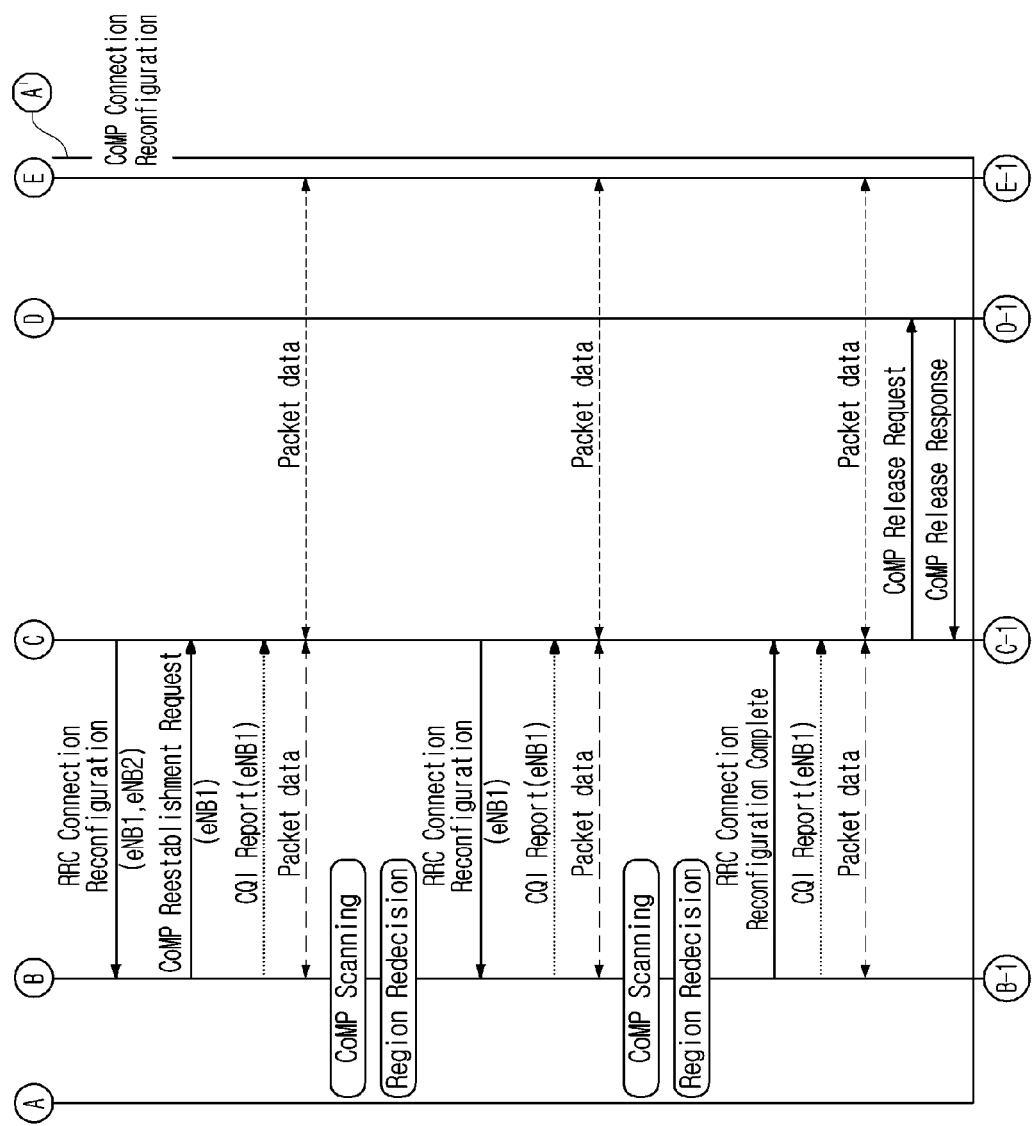
Figure 34C:
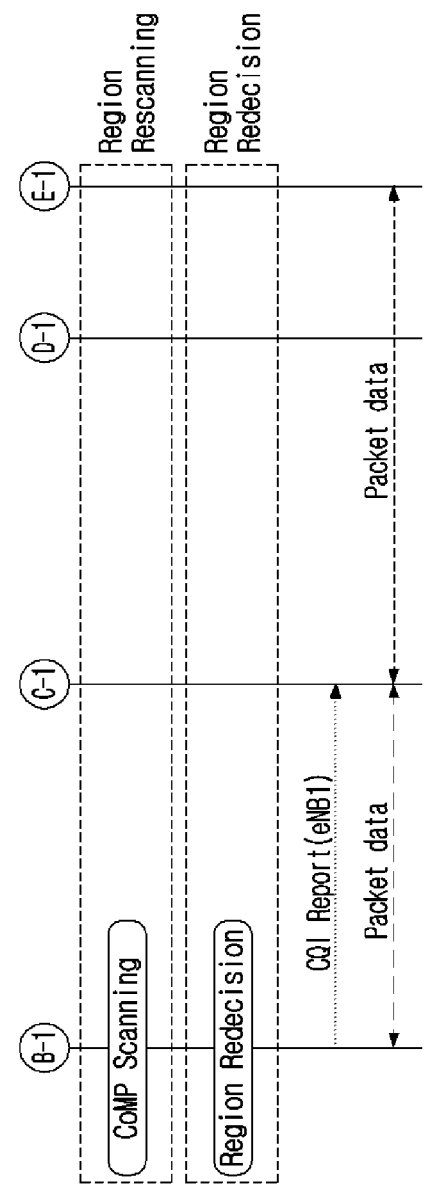
Figure 35A:
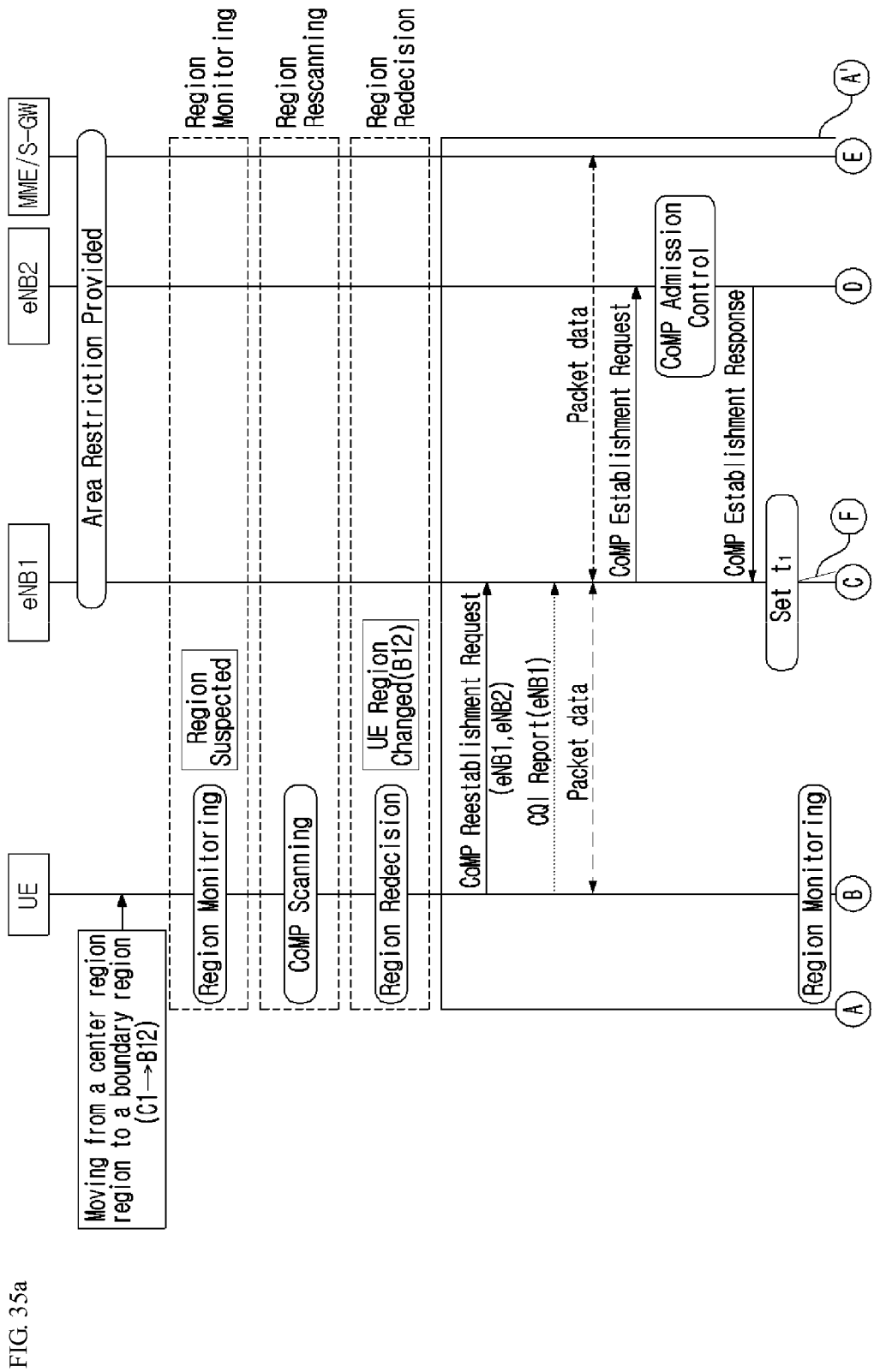
FIGS. 35A to 35D are views illustrating a terminal-oriented inter-region handover procedure in which region monitoring is continuously performed even during a CoMP connection establishment step and a CoMP access connection establishment step by setting a timer.
Figure 35B:
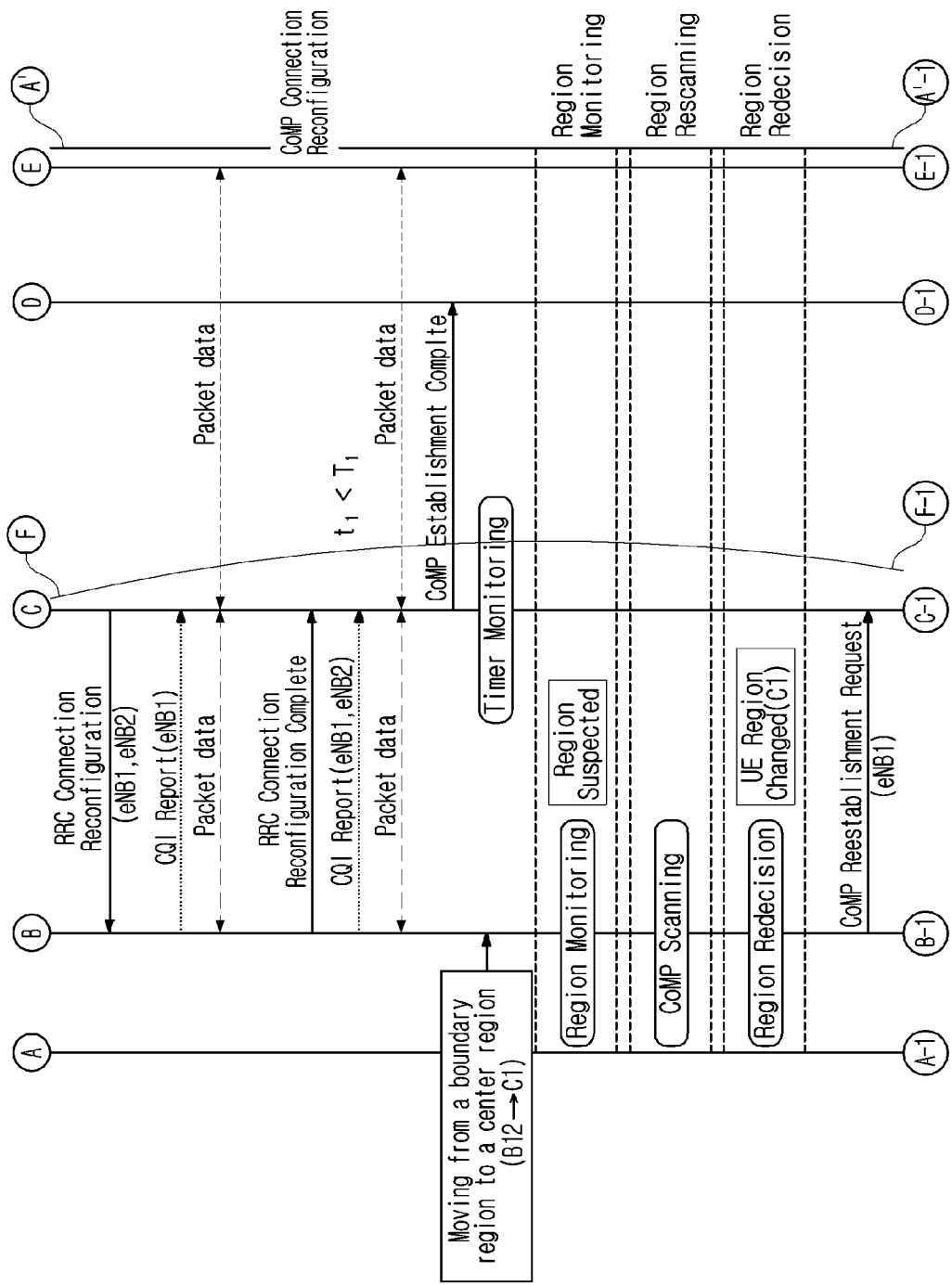
Figure 35C:
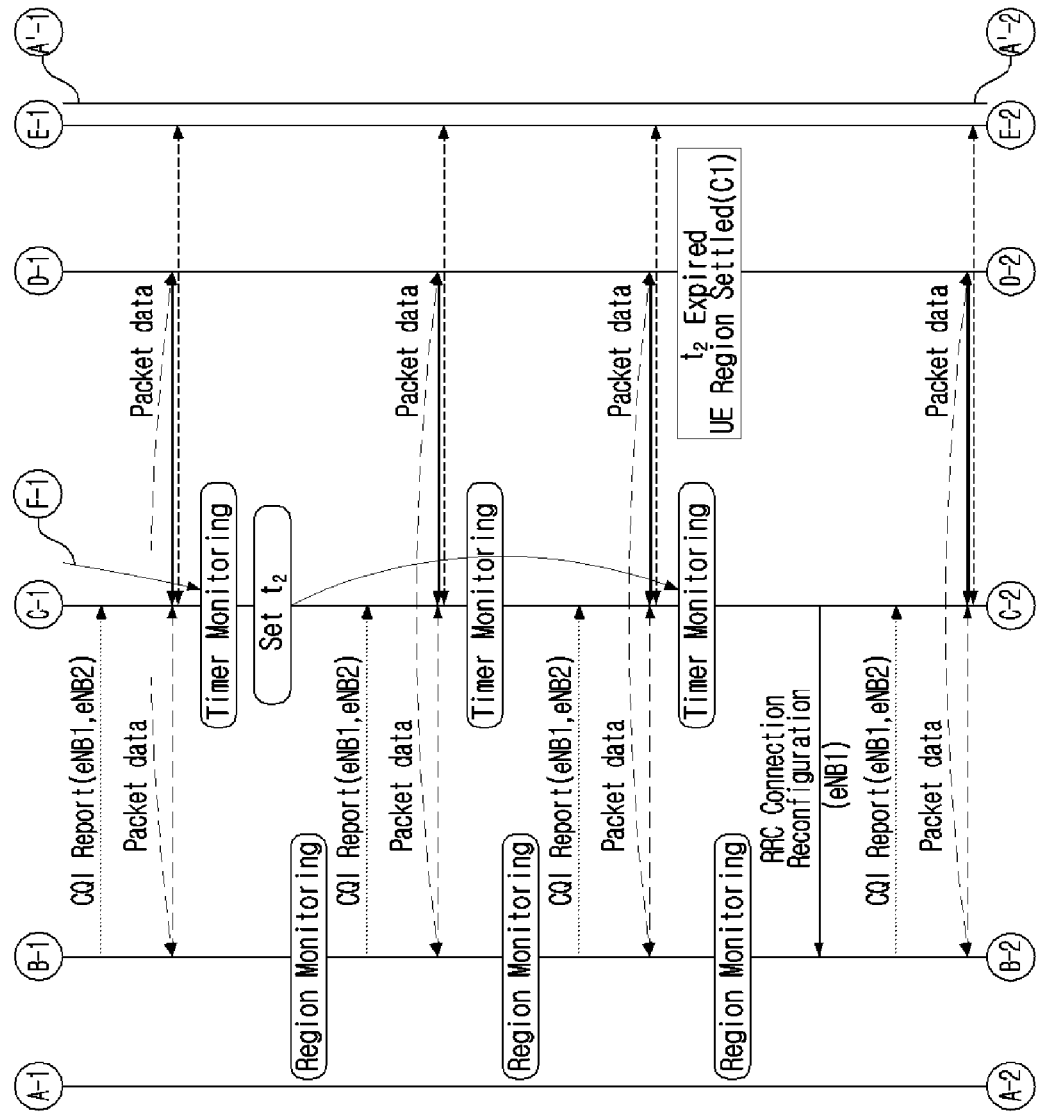
Figure 35D:
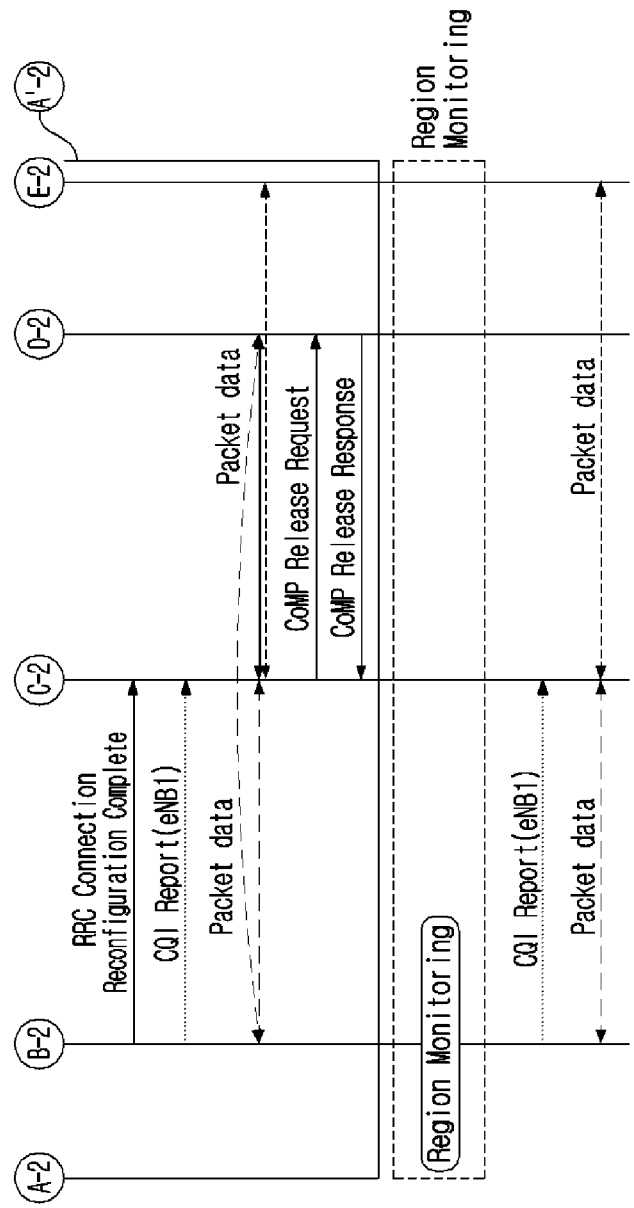

FIGS. 34A to 34C are views illustrating a terminal-oriented inter-region handover procedure in which a region rescanning step and a region redecision step are continuously performed.

Referring to FIGS. 34A to 34C, the terminal performs the region redecision even during a CoMP connection establishment step which is a part of the CoMP connection reconfiguration step and specifically, the terminal performs the region redecision even during a CoMP access connection establishment step which is a part of the CoMP connection establishment step. An inter-region handover procedure where when the terminal moves from the center region C1 of the first base station to the boundary region B12 of the first base station and the second base station, the terminal provides the region redecision result to the first base station through the continuous region monitoring and region rescanning of the terminal so that the first base station performs the CoMP connection reconfiguration step which establishes the connection with the second base station and when the terminal moves from the boundary region B12 of the first base station and the second base station to the same center region C1 of the first base station, the terminal provides the region redecision result to the first base station through the continuous region monitoring and region rescanning of the terminal so that the first base station performs the CoMP connection reconfiguration step which releases the connection with the second base station which is currently connected is illustrated.

Specifically, in the communication environment in which the base stations are synchronized, when the terminal UE is located in the center region C1 of the first base station eNB1, the terminal continuously performs the region rescanning and performs the region redecision using a region rescanning result. In the region rescanning step, the terminal UE autonomously performs the region rescanning using the CoMP scanning method so that the terminal UE performs the CoMP scanning on a part of neighbor base stations which is capable of performing the CoMP transmission to the terminal in the neighbor list which is provided by the first base station eNB1.

The terminal UE performs the region redecision step using the region rescanning result. When the terminal UE moves from the center region C1 of the first base station eNB1 to the boundary region B12 of the first base station eNB1 and the second base station eNB2, in the region redecision step, the terminal UE redecides whether the terminal UE is located in the boundary region B12 of the first base station eNB1 and the second base station eNB2 using the CoMP scanning result.

As a result of the region redecision, when the region where the terminal UE is located is changed from the center region C1 of the first base station eNB1 to the boundary region B12 of the first base station eNB1 and the second base station eNB2, the first base station eNB1 needs to perform the CoMP connection reconfiguration step for the boundary region B12 of the first base station eNB1 and the second base station eNB2. In this case, in the redecision step, if the region is redecided as the center region C1 of the first base station eNB1 so that it is decided that the region of the terminal UE is not changed, the current connection state is maintained and the terminal enters region rescanning and region redecision state. When it is redecided that the terminal UE moves to the boundary region B12 of the first base station eNB1 and the second base station eNB2, the terminal UE transmits a region redecision result of the boundary region B12 of the first base station eNB1 and the second base station eNB2 through a CoMP reestablishment request message to the first base station eNB1. The first base station eNB1 which receives the region redecision result from the terminal UE transmits a CoMP establishment request message to the second base station eNB2 and receives a CoMP establishment response message from the second base station eNB2 as a response therefor. In this case, the second base station eNB2 performs CoMP admission control to decide whether to accept the CoMP connection of the terminal and transmits the result to the first base station eNB1 through the CoMP establishment response message. When the second base station eNB2 is capable of accepting the CoMP connection of the terminal, the first base station eNB1 transmits an RRC connection reconfiguration message to the terminal UE to control the terminal UE to establish access connection for the CoMP connection with the first base station eNB1 and the second base station eNB2. In this case, the terminal continuously performs the region rescanning and the region redecision. In this case, when the terminal moves from the boundary region B12 of the first base station eNB1 and the second base station eNB2 to the center region C1 of the first base station eNB1, the terminal UE redecides whether to be located in the center region C1 of the first base station eNB1 using the region rescanning result. When it is redecided that the terminal UE moves to the center region C1 of the first base station eNB1, the terminal UE transmits a region redecision result of the center region C1 of the first base station eNB1 through the CoMP reestablishment request message to the first base station eNB1. The first base station eNB1 which receives the region redecision result from the terminal UE transmits the RRC connection reconfiguration message to the terminal UE to control the terminal UE to establish the access connection for the CoMP connection release from the second base station eNB2. After the terminal UE completes the CoMP access connection establishment for the CoMP connection release from the second base station eNB2, when the first base station eNB1 receives an RRC connection reconfiguration completed message from the terminal UE, the first base station eNB1 transmits a CoMP release request message to the second base station eNB2 and receives a CoMP release response message from the second base station eNB2 as a response therefor, to complete the CoMP connection establishment step for the center region C1 of the first base station eNB1.

When the CoMP connection reconfiguration step is completed, the terminal UE enters to a continuous region rescanning and region redecision state in which the region rescanning and the region redecision are continuously performed and the terminal may transmit and receive the data to and from the first base station eNB1.

FIGS. 31A to 31C are views illustrating a terminal-oriented inter-region handover procedure in which a region monitoring step is continuously performed even during a CoMP connection reconfiguration step and a CoMP access connection establishment step by setting a timer.

Referring to FIGS. 35A to 35D, the terminal performs the region monitoring even during a CoMP connection establishment step which is a part of the CoMP connection reconfiguration step and specifically, the terminal performs the region monitoring even during a CoMP access connection establishment step which is a part of the CoMP connection establishment step. An inter-region handover procedure where when the terminal moves from the center region C1 of the first base station to the boundary region B12 of the first base station and the second base station, the region monitoring and the region rescanning are performed and the terminal redecides the region based on the result thereof and then provides a region redecision result to the first base station so that the first base station performs the CoMP connection reconfiguration step which establishes the connection with the second base station and when the terminal moves from the boundary region B12 of the first base station and the second base station to the center region C1 of the first base station before the first predetermined time elapses, the region monitoring and the region rescanning are performed and the terminal provides the region redecision result to the first base station after redeciding the region based on the result thereof and then performs the CoMP connection reconfiguration step which releases the connection with the second base station which is currently connected when the second predetermined time elapses is illustrated.

Specifically, in a communication environment in which base stations are synchronized, when the terminal UE is located in the center region C1 of the first base station eNB1, the terminal UE performs the region monitoring step using a channel quality indicator between the terminal UE and the first base station eNB1 which is directly measured. In the region monitoring step, the terminal UE determines whether a region where the terminal UE is located satisfies the region configuration condition of the currently decided region using the channel quality indicator which is directly measured by the terminal UE.

When the terminal UE moves from the center region C1 of the first base station eNB1 to a boundary region B12 of the first base station eNB1 and a second base station eNB2, if the channel quality indicator in the region where the terminal UE is located does not satisfy the region configuration condition of the center region C1 of the first base station eNB1 which is currently decided in accordance with the region monitoring result, the terminal is set to a region shift suspected state and the terminal autonomously performs the region rescanning step. When the region configuration condition of the center region C1 of the first base station eNB1 is satisfied, the region monitoring state is continuously maintained. In the region rescanning step, the terminal autonomously performs the region rescanning using the CoMP scanning method so that the terminal UE performs the CoMP scanning on a part of neighbor base stations which is capable of performing the CoMP transmission to the terminal in the neighbor list which is provided by the first base station eNB1.

The terminal UE performs the region redecision step using the region rescanning result. In the region redecision step, the terminal UE redecides whether the terminal UE is located in the boundary region B12 of the first base station eNB1 and the second base station eNB2 using the CoMP scanning result.

As a result of the region redecision, when the region where the terminal UE is located is changed from the center region C1 of the first base station eNB1 to the boundary region B12 of the first base station eNB1 and the second base station eNB2, the first base station eNB1 needs to perform the CoMP connection reconfiguration step for the boundary region B12 of the first base station eNB1 and the second base station eNB2. In this case, in the redecision step, if the region is redecided as the center region C1 of the first base station eNB1 so that it is decided that the region of the terminal UE is not changed, the current connection state is maintained and the terminal enters the region monitoring state. When it is redecided that the terminal UE moves to the boundary region B12 of the first base station eNB1 and the second base station eNB2, in the CoMP connection reconfiguration step, the terminal UE transmits a region redecision result of the boundary region B12 of the first base station eNB1 and the second base station eNB2 through a CoMP reestablishment request message to the first base station eNB1. The first base station eNB1 which receives the region redecision result from the terminal UE transmits a CoMP establishment request message to the second base station eNB2 and receives a CoMP establishment response message from the second base station eNB2 as a response therefor. In this case, the second base station eNB2 performs CoMP admission control to decide whether to accept the CoMP connection of the terminal and transmits the result to the first base station eNB1 through the CoMP establishment response message. When the second base station eNB2 is capable of accepting the CoMP connection of the terminal, the first base station eNB1 sets a first timer t1 and transmits an RRC connection reconfiguration message to the terminal UE to control the terminal UE to establish access connection for the CoMP connection with the first base station eNB1 and the second base station eNB2. After the terminal UE completes the CoMP access connection establishment with the first base station eNB1 and the second base station eNB2, when the first base station eNB1 receives a RRC connection reconfiguration completed message from the terminal UE, the first base station eNB1 transmits a CoMP establishment completed message to the second base station eNB2 to complete the CoMP connection reconfiguration step for the boundary region of the first base station eNB1 and the second base station eNB2. When the CoMP connection establishment step for the boundary region B12 of the first base station eNB1 and the second base station eNB2 is completed, the terminal UE may transmit and receive data to and from the first base station eNB1 and the second eNB2 through the CoMP connection configuration. However, the terminal UE may continuously perform the region monitoring even during the CoMP connection establishment step or the CoMP access connection establishment step in order to check a continuous state of the region configuration condition before the first timer t1 elapses the first predetermined time T1. Here, before the timer t1 elapses the first predetermined time T1, when the terminal UE moves from the boundary region B12 of the first base station eNB1 and the second base station eNB2 to the center region C1 of the first base station eNB1, the terminal UE performs the region rescanning and redecides whether to be located in the center region C1 of the first base station eNB1 using the result thereof and transmits the region redecision result of the center region C1 of the first base station eNB1 to the first base station eNB1 through the CoMP reestablishment request message. The first base station eNB1 which receives the region redecision result from the terminal UE operates the second timer t2 and maintains the current CoMP connection establishment for the second predetermined time T2. When the second timer t2 exceeds the second predetermined time T2, the first base station eNB1 confirms that the terminal moves to the center region C1 of the first base station eNB1 which is currently redecided, and the first base station eNB1 transmits an RRC connection reconfiguration message to the terminal UE so as to control the terminal UE to stop the CoMP scanning and establish the access connection for the CoMP connection release from the second base station eNB2. After the terminal UE completes the CoMP access connection establishment for the CoMP connection release from the second base station eNB2, when the first base station eNB1 receives an RRC connection reconfiguration completed message from the terminal UE, the first base station eNB1 transmits a CoMP release request message to the second base station eNB2 and receives a CoMP release response message from the second base station eNB2 as a response therefor, to complete the CoMP connection establishment step for the center region C1 of the first base station eNB1 and enters to the region monitoring state.

Here, when the region of the terminal UE is changed by the region redecision even during the CoMP connection reconfiguration step, the CoMP connection establishment step, the CoMP access connection establishment step, the CoMP connection reconfiguration step for the changed region may be started again.

Figure 36A:
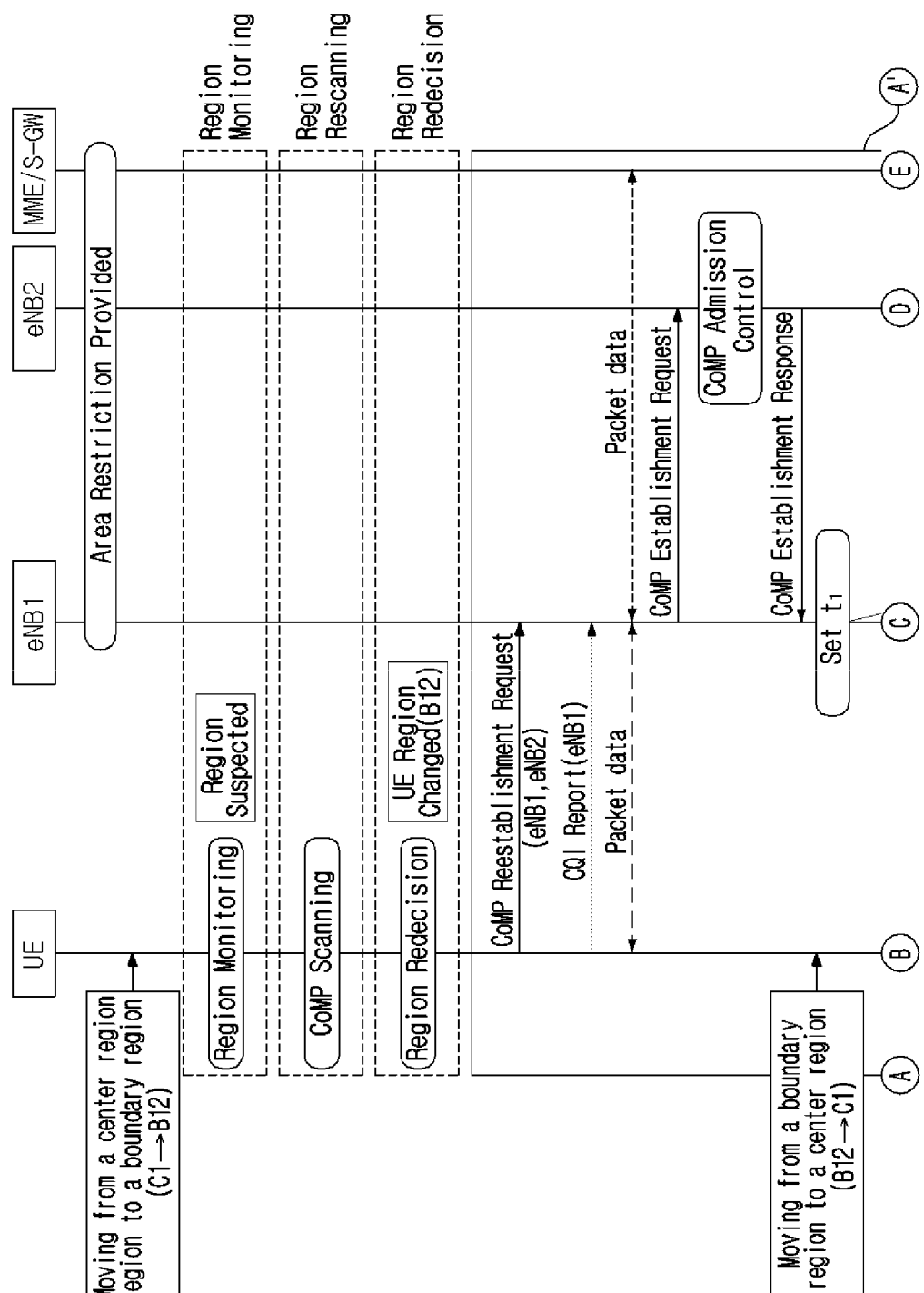
FIGS. 36A to 36C are views illustrating a terminal-oriented inter-region handover procedure in which region redecision is continuously performed even during a CoMP connection establishment step and a CoMP access connection establishment step by setting a timer.
Figure 36B:
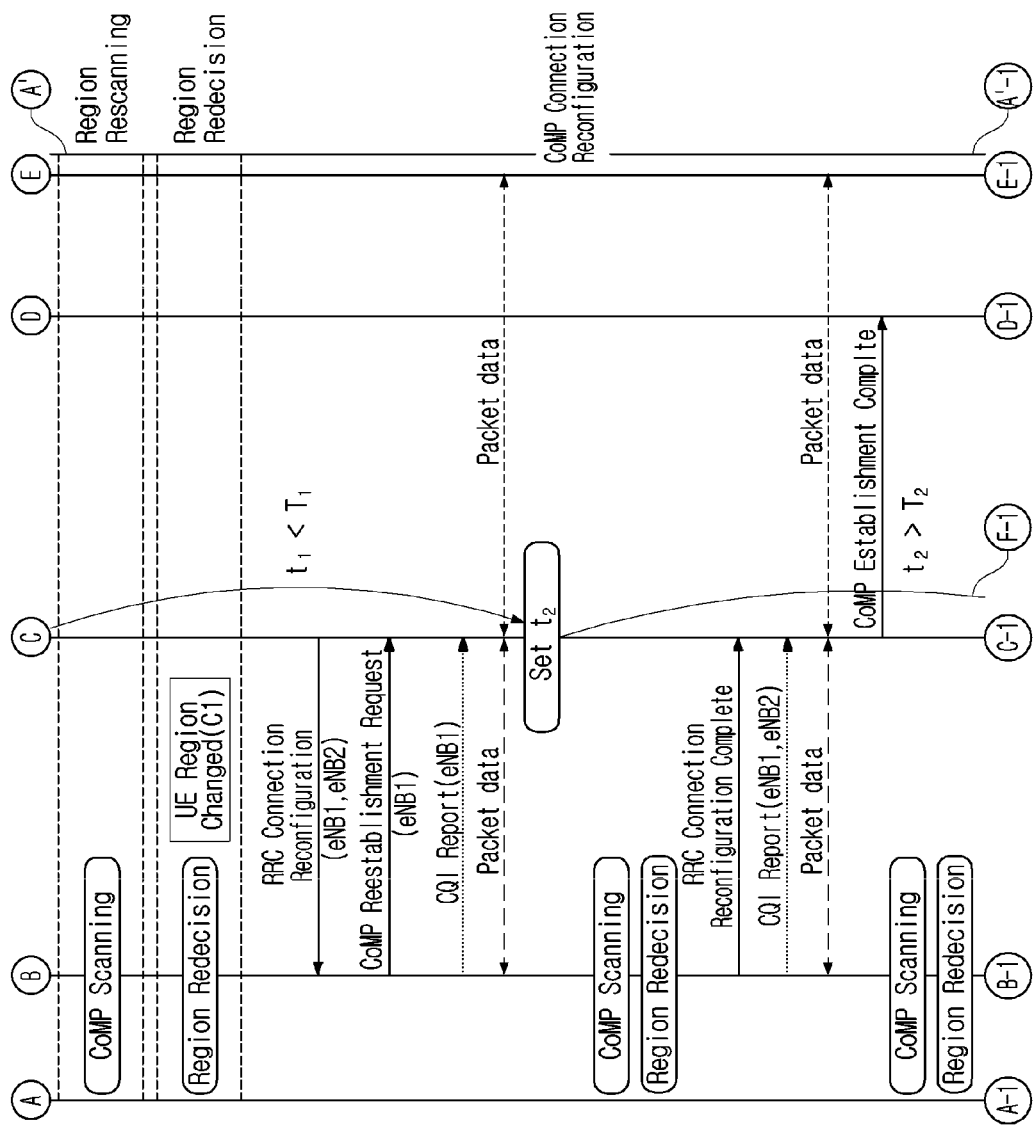
Figure 36C:
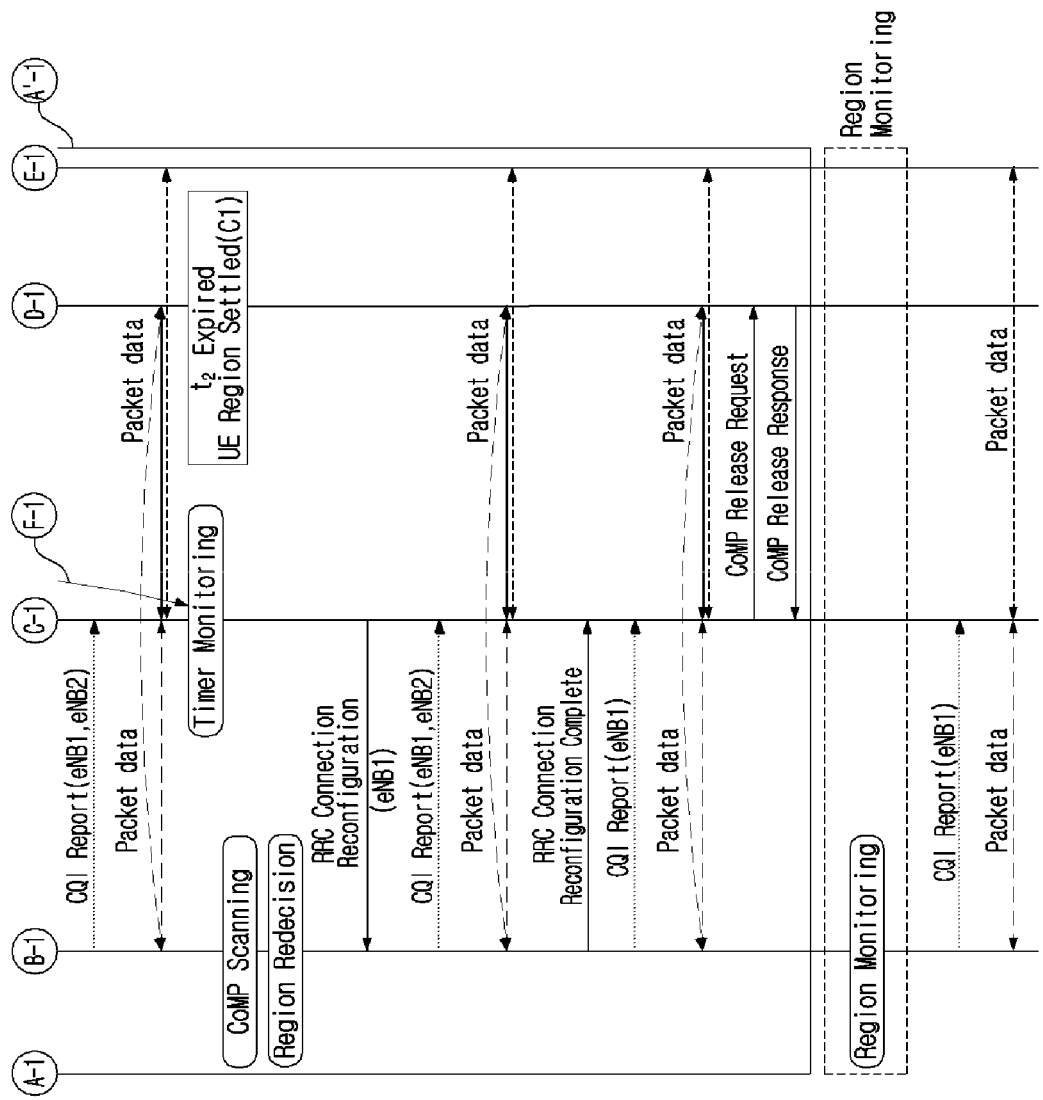

FIGS. 36A to 36C are views illustrating a terminal-oriented inter-region handover procedure in which a region redecision step is continuously performed even during a CoMP connection reconfiguration step and a CoMP access connection establishment step by setting a timer.

Referring to FIGS. 36A to 36C, in a communication environment in which base stations are synchronized, when the terminal UE is located in the center region C1 of the first base station eNB1, the terminal UE performs the region monitoring step using a channel quality indicator between the terminal UE and the first base station eNB1 which is directly measured. In the region monitoring step, the terminal UE determines whether a region where the terminal UE is located satisfies the region configuration condition of the currently decided region using the channel quality indicator which is directly measured by the terminal UE.

When the terminal UE moves from the center region C1 of the first base station eNB1 to a boundary region B12 of the first base station eNB1 and a second base station eNB2, if the channel quality indicator in the region where the terminal UE is located does not satisfy the region configuration condition of the center region C1 of the first base station eNB1 which is currently decided in accordance with the region monitoring result, the terminal is set to a region shift suspected state and the terminal autonomously performs the region rescanning step. When the region configuration condition of the center region C1 of the first base station eNB1 is satisfied, the region monitoring state is continuously maintained. In the region rescanning step, the terminal autonomously performs the region rescanning using the CoMP scanning method so that the terminal UE performs the CoMP scanning on a part of neighbor base stations which is capable of performing the CoMP transmission to the terminal in the neighbor list which is provided by the first base station eNB1.

The terminal UE performs the region redecision step using the region rescanning result. In the region redecision step, the terminal UE redecides whether the terminal UE is located in the boundary region B12 of the first base station eNB1 and the second base station eNB2 using the CoMP scanning result.

As a result of the region redecision, when the region where the terminal UE is located is changed from the center region C1 of the first base station eNB1 to the boundary region B12 of the first base station eNB1 and the second base station eNB2, the first base station eNB1 needs to perform the CoMP connection reconfiguration step for the boundary region B12 of the first base station eNB1 and the second base station eNB2. In this case, in the redecision step, if the region is redecided as the center region C1 of the first base station eNB1 so that it is decided that the region of the terminal UE is not changed, the current connection state is maintained and the terminal enters the region monitoring state. When it is redecided that the terminal UE moves to the boundary region B12 of the first base station eNB1 and the second base station eNB2, in the CoMP connection reconfiguration step, the terminal UE transmits a region redecision result of the boundary region B12 of the first base station eNB1 and the second base station eNB2 through a CoMP reestablishment request message to the first base station eNB1. The first base station eNB1 which receives the region redecision result from the terminal UE transmits a CoMP establishment request message to the second base station eNB2 and receives a CoMP establishment response message from the second base station eNB2 as a response therefor. In this case, the second base station eNB2 performs CoMP admission control to decide whether to accept the CoMP connection of the terminal and transmits the result to the first base station eNB1 through the CoMP establishment response message. When the second base station eNB2 is capable of accepting the CoMP connection of the terminal, the first base station eNB1 sets a first timer t1 and transmits an RRC connection reconfiguration message to the terminal UE to control the terminal UE to establish access connection for the CoMP connection with the first base station eNB1 and the second base station eNB2. In this case, the terminal performs the CoMP scanning and the region redecision. Here, before the timer t1 elapses the first predetermined time T1, when the terminal UE moves from the boundary region B12 of the first base station eNB1 and the second base station eNB2 to the center region C1 of the first base station eNB1, the terminal UE redecides whether to be located in the center region C1 of the first base station eNB1 using the region rescanning result and transmits the region redecision result of the center region C1 of the first base station eNB1 to the first base station eNB1 through the CoMP reestablishment request message. The first base station eNB1 which receives the region redecision result from the terminal UE operates the second timer t2. After the terminal UE completes the CoMP access connection establishment with the first base station eNB1 and the second base station eNB2, when the first base station eNB1 receives a RRC connection reconfiguration completed message from the terminal UE, the first base station eNB1 transmits a CoMP establishment completed message to the second base station eNB2 to complete the CoMP connection reconfiguration step for the boundary region of the first base station eNB1 and the second base station eNB2. When the CoMP connection establishment step for the boundary region B12 of the first base station eNB1 and the second base station eNB2 is completed, the terminal UE may transmit and receive data to and from the first base station eNB1 and the second eNB2 through the CoMP connection configuration. However, the terminal UE continuously performs the region rescanning and the region redecision even during the CoMP connection establishment step or the CoMP access connection establishment step in order to check a continuous state of the region configuration condition before the second timer t1 elapses the second predetermined time T2. When the second timer t2 exceeds the second predetermined time T2, the first base station eNB1 confirms that the terminal moves to the center region C1 of the first base station eNB1 which is currently redecided, and the first base station eNB1 transmits an RRC connection reconfiguration message to the terminal UE so as to control the terminal UE to stop the region rescanning and the region redecision and establish the access connection for the CoMP connection release from the second base station eNB2. After the terminal UE completes the CoMP access connection establishment for the CoMP connection release from the second base station eNB2, when the first base station eNB1 receives an RRC connection reconfiguration completed message from the terminal UE, the first base station eNB1 transmits a CoMP release request message to the second base station eNB2 and receives a CoMP release response message from the second base station eNB2 as a response therefor, to complete the CoMP connection establishment step for the center region C1 of the first base station eNB1 and enters to the region monitoring state.

Here, when the region of the terminal UE is changed by the region redecision even during the CoMP connection reconfiguration step, the CoMP connection establishment step, the CoMP access connection establishment step, the CoMP connection reconfiguration step for the changed region may be started again.

Next, described are inter-region handover procedures for a scenario where the terminal illustrated in FIGS. 15 and 16 moves from the boundary region B12 of the first base station and the second base station to the center region C1 of the first base station. Specifically, a region redecision step and a CoMP connection reconfiguration step among the inter-region handover procedure in which a base station initiatively performs the region redecision will be described. Here, various procedures are available depending on whether to check a state where a region configuration condition is maintained for a predetermined, whether to perform the region monitoring or the region redecision during the CoMP connection reconfiguration step as follows and inter-region handover procedures which checks the state where the region configuration condition is maintained for a predetermined time will be described.

Figure 37A:
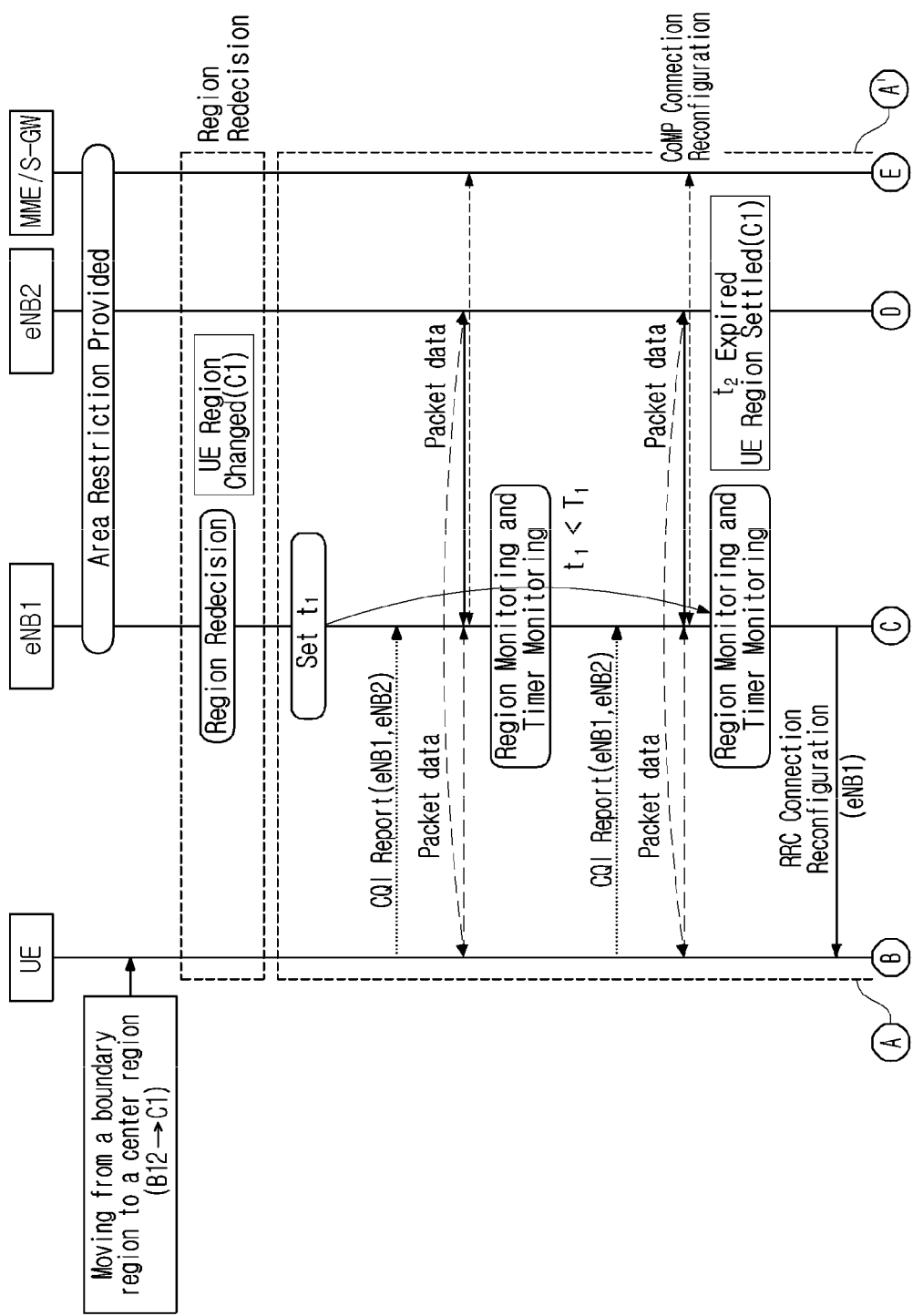
FIGS. 37A and 37B are views illustrating a CoMP connection reconfiguration step in which a base station continuously performs region monitoring even during a CoMP connection establishment step and a CoMP access connection establishment step by setting a timer.
Figure 37B:
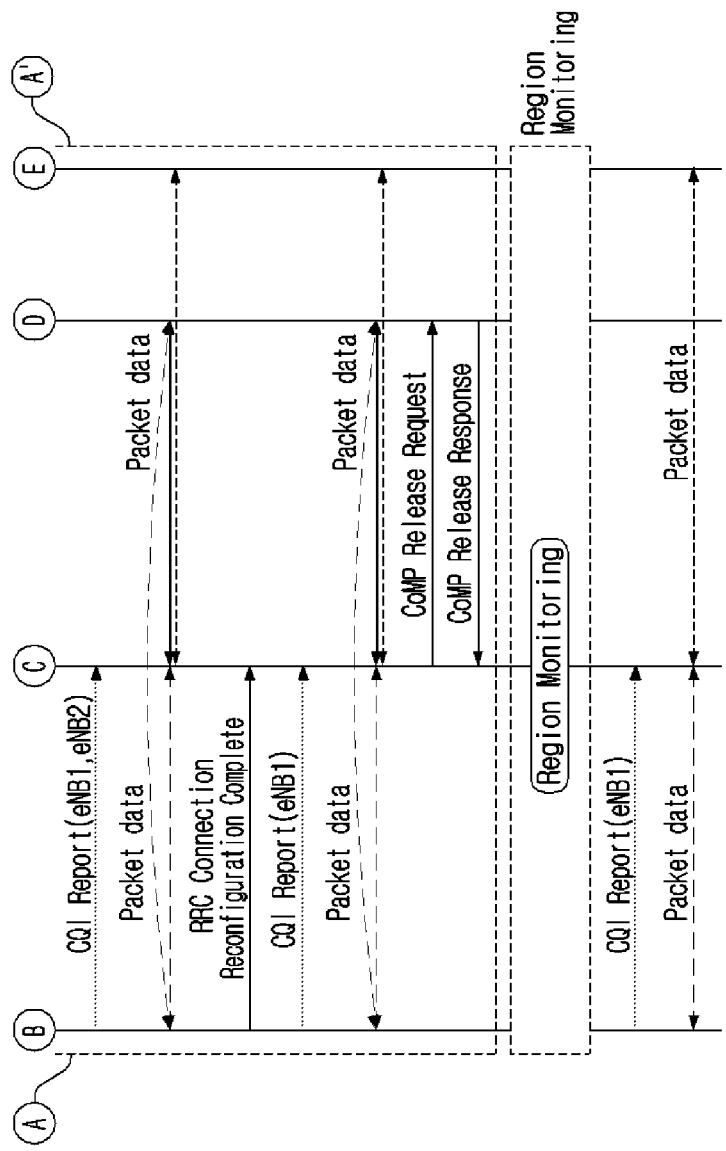

FIGS. 37A and 37B are views illustrating a CoMP connection reconfiguration step in which a base station continuously performs a region monitoring step even during the CoMP connection reconfiguration step and a CoMP access connection establishment step by setting a timer.

Referring to FIGS. 37A and 37B, the base station performs the region monitoring even during a CoMP connection establishment step which is a part of the CoMP connection reconfiguration step and specifically, the base station performs the region monitoring even during a CoMP access connection establishment step which is a part of the CoMP connection establishment step. That is, an inter-region handover procedure where when the terminal moves from the boundary region B12 of the first base station and the second base station to the center region C1 of the first base station, the region monitoring and the region rescanning are performed and the first base station redecides the region based on the result thereof and performs the region monitoring for the first predetermined time and maintains the current CoMP connection establishment and then when the first predetermined time elapses, performs the CoMP connection reconfiguration step which releases the connection with the second base station is illustrated.

Specifically, in the communication environment in which the base stations are synchronized, when the terminal UE moves from the boundary region B12 of the first base station and the second base station to the center region C1 of the first base station, in the region redecision step, the first base station eNB1 redecides whether the terminal UE is located in the center region C1 of the first base station eNB1 using the region rescanning result.

As a result of the region redecision, when the region where the terminal UE is located is changed from the boundary region B12 of the first base station eNB1 and the second base station eNB2 to the center region C1 of the first base station eNB1, the first base station eNB1 needs to perform the CoMP connection reconfiguration step for the center region C1 of the first base station eNB1. In this case, in the redecision step, if the region is redecided as the boundary region B12 of the first base station eNB1 and the second base station eNB2 so that it is decided that the region of the terminal UE is not changed, the current connection state is maintained and the terminal enters the region monitoring state. When it is decided that the region of the terminal UE moves to the center region C1 of the first base station eNB1, in the CoMP connection reconfiguration step, the first base station eNB1 operates the first timer and maintains the current CoMP connection state for the first predetermined time T1. In this case, the first base station eNB1 may continuously perform the region monitoring even during the CoMP connection establishment step or the CoMP access connection establishment step in order to check a continuous state of the region configuration condition before the first timer t1 elapses the first predetermined time T1. The continuous region monitoring step is performed for a first predetermined time T1 and when the first timer t1 exceeds the first predetermined time T1, the first base station eNB1 stops the continuous region monitoring, confirms that the terminal moves to the center region C1 of the first base station eNB1 which is currently redecided, and the first base station eNB1 transmits an RRC connection reconfiguration message to the terminal UE to control the terminal UE to establish the access connection for the CoMP connection release from the second base station eNB2. After the terminal UE completes the access connection for the CoMP connection release from the second base station eNB2, when the first base station eNB1 receives an RRC connection reconfiguration completed message from the terminal UE, the first base station eNB1 transmits a CoMP release request message to the second base station eNB2 and receives a CoMP release response message from the second base station eNB2 as a response therefor, to complete the CoMP connection establishment step for the center region C1 of the first base station eNB1 and enters to the region monitoring state.

Here, when the region of the terminal UE is changed by the region redecision even during the CoMP connection reconfiguration step, the CoMP connection establishment step, the CoMP access connection establishment step, the CoMP connection reconfiguration step for the changed region may be started again.

Figure 38A:
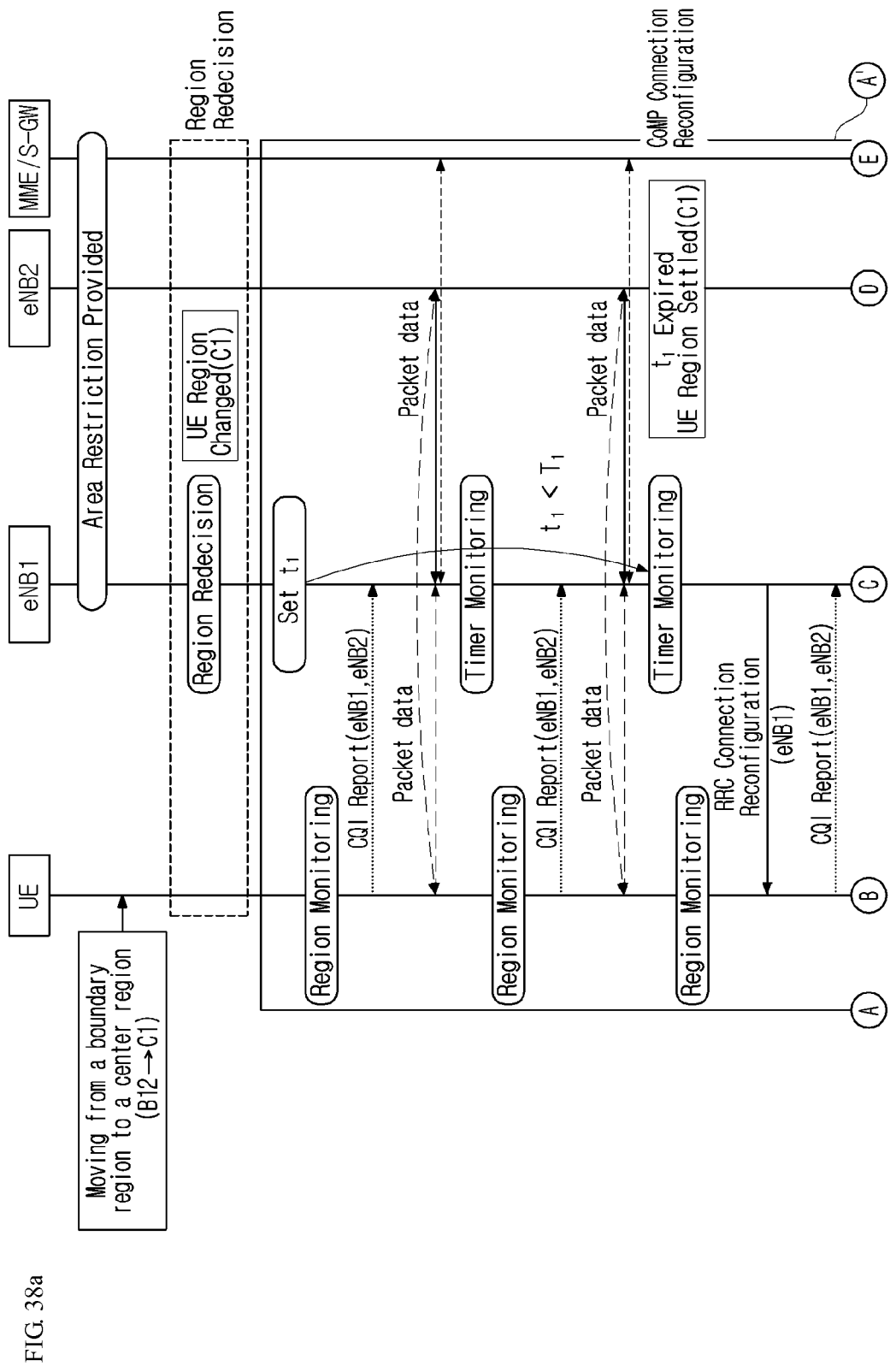
FIGS. 38A and 38B are views illustrating a CoMP connection reconfiguration step in which a terminal continuously performs region monitoring even during a CoMP connection establishment step and a CoMP access connection establishment step by setting a timer.
Figure 38B:
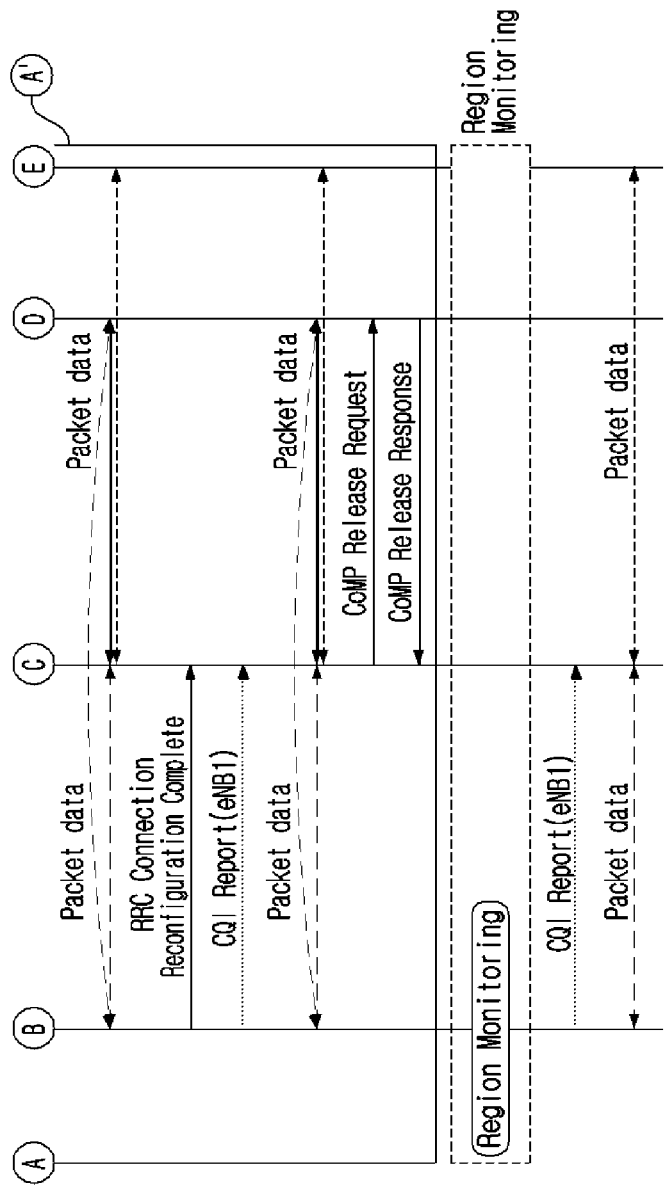

FIGS. 38A and 38B are views illustrating a CoMP connection reconfiguration step in which a terminal continuously performs a region monitoring step even during the CoMP connection reconfiguration step and a CoMP access connection establishment step by setting a timer.

Referring to FIGS. 38A and 38B, the terminal performs the region monitoring even during a CoMP connection establishment step which is a part of the CoMP connection reconfiguration step and specifically, the terminal performs the region monitoring even during a CoMP access connection establishment step which is a part of the CoMP connection establishment step. That is, an inter-region handover procedure where when the terminal moves from the boundary region B12 of the first base station and the second base station to the center region C1 of the first base station, the region monitoring and the region rescanning are performed and the first base station redecides the region based on the result thereof and then the terminal performs the region monitoring for the first predetermined time and maintains the current CoMP connection establishment and then when the first predetermined time elapses, performs the CoMP connection reconfiguration step which releases the connection with the second base station is illustrated.

Specifically, in the communication environment in which the base stations are synchronized, when the terminal UE moves from the boundary region B12 of the first base station and the second base station to the center region C1 of the first base station, in the region redecision step, the first base station eNB1 redecides whether the terminal UE is located in the center region C1 of the first base station eNB1 using the region rescanning result.

As a result of the region redecision, when the region where the terminal UE is located is changed from the boundary region B12 of the first base station eNB1 and the second base station eNB2 to the center region C1 of the first base station eNB1, the first base station eNB1 needs to perform the CoMP connection reconfiguration step for the center region C1 of the first base station eNB1. In this case, in the redecision step, if the region is redecided as the boundary region B12 of the first base station eNB1 and the second base station eNB2 so that it is decided that the region of the terminal UE is not changed, the current connection state is maintained and the terminal enters the region monitoring state. When it is decided that the region of the terminal UE moves to the center region C1 of the first base station eNB1, in the CoMP connection reconfiguration step, the first base station eNB1 operates the first timer and maintains the current CoMP connection state for the first predetermined time T1. In this case, the terminal UE may continuously perform the region monitoring even during the CoMP connection establishment step or the CoMP access connection establishment step in order to check a continuous state of the region configuration condition before the first timer t1 elapses the first predetermined time T1. The continuous region monitoring step is performed for the first predetermined time T1 and when the first timer t1 exceeds the first predetermined time T1, the first base station eNB1 confirms that the terminal moves to the center region C1 of the first base station eNB1 which is currently redecided, and the first base station eNB1 transmits an RRC connection reconfiguration message to the terminal UE to control the terminal UE to stop the region monitoring and establish the access connection for the CoMP connection release from the second base station eNB2. After the terminal UE completes the CoMP access connection establishment for the CoMP connection release from the second base station eNB2, when the first base station eNB1 receives an RRC connection reconfiguration completed message from the terminal UE, the first base station eNB1 transmits a CoMP release request message to the second base station eNB2 and receives a CoMP release response message from the second base station eNB2 as a response therefor, to complete the CoMP connection establishment step for the center region C1 of the first base station eNB1 and enters to the region monitoring state.

Here, when the region of the terminal UE is changed by the region redecision even during the CoMP connection reconfiguration step, the CoMP connection establishment step, the CoMP access connection establishment step, the CoMP connection reconfiguration step for the changed region may be started again.

Figure 39A:
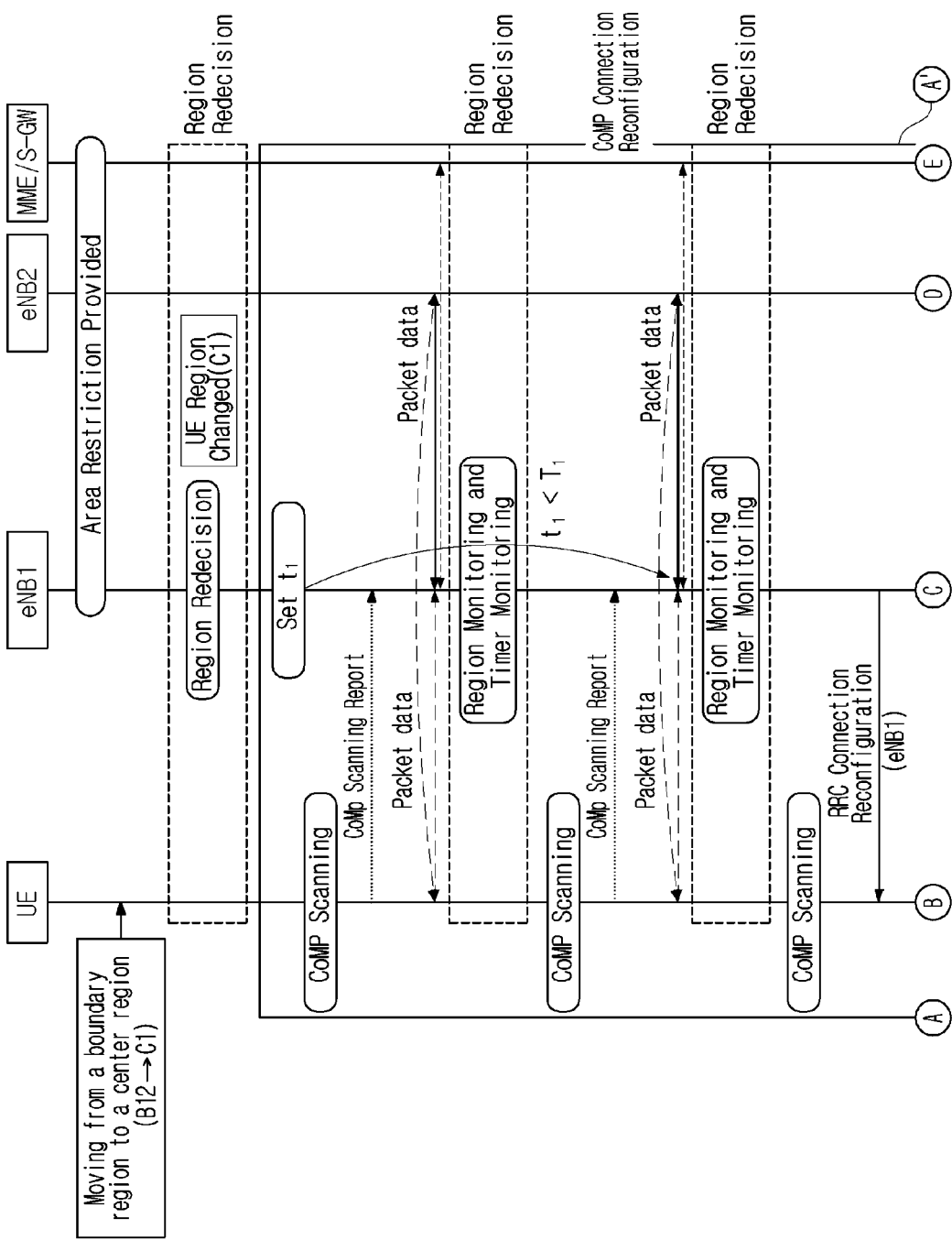
FIGS. 39A and 39B are views illustrating a CoMP connection reconfiguration step in which a base station continuously performs region redecision even during a CoMP connection establishment step and a CoMP access connection establishment step by setting a timer.
Figure 39B:
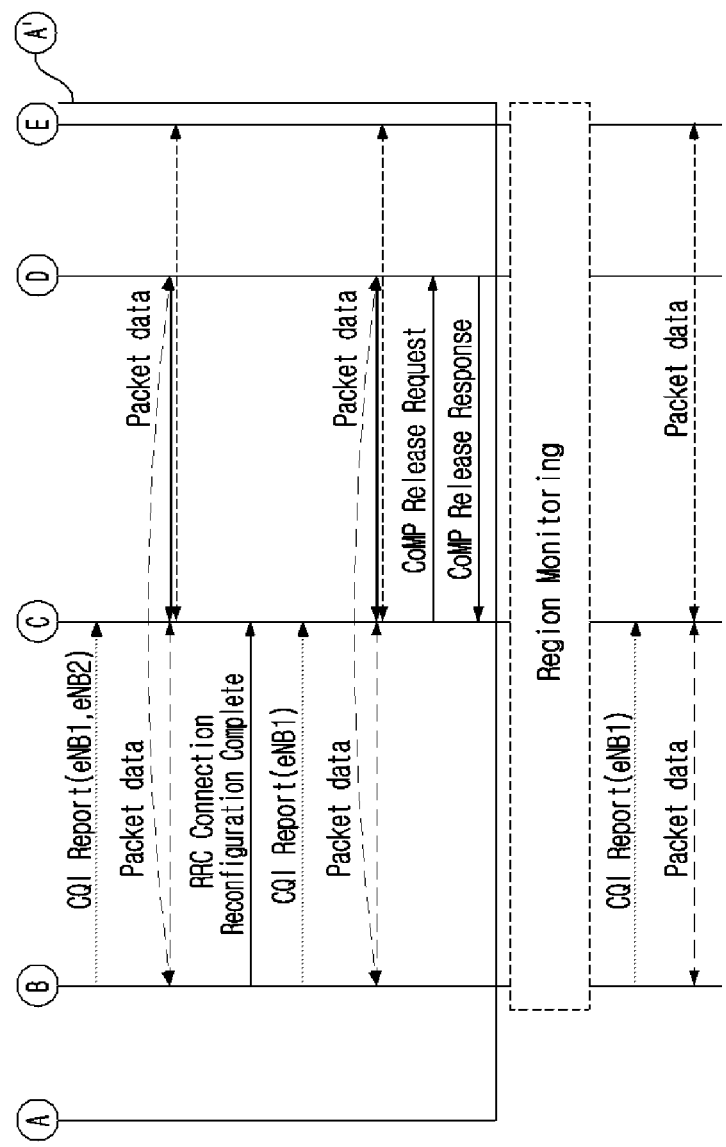

FIGS. 39A and 39B are views illustrating a CoMP connection reconfiguration step in which a first base station continuously performs a region redecision step even during the CoMP connection reconfiguration step and a CoMP access connection establishment step by setting a timer.

Referring to FIGS. 39A and 39B, the first base station performs the region redecision even during a CoMP connection establishment step which is a part of the CoMP connection reconfiguration step and specifically, the first base station performs the region redecision even during a CoMP access connection establishment step which is a part of the CoMP connection establishment step. That is, an inter-region handover procedure where when the terminal moves from the boundary region B12 of the first base station and the second base station to the center region C1 of the first base station, the region monitoring and the region rescanning are performed and the first base station redecides the region based on the result thereof and then performs the region monitoring for the first predetermined time and maintains the current CoMP connection establishment and then when the first predetermined time elapses, performs the CoMP connection reconfiguration step which releases the connection with the second base station is illustrated.

Specifically, in the communication environment in which the base stations are synchronized, when the terminal UE moves from the boundary region B12 of the first base station and the second base station to the center region C1 of the first base station, in the region redecision step, the first base station eNB1 redecides whether the terminal UE is located in the center region C1 of the first base station eNB1 using the region rescanning result.

As a result of the region redecision, when the region where the terminal UE is located is changed from the boundary region B12 of the first base station eNB1 and the second base station eNB2 to the center region C1 of the first base station eNB1, the first base station eNB1 needs to perform the CoMP connection reconfiguration step for the center region C1 of the first base station eNB1. In this case, in the redecision step, if the region is redecided as the boundary region B12 of the first base station eNB1 and the second base station eNB2 so that it is decided that the region of the terminal UE is not changed, the current connection state is maintained and the terminal enters the region monitoring state. When it is decided that the region of the terminal UE moves to the center region C1 of the first base station eNB1, in the CoMP connection reconfiguration step, the first base station eNB1 operates the first timer and maintains the current CoMP connection state for the first predetermined time T1. In this case, the first base station eNB1 continuously performs the region redecision even during the CoMP connection establishment step or the CoMP access connection establishment step in order to check a continuous state of the region configuration condition before the first timer t1 elapses the first predetermined time T1. In this case, the first base station eNB1 controls the terminal UE to continuously perform the CoMP scanning so as to continuously perform the region redecision for the first predetermined time T1 so that the first base station eNB1 continuously receives the CoMP scanning report from the terminal UE. The continuous region redecision step is performed for the first predetermined time T1 and when the first timer t1 exceeds the first predetermined time T1, the first base station eNB1 confirms that the terminal moves to the center region C1 of the first base station eNB1 which is currently redecided, and the first base station eNB1 transmits an RRC connection reconfiguration message to the terminal UE to control the terminal UE to stop the CoMP scanning and establish the access connection for the CoMP connection release from the second base station eNB2. After the terminal UE completes the access connection for the CoMP connection release from the second base station eNB2, when the first base station eNB1 receives an RRC connection reconfiguration completed message from the terminal UE, the first base station eNB1 transmits a CoMP release request message to the second base station eNB2 and receives a CoMP release response message from the second base station eNB2 as a response therefor, to complete the CoMP connection establishment step for the center region C1 of the first base station eNB1 and enters to the region monitoring state.

Here, when the region of the terminal UE is changed by the region redecision even during the CoMP connection reconfiguration step, the CoMP connection establishment step, the CoMP access connection establishment step, the CoMP connection reconfiguration step for the changed region may be started again.

Next, described is an inter-region handover procedure for a scenario where the terminal illustrated in FIGS. 21 and 22 moves from the boundary region B12 of the first base station and the second base station to the center region C1 of the first base station and then moves to the boundary region B13 of the first base station and the third base station. Specifically, a region redecision step and a CoMP connection reconfiguration step among the inter-region handover procedure in which a base station initiatively performs the region redecision will be described. Here, various procedures are available depending on whether to check a state where a region configuration condition is maintained for a predetermined, whether to perform the region monitoring or the region redecision during the CoMP connection reconfiguration step as follows and inter-region handover procedures which perform the region redecision even during the CoMP connection configuration step will be described.

Figure 40A:
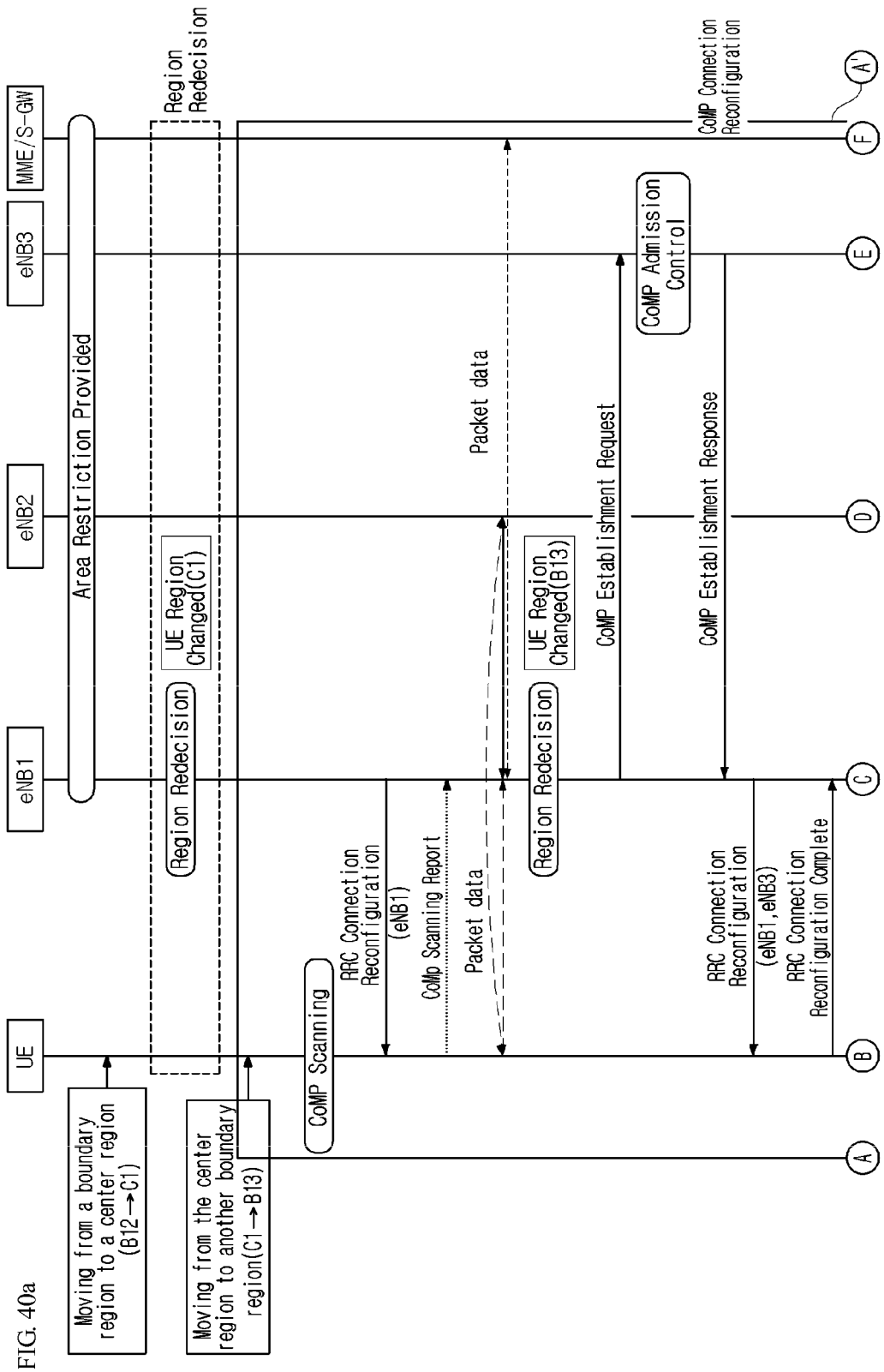
FIGS. 40A and 40B are views illustrating a CoMP connection reconfiguration step in which a base station continuously performs region redecision even during a CoMP connection establishment step and a CoMP access connection establishment step.
Figure 40B:
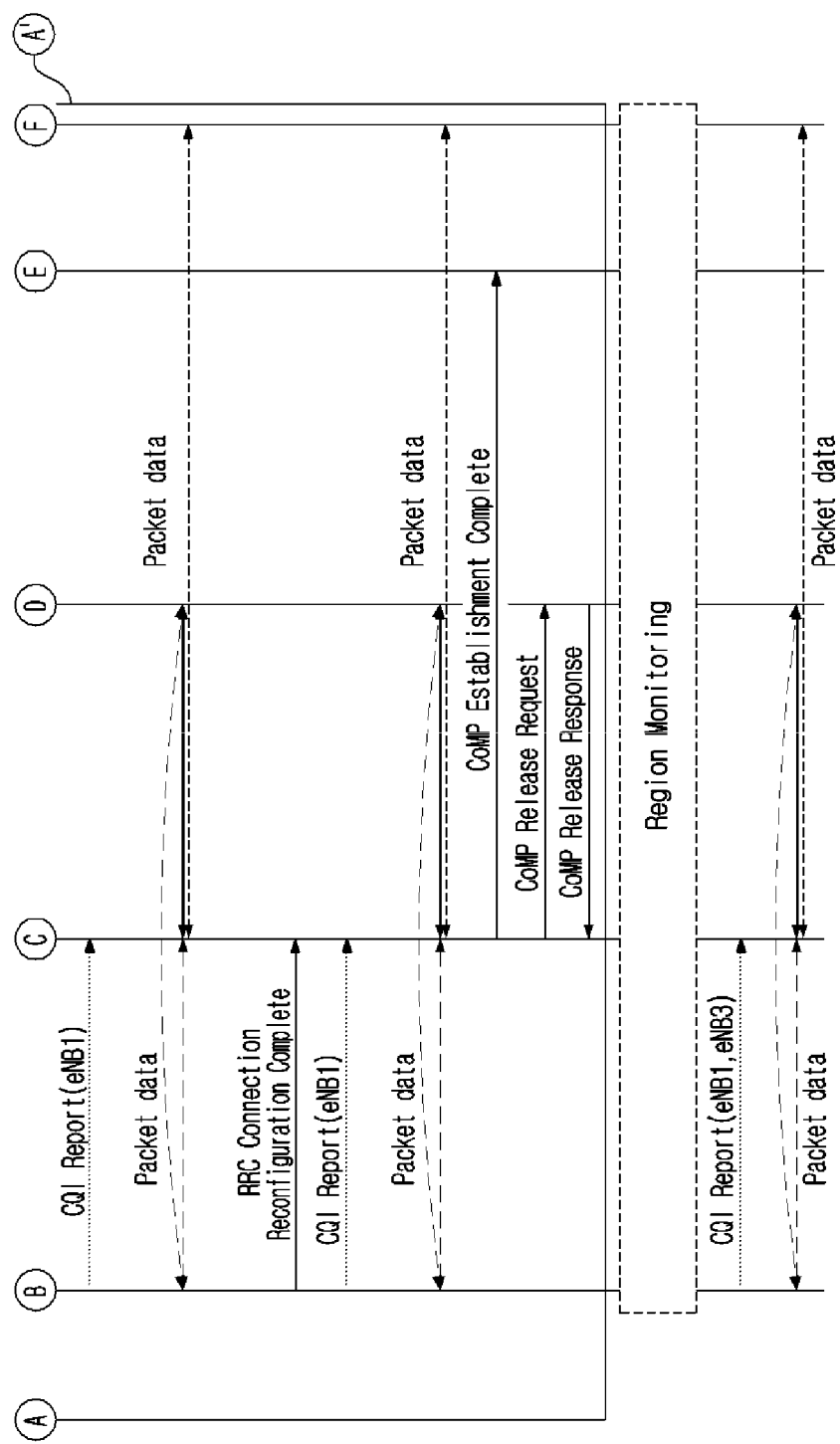

FIGS. 40A and 40B are views illustrating a CoMP connection reconfiguration step in which a base station continuously performs a region redecision step even during the CoMP connection reconfiguration step and a CoMP access connection establishment step.

Referring to FIGS. 40A and 40B, in the communication environment in which the base stations are synchronized, when the terminal UE moves from the boundary region B12 of the first base station and the second base station to the center region C1 of the first base station, in the region redecision step, the first base station eNB1 redecides whether the terminal UE is located in the center region C1 of the first base station eNB1 using the region rescanning result.

As a result of the region redecision, when the region where the terminal UE is located is changed from the boundary region B12 of the first base station eNB1 and the second base station eNB2 to the center region C1 of the first base station eNB1, the first base station eNB1 needs to perform the CoMP connection reconfiguration step for the center region C1 of the first base station eNB1. When it is redecided that the terminal UE moves to the center region C1 of the first base station eNB1, in the CoMP connection reconfiguration step, the RRC connection reconfiguration message is transmitted to the terminal UE to control the terminal UE to establish the access connection for the CoMP connection release from the second base station eNB2. In this case, the first base station eNB1 receives a CoMP scanning report from the terminal UE to perform the region redecision. During the CoMP access connection step, when the terminal UE moves from the center region C1 to the boundary region B13 of the first base station eNB1 and the third base station eNB3, in the region redecision step, the first base station eNB1 redecides whether the terminal UE is located in the boundary region B13 of the first base station eNB1 and the third base station eNB3 using a CoMP scanning report. As a result of the region redecision, when it is redecided that the terminal UE moves to the boundary region B13 of the first base station eNB1 and the third base station eNB3, the first base station eNB1 transmits a CoMP establishment request message to the third base station eNB3 and receives a CoMP establishment response message from the third base station eNB3 as a response therefor. In this case, the third base station eNB3 performs CoMP admission control to decide whether to accept the CoMP connection of the terminal and transmits the result to the first base station through the CoMP establishment response message. When the third base station eNB3 is capable of accepting the CoMP connection of the terminal, the first base station eNB1 transmits an RRC connection reconfiguration message to the terminal UE to control the terminal UE to establish access connection for the CoMP connection with the first base station eNB1 and the third base station eNB3. When the first base station eNB1 receives a RRC connection reconfiguration completed message from the terminal UE after the terminal UE completes the CoMP access connection establishment for the CoMP connection release from the second base station eNB2 and the CoMP access connection establishment with the first base station eNB1 and the third base station eNB3, the first base station eNB1 transmits a CoMP establishment completed message to the third base station eNB3 and transmits a CoMP release request message to the second base station eNB2 and receives a CoMP release response message from the second base station eNB2 as a response therefor so that the first base station completes the CoMP connection reconfiguration step for the boundary region B13 of the first base station eNB1 and the third base station eNB3 and enters the region monitoring state.

The above-described exemplary embodiments of the present invention may be created by a computer executable program and implemented in a general use digital computer which operates the program using a computer readable medium. The computer readable recording medium includes a magnetic storage medium (for example, a ROM, a floppy disk, and hard disk), a storing medium such as an optical reading medium (for example, CD-ROM, a DVD).

The exemplary embodiments of the present invention which have been described above are examples and it is obvious to those skilled in the art that various changes or modifications may be made without departing from the spirit and scope of the present invention. Accordingly, the exemplary embodiments disclosed herein are not intended to limit but describe the technical spirit of the present invention and the scope of the technical spirit of the present invention is not restricted by the exemplary embodiments. The protection scope of the present invention should be interpreted based on the following appended claims and it should be appreciated that all technical spirits included within a range equivalent thereto are included in the protection scope of the present invention.

What is claimed is:

1. An inter-region handover method for a communication area which is divided into at least two of at least one center region, at least one boundary region, and at least one common region in a communication system, the method comprising:
    a step of monitoring whether to satisfy a region configuration condition of a currently decided region between a terminal and at least one base station which is currently connected to the terminal;
    at least one step of rescanning a region where the terminal is located and redeciding a region where the terminal is located; and
    a step of reconfiguring CoMP (Coordinated multi-point transmission and reception) connection between the terminal and base stations in accordance with at least one of the region rescanning result and the region redecision result,
    wherein the center region is a region where only one base station allocates at least one resource to each of at least one terminal and provides a service; the boundary region is a region where a base station set including at least two base stations allocates at least one resource to each of at least one terminal and provides a service; and the common region is a region where a base station set, which includes at least two base stations including a base station which provides a service to at least one center region and at least one base station which provides a service to at least one boundary region, allocates at least one resource to each of at least one terminal and provides a service, and
    wherein the currently decided region is one of the center region, the boundary region, and the common region.

2. The inter-region handover method of claim 1, wherein the at least one base station initiatively monitors the region where the terminal to which the service is provided is located or the terminal autonomously monitors the region.

3. The inter-region handover method of claim 1, wherein in the rescanning step, the terminal rescans regions which are configured by all or a part of base stations in a neighbor list which is provided by the base station or the at least one base station in the base station set.

4. The inter-region handover method of claim 1, wherein the at least one base station initiatively rescans the region where the terminal to which the service is provided is located or the terminal autonomously monitors the region.

5. The inter-region handover method of claim 1, wherein the at least one base station initiatively redecides the region where the terminal to which the service is provided is located or the terminal autonomously monitors the region.

6. An inter-region handover method for a communication area which is divided into at least two of at least one center region, at least one boundary region, and at least one common region in a communication system, the method comprising:
    at least one step of monitoring a region where a terminal is located, rescanning a region where the terminal is located, and redeciding a region where the terminal is located; and
    a step of reconfiguring CoMP (Coordinated multi-point transmission and reception) connection between the terminal and base stations in accordance with at least one of the region rescanning result and the region redecision result,
    wherein the center region is a region where only one base station allocates at least one resource to each of at least one terminal and provides a service; the boundary region is a region where a base station set including at least two base stations allocates at least one resource to each of at least one terminal and provides a service; and the common region is a region where a base station set, which includes at least two base stations including a base station which provides a service to at least one center region and at least one base station which provides a service to at least one boundary region, allocates at least one resource to each of at least one terminal and provides a service, and wherein the CoMP connection reconfiguration step includes a CoMP access connection establishment step, and a CoMP establishment step and/or a CoMP releasing step.

7. The inter-region handover method of claim 6, wherein region monitoring is performed during the CoMP connection reconfiguration step.

8. The inter-region handover method of claim 6, wherein region monitoring is performed during the CoMP access connection establishment step.

9. The inter-region handover method of claim 6, wherein region redecision is performed during the CoMP connection reconfiguration step.

10. The inter-region handover method of claim 6, wherein region redecision is performed during the CoMP access connection establishment step.

11. The inter-region handover method of claim 6,
wherein the CoMP access connection establishment step is a step of reconfiguring connection between the terminal and the base station and includes a step of transmitting, by the base station, a connection reconfiguration message to the terminal and a step of transmitting, by the terminal, a connection reconfiguration completed message to the base station as a response therefor;

wherein the CoMP establishment step includes a step of transmitting, by at least one base station which is currently connected to the terminal, a CoMP establishment request message to another at least one base station and a step of transmitting, by another at least one base station, a CoMP establishment response message to the at least one base station which is currently connected to the terminal; or wherein the CoMP releasing step includes a step of transmitting, by at least one base station which is currently connected to the terminal, a CoMP releasing request message to another at least one base station which is being CoMP connected with the terminal after completing the CoMP access connection establishment between the terminal and the base station, and a step of transmitting, by another at least one base station which is being CoMP connected with the terminal, a CoMP releasing response message to the at least one base station which is currently connected to the terminal, as a response therefor.

12. An inter-region handover method for a communication area which is divided into at least two of at least one center region, at least one boundary region, and at least one common region in a communication system, the method comprising:
performing at least one of a region monitoring step, a region rescanning step, and a region redecision step using another channel quality indicators which are obtained by combining channel quality indicators for at least two base stations, wherein the center region is a region where only one base station allocates at least one resource to each of at least one terminal and provides a service; the boundary region is a region where a base station set including at least two base stations allocates at least one resource to each of at least one terminal and provides a service; and the common region is a region where a base station set, which includes at least two base stations including a base station which provides a service to at least one center region and at least one base station which provides a service to at least one boundary region, allocates at least one resource to each of at least one terminal and provides a service, wherein the channel quality indicator includes at least one of a channel characteristic indicator, a quality of service (QoS) indicator, a quality of experience (QoE) indicator, and other quantity related with a quality of a channel, and wherein the combining of the channel quality indicators for at least two base stations uses one of an ordered combination, a difference/ratio combination, a comparison combination, a selection combination, a weighted combination, a logical combination, and a parameter normalization combination.

13. An inter-region handover method for a communication area which is divided into at least two of at least one center region, at least one boundary region, and at least one common region in a communication system, the method comprising:
at least one step of monitoring a region where a terminal is located, rescanning a region where the terminal is located, and redeciding a region where the terminal is located; and a step of reconfiguring CoMP (Coordinated multi-point transmission and reception) connection between the terminal and base stations in accordance with at least one of the region rescanning result and the region redecision result, wherein a base station transmits a CoMP establishment request message to another at least one base station and the base station transmits a CoMP access connection reconfiguration message to the terminal after receiving a CoMP establishment response message from the another at least one base station, and wherein the center region is a region where only one base station allocates at least one resource to each of at least one terminal and provides a service; the boundary region is a region where a base station set including at least two base stations allocates at least one resource to each of at least one terminal and provides a service; and the common region is a region where a base station set, which includes at least two base stations including a base station which provides a service to at least one center region and at least one base station which provides a service to at least one boundary region, allocates at least one resource to each of at least one terminal and provides a service.

14. An inter-region handover method for a communication area which is divided into at least two of at least one center region, at least one boundary region, and at least one common region in a communication system, the method comprising:
at least one step of monitoring a region where a terminal is located, rescanning a region where the terminal is located, and redeciding a region where the terminal is located; and a step of reconfiguring CoMP (Coordinated multi-point transmission and reception) connection between the terminal and base stations in accordance with at least one of the region rescanning result and the region redecision result, wherein a base station transmits a CoMP establishment request message to another at least one base station and the base station transmits the CoMP access connection reconfiguration message to the terminal after receiving the CoMP establishment response message from the another at least one base station and then transmits the CoMP establishment completed message to the another at least one base station after receiving the CoMP access connection reconfiguration completed message from the terminal, and wherein the center region is a region where only one base station allocates at least one resource to each of at least one terminal and provides a service; the boundary region is a region where a base station set including at least two base stations allocates at least one resource to each of at least one terminal and provides a service; and the common region is a region where a base station set, which includes at least two base stations including a base station which provides a service to at least one center region and at least one base station which provides a service to at least one boundary region, allocates at least one resource to each of at least one terminal and provides a service.

15. An inter-region handover method for a communication area which is divided into at least two of at least one center region, at least one boundary region, and at least one common region in a communication system, the method comprising:
   at least one step of monitoring a region where a terminal is located, rescanning a region where the terminal is located, and redeciding a region where the terminal is located; and
   a step of reconfiguring CoMP (Coordinated multi-point transmission and reception) connection between the terminal and base stations in accordance with at least one of the region rescanning result and the region redecision result,
   wherein a base station transmits a CoMP access connection reconfiguration message to the terminal and transmits a CoMP release request message to another at least one base station after receiving the CoMP access connection reconfiguration completed message from the terminal, and receives a CoMP release response message from another at least one base station, and
   wherein the center region is a region where only one base station allocates at least one resource to each of at least one terminal and provides a service; the boundary region is a region where a base station set including at least two base stations allocates at least one resource to each of at least one terminal and provides a service; and the common region is a region where a base station set, which includes at least two base stations including a base station which provides a service to at least one center region and at least one base station which provides a service to at least one boundary region, allocates at least one resource to each of at least one terminal and provides a service.

16. An inter-region handover method for a communication area which is divided into at least two of at least one center region, at least one boundary region, and at least one common region in a communication system, the method comprising:
   at least one step of monitoring a region where a terminal is located, rescanning a region where the terminal is located, and redeciding a region where the terminal is located; and
   a step of reconfiguring CoMP (Coordinated multi-point transmission and reception) connection between the terminal and base stations in accordance with at least one of the region rescanning result and the region redecision result,
   wherein a base station transmits a CoMP establishment request message to another at least one base station and the base station transmits the CoMP access connection reconfiguration message to the terminal after receiving the CoMP establishment response message from the another at least one base station and transmits the CoMP establishment completed message to the another at least one first base station after receiving the CoMP access connection reconfiguration completed message from the terminal, and transmits a CoMP release request message to the at least one another second base station, and
   wherein the center region is a region where only one base station allocates at least one resource to each of at least one terminal and provides a service; the boundary region is a region where a base station set including at least two base stations allocates at least one resource to each of at least one terminal and provides a service; and the common region is a region where a base station set, which includes at least two base stations including a base station which provides a service to at least one center region and at least one base station which provides a service to at least one boundary region, allocates at least one resource to each of at least one terminal and provides a service.

17. An inter-region handover method for a communication area which is divided into at least two of at least one center region, at least one boundary region, and at least one common region in a communication system, the method comprising:
   at least one step of monitoring a region where a terminal is located, rescanning a region where a terminal is located, and redeciding a region where a terminal is located; and
   a step of reconfiguring CoMP (Coordinated multi-point transmission and reception) connection between the terminal and base stations in accordance with at least one of the region rescanning result and the region redecision result,
   wherein if region shift of a terminal is decided,
   current connection configuration is maintained for a first predetermined time; and then when another region shift of the terminal is decided before the first predetermined time elapses, current connection configuration is maintained again for a second predetermined time, or
   current connection configuration is maintained; and then CoMP connection reconfiguration is performed after the first predetermined time elapses, and
   wherein the center region is a region where only one base station allocates at least one resource to each of at least one terminal and provides a service; the boundary region is a region where a base station set including at least two base stations allocates at least one resource to each of at least one terminal and provides a service; and the common region is a region where a base station set, which includes at least two base stations including a base station which provides a service to at least one center region and at least one base station which provides a service to at least one boundary region, allocates at least one resource to each of at least one terminal and provides a service.

* * * * *